United States Patent Office 3,590,036
Patented June 29, 1971

3,590,036
NAPHTHYRIDINE-3-CARBOXYLIC ACIDS, THEIR DERIVATIVES AND PREPARATION THEREOF
George Y. Lesher, R.D. 1, Miller Road, Box 268, and Monte D. Gruett, Box 304A, Elliot Road, both of East Greenbush, N.Y. 12061
No Drawing. Continuation-in-part of application Ser. No. 399,333, Sept. 25, 1964, which is a continuation-in-part of application Ser. No. 244,886, Dec. 17, 1962, which in turn is a continuation-in-part of application Ser. No. 79,951, Jan. 3, 1961, now Patent No. 3,149,104. This application Nov. 18, 1968, Ser. No. 776,771
Int. Cl. C07d 39/10
U.S. Cl. 260—240        26 Claims

ABSTRACT OF THE DISCLOSURE 1-substituted-1,4 - dihydro-4-oxo-1,8 - naphthyridine-3-carboxylic acids and derivatives, having antibacterial, sedative and stimulatory activities, are prepared by various means, e.g., by reacting the corresponding 4-hydroxy-1,8-naphthyridine-3 - carboxylic acid or derivative with various alkyl or substituted-alkyl esters of a strong acid.

COMPOUNDS AND THEIR PREPARATION

This application is a continuation-in-part of copending application Ser. No. 399,333, and now abandoned, filed Sept. 25, 1964, which in turn is a continuation-in-part of copending application Ser. No. 244,886, filed Dec. 17, 1962 and now abandoned, which in turn is a continuation-in-part of copending application Ser. No. 79,951, filed Jan. 3, 1961, now U.S. Pat. 3,149,104, issued Sept. 15, 1964.

In the said prior applications the compounds of Formula I

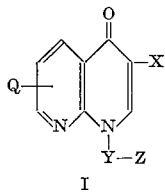

wherein Q, X, Y and Z are as defined respectively therein, have been denoted 1,3-disubstituted-4-oxo-1,8-naphthyridines; however, according to present Chemical Abstracts' nomenclature, the naming of compounds of Formula I should be changed to denote the compounds as 1,3-disubstituted - 1,4 - dihydro-4-oxo-1,8-naphthyridines, and this change, the insertion of "1,4-dihydro-," has thus been made where appropriate in the following specification.

This invention relates to 1,8-naphthyridines and particularly to 1,3 - disubstituted-1,4-dihydro-4-oxo compounds thereof, and to their preparation.

The invention sought to be patented, in its 1,3-disubstituted-1,4-dihydro-4-oxo-1,8-naphthyridine aspect, is described as residing in the concept of a chemical compound having a molecular structure in which an organic radical having up to and including eighteen carbon atoms and having a molecular weight not over 700 is attached through a saturated carbon atom thereof to the 1-nitrogen atom of 1,4-dihydro-3-X-4-oxo-1,8-naphthyridines and 5,6,7,8-tetrahydro derivatives thereof where X stands for carboxy or a group convertible thereto by hydrolysis.

The physical embodiments of our invention have been tested by standard bacteriological and pharmacological evaluation procedures and found to have antibacterial, stimulant and sedative properties. They are also useful as intermediates in organic syntheses.

Illustrative and preferred embodiments of our 1,3-disubstituted - 1,4-dihydro-4-oxo-1,8 - naphthyridines are those having the Formula I

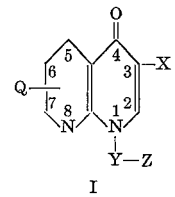

where X is carboxy and salts thereof, carbalkoxy having from two to nineteen carbon atoms inclusive, carbo-[(lower-tertiary - amino) - (polycarbon-lower-alkoxy)], cyano, carbamyl, aminocarbamyl or other groups convertible to carboxy by hydrolysis, Y is alkylene, alkenylene or alkynylene attached to the ring-nitrogen atom through a saturated carbon atom and having from one to ten carbon atoms inclusive, Z is a member of the group consisting of hydrogen, hydroxy, halo, trihalomethyl, carboxy, lower-carbalkoxy, cyano, carbamyl, lower-hydrocarbonoxy, lower-secondary-amino, lower - tertiary-amino, lower-cycloalkyl and AR, and Q is hydrogen or from one to four low-molecular weight substituents at positions 2, 5, 6 and 7 of the naphthyridine nucleus, said substituents selected from the group consisting of lower-alkyl, lower-alkoxy, lower-alkylmercapto, lower-alkylsulfinyl, lower-alkylsulfonyl, halo, hydroxy, hydroxy-(lower-alkyl), lower-alkoxy-(lower-alkyl), (lower-carboxylic-acyloxy) - (lower-alkyl), lower-alkylamino, di-(lower-alkyl)amino, nitro, amino, hydrazino, lower-carboxylic-acylamino, trihalomethyl, lower-alkanoyl, lower-alkanoyloxy, (lower-tertiary-amino)-(polycarbon-lower-alkyl), (lower - secondary-amino) - (polycarbon-lower-alkyl), (lower - tertiary - amino) - (polycarbon-lower-alkylamino), (lower - secondary-amino) - (polycarbon-lower - alkylamino), (lower - tertiary - amino) -(lower-alkoxy), (lower - secondary - amino) - (lower-alkoxy), AR, AR—O, AR—S, AR—S(O)$_2$, AR—NH, AR-(lower - alkyl), (AR)$_2$CH, (AR)$_2$C(CN), lower-cycloalkyl, lower-cycloalkyloxy, lower-cycloalkylmercapto, lower - cycloalkylamino, lower-cycloalky-(lower-alkyl), AR - (lower - alkenyl), AR - (halo-lower-alkenyl), AR-(cyano-lower-alkenyl), 2 - AR - 1 - phenylvinyl, 4-AR-1,3 - butadienyl, AR - (lower - alkynyl, AR—C(=O), AR—CH(CN), AR—CH(OH), AR—O—CH$_2$, AR-(lower - alkoxy), cyano, cyano - (lower - alkyl), (lower-carbalkoxy)-cyano-(lower-alkyl), dicyanomethyl, triazoamino - (lower - alkyl), (lower-carboxylic-acylamino)-(lower-alkyl), carbamyl, carboxy, carboxy-(lower-alkyl) and lower-carbalkoxy, where AR is 1–2 ringed aryl, and 5,6,7,8-tetrahydro derivatives of said compounds of Formula I. Unless otherwise indicated hereinabove or hereinbelow, the word "lower" when used with an alkyl moiety means alkyl, either straight- or branch-chained, having from one to six carbon atoms inclusive, e.g., lower-alkoxy stands for methoxy, ethoxy, n-propoxy, i-propoxy, n-butoxy, 2-butoxy, i-butoxy, n-pentoxy, 3-pentoxy and n-hexoxy. Similarly, when used with other moieties, the term "lower" designates each such moiety to have from one to six carbon atoms inclusive, either straight- or branch-chained, unless otherwise indicated. Particularly preferred embodiments of our invention because of their relative ease of preparation due to ready availability of intermediates and because of their high anti-bacterial, sedative or stimulant properties are the compounds having Formula I where Q is one or two substituents other than hydrogen and at least one is in the 7-position of the naphthyridine ring.

When Z of Formula I is hydrogen, Z—Y means aliphatic-hydrocarbon radicals having from one to ten carbon atoms inclusive and having a saturated carbon atom linked to the 1-nitrogen atom of the 1,8-naphthyridine ring, and comprehends alkyl, alkenyl and alkynyl radicals, as illustrated by methyl, ethyl, n-propyl, isopropyl, 2-btuyl, isoamyl, n-hexyl, n-octyl, n-decyl, and the like, when alkyl; 2-propenyl (allyl), 2-methyl-2-propenyl, 3-butenyl, 2-hexenyl, and the like, when alkenyl; and 2-propynyl (propargyl), 3-butynyl, 2-octynyl, and the like when alkynyl. When Z is other than hydrogen, as named above and illustrated below, the term "Z-(aliphatic-hydrocarbon)," i.e., Z—Y— as used in Formula I, means the above illustrated aliphatic-hydrocarbon radicals substituted by radicals as named above for Z and as further illustrated below or, in other words, Y or "aliphatic-hydrocarbon" is a divalent aliphatic hydrocarbon radical having from one to ten carbon atoms and is linked to the ring-nitrogen atom of the naphthyridine nucleus through a saturated carbon atom.

The term "lower-carbaloxy," as used herein, e.g., for Z in Formula I, means carbalkoxy radicals where the alkoxy portion can be straight- or branch-chained and has from one to six carbon atoms, as illustrated by carbomethoxy, carbethoxy, carbo-n-propoxy, carbisopropoxy, carbo-n-butoxy, carbo-n-hexoxy, and the like. Where Z is lower-arbalkoxy, Z–Y is exemplified by carbomethoxymethyl, 4-carbethoxybutyl and 3-carbo-n-butoxy-2-propenyl.

The term "lower-hydrocarbonoxy," as used herein, means hydrocarbonoxy radicals having from one to eight carbon atoms where hydrocarbon is, for instance, alkyl, alkenyl, alkynyl, cycloalkyl, cycloalkylalkyl, unsubstituted-phenyl, alkylated-pheny, benzyl or phenethyl, as further illustrated by methyl, ethyl, n-propyl, isopropyl, 2-butyl, isoamyl, n-hexyl, and the like, when alkyl; ethenyl(vinyl, 2-propenyl, 3-butenyl, 2-hexenyl, and the like, when alkenyl; 2-propynyl(propargyl), 3-hexynyl, and the like, when alkynyl; cyclopropyl, cyclobutyl, cyclopentyl, cyclohexyl, cyclooctyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl. When Z is lower-hydrocarbonoxy, Z–Y is e.g., 2-ethoxyethyl, 3-(2-propenoxy)-propyl and 4-phenoxy-2-butenyl.

The term "lower-cycloalkyl," as used herein, means cycloalkyl radicals having from three to eight ring-carbon atoms and having up to a total of about eight carbon atoms, as illustrated by cyclopropyl, cyclopentyl, cyclohexyl, 2-methylcyclohexyl, 4-ethylcyclohexyl, cyclooctyl, and the like. When Z is lower-cycloalkyl, Z—Y is, e.g., 4-cyclopropylbutyl and 2-cyclohexylpropyl.

The term "1—2 ringed argyl," as used herein, e.g., as "AR" for Z or Q in Formula I, means radicals having one or two aromatic rings which can be benzenoid or five- or six-membered hetero-aromatic (as illustrated by phenyl, naphthyl, biphenylyl, pyridyl, pyrimidyl, furyl, thiazolyl, quinolyl, oxazolyl, triazinyl, thienyl, pyrrolyl, and the like. Preferred embodiments of "1—2 ringed aryl," because of their commercial practicability due to availability of intermediates, are monocarbocyclic-aryl radicals, that is, those where "AR" is phenyl, the benzene ring of which can bear low-molecular weight substituents, among which are, for purposes of illustration but without limiting the generality of the foregoing, lower-alkylmercapto, lower-alkylsulfinyl, lower-alkysulfonyl, halo, lower-alkylamino, di-(lower-alkyl)amino, nitro, amino, lower-carboxylic-acylamino, trihalomethyl, phenoxy, benzyloxy, benzoyl, lower-alkanoyl, (lower-tertiary-amino)-(polycarbon-lower-alkyl), (lower-secondary-amino)-(polycarbon-lower-alkyl), (lower-tertiary-amino)-(polycarbon - lower - alkylamino), (lower-secondary-amino)-(polycarbon - lower - alkyl), (lower-tetiary-amino)-(polycarbon-lower - alkylamino), (lower-secondary - amino)-(polycarbon - lower - alkylamino), (lower - tertiary - amino)-(polycarbon - lower - alkoxy), lower - secondary - amino)-(polycarbon - lower -alkoxy), hydroxy, cyano, aminomethyl, carbamyl, carboxy, lower-carbalkoxy, phenylmercapto, benzyl, 4-methoxyphenoxy, and the like. When the benzene ring is substituted, three are preferably from one to three substituents which can be in any of the available positions of the benzene ring, and where more than one substituent is present, they can be the same or different and they can be in any of the various position combinations relative to each other. The lower-alkyl, lower-alkoxy, lower-alkyl-mercapto, lower-alkyl-sulfinyl, lower-alkylsulfonyl, lower-alkylamino, lower-carboxylic-acylamino, lower-alkanoyl and the like substituents have preferably from one to six carbon atoms which can be arranged as straight or branched chains, and are illustrated by methyl, ethyl, n-hexyl, methoxy, isobutoxy, ethylmercapto, n-amylmercapto, methylsulfinyl, n-propylsulfinyl, isopropylsulfonyl, n-butylsulfonyl, ethylamino, n-butylamino, acetylamino, propionylamino, acetyl, propionyl, and the like. When AR is other than phenyl, e.g., naphthyl, biphenylyl, pyridyl, pyrimidyl, furyl, thiazolyl, quinolyl, oxazolyl, triazinyl, thienyl, pyrrolyl, etc., the rings thereof can bear substituents such as those listed above as substituents for the benzene ring. When Z is AR, AR—Y— is, e.g., 4-chlorobenzyl, 2-(2-pyridyl)ethyl, 6-(3,4-dimethoxyphenyl)hexyl and 2-(3,4-dibromophenyl)ethyl.

The term "lower-secondary-amino," as used herein, means secondary-amino radicals having preferably from one to about eight carbon atoms, as illustrated by: mono-cycloalkylamino radicals where the cycloalkyl group has preferably from three to eight ring-carbon atoms such radicals including cyclopropylamino, cyclobutylamino, cyclopentylamino, cyclohexylamino and cyclooctylamino; mono-(lower-hydroxyalkyl)amino radicals where the lower-hydroxyalkyl group has preferably two to six carbon atoms such radicals including 2 - hydroxyethylamino, 3 - hydroxypropylamino, 4 - hydroxybutylamino, 2-hydroxypropylamino, 6 - hydroxyhexylamino, etc.; mono-(lower-alkyl)amino radicals where the lower-alkyl group has preferably from one to six carbon atoms such radicals including methylamino, ethylamino, n-propylamino, isopropylamino, n-butylamino, 2 - butylamino, isobutylamino, n-amylamino, n-hexylamino, etc., mono-[(mono-carbocyclic-aryl)methyl]amino radicals, such radicals including benzylamino, 2 - chlorobenzylamino, 3,4 - dichlorobenzylamino, 3 - nitrobenzylamino, 3,4 - diethoxybenzylamino, 4 - isopropylbenzylamino, 2,4,6 - trichlorobenzylamino, etc.; and the like.

The term "lower-tertiary-amino," as used herein means tertiary-amino radicals having two nitrogen substituents such as those illustrated above for the lower-secondary-amino radicals, with preferred tertiary-amino radicals being di-(lower-alkyl)amino radicals where the lower-alkyl radicals are alike or different and each alkyl radical has preferably from one to six carbon atoms, such dialkylamino radicals including dimethylamino, diethylamino, ethyl-methylamino, diisopropylamino, ethyl-n-propylamino, di-n-butylamino, di-n-hexylamino, and the like. This term "lower-tertiary-amino" also comprehends saturated N-heteromonocyclic radicals having five to six ring atoms, illustrated by 1 - piperidyl; (lower-alkylated)-1 - piperidyl such as 2 - methyl - 1 - piperidyl, 3-ethyl-1-piperidyl, 4 - methyl - 1 - piperidyl, 2,6 - dimethyl - 1 - piperidyl; 1 - pyrrolidyl; (lower-alkylated) - 1 - pyrrolidyl such as 2 - methyl - 1 - pyrrolidyl, 3-ethyl-1-pyrrolidyl, 2,5 - dimethyl - 1 - pyrrolidyl; 4 - morpholinyl; 1-piperazyl; alkylated - 1 - piperazyl such as 4 - methyl - 1 - piperazyl, 4 - ethyl - 1 - piperazyl, 2,4,6 - trimethyl - 1 - piperazyl; and the like.

When Z stands for lower-secondary-amino or lower-tertiary amino, Y is preferably polycarbon-lower-alkyl and Z-Y is illustrated by 2-(2-hydroxyethylamino)ethylamino, 4 - dimethylaminobutyl and 3-(1-piperidyl)propyl.

The term "polycarbon-lower-alkyl," as used herein, means lower-alkylene radicals preferably having from two to six carbon atoms and having its connecting linkages on different carbon atoms, e.g.,

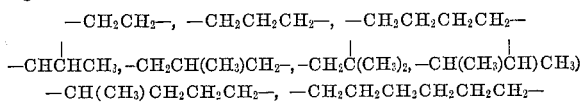

—CH(CH₃)CH₂CH₂CH₂—, —CH₂CH₂CH₂CH₂CH₂CH₂— and the like.

The term "halo," as used herein as substituents for the naphthyridine ring, i.e., as Q or as substituents for the lower-aromatic ring, means chloro, bromo, iodo, or fluoro.

The term "lower-carboxylic-acyl," as used herein, e.g., as a part of several meanings for Q means lower-alkanoyl, lower-haloalkanoyl, lower-carboxyalkanoyl, (lower-tertiary-amino)-(lower-alkanoyl), and monocarbocyclic-aroyl, illustrated by formyl, acetyl, chloroacetyl, dichloroacetyl, propionyl, β-carboxypropionyl, diethylaminoacetyl, butyryl, benzoyl, 2 - hydroxybenzoyl, 4 - aminobenzoyl, 3 - chlorobenzoyl, and the like.

The term "carbo-[(lower-tertiary-amino)-(polycarbon-lower-alkoxy)]," as used herein for X in Formula I, is illustrated by carbo-(2-di-n-butylaminoethoxy), carbo-(5-dimethylamino-2-pentoxy), carbo-[3 - (1 - piperidyl) propoxy], and the like.

Among especially preferred embodiments of the composition aspect of the invention are: the compounds of Formula I where Q is 7 - (lower-alkyl), X is COOR with R being hydrogen or lower-alkyl, and Y—Z is lower-alkyl; the compounds of Formula I where Q is

7-[AR—CH=C(R')]

with R' being hydrogen or lower-alkyl having from one to four carbon atoms inclusive, X is COOR with R being hydrogen or lower-alkyl, Y–Z is lower-alkyl, and AR is phenyl, naphthyl, biphenylyl, pyridyl, pyrimidyl, furyl, thiazolyl, quinolyl, oxazolyl, triazinyl, thienyl, pyrrolyl and said groups having from one to three substituents selected from lower-alkyl, lower-alkoxy, lower-alkylmercapto, lower-alkylsulfonyl, halo, lower-alkyamino, di-(lower-alkyl)amnio, nitro, amino, lower-carboxylic-acylamino, trihalomethyl or hydroxy; the compounds of Formula I where Q is 7-AR—Y' with Y' being CH₂, CH(OH), CH(CN), O, S or NH, X is COOR with R being hydrogen or lower-alkyl, Y—Z is lower-alkyl, AR is phenyl, naphthyl, biphenylyl, pyridyl, pyrimidyl, furyl, thiazolyl, quinolyl, oxazolyl, triazinyl, thienyl, pyrrolyl and said groups having from one to three substituents selected from lower-alkyl, lower-alkoxy, lower-alkylmercapto, lower-alkylsulfonyl, halo, lower-alkylamino, di-(lower-alkyl)amino, nitro, amino, lower-carboxylic-acylamino, trihalomethyl or hydroxy, or corresponding 5,6,7,8-tetrahydro derivatives thereof or the corresponding compounds where AR—Y' is 7-cyclohexyloxy; the compounds of Formula I where Q is 7-AcOCH₂, X is COOR with R being hydrogen or lower-alkyl, Y—Z is lower-alkyl, and Ac is hydrogen or lower-carboxylic-acyl; the compounds of Formula I where Q is attached to the 7-position of the 1,8-naphthyridine ring and is selected from halo, hydroxy, amino, lower-alkanoyl-amino or cyano, X is COOR with R being hydrogen or lower-alkyl, and Y—Z is lower-alkyl or lower-alkenyl.

The invention in its process aspect, is described as residing in the concept of reacting a 3-X-4-hydroxy-1,8-naphthyridine with an organic ester of a strong acid, i.e., an acid which is practically completely dissociated in aqueous solution. The organic moiety of the ester has up to and including eighteen carbon atoms, has a molecular weight not over 700 and is attached to the anionic portion of the ester through a saturated carbon atom thereof. Illustrative and preferred organic esters are esters of a strong inorganic acid or an organic sulfonic acid, said ester having the formula Z-(aliphatic-hydrocarbon)-An, or Z—Y—An, where An is an anion of a strong inorganic acid or an organic sulfonic acid, e.g., chloride, bromide, iodide, sulfate, benzenesulfonate, para-toluenesulfonate, and the like, and Z and Y have the meanings given above for Formula I. The chloride, bromide or iodide is preferred becausee of the more ready availability of the requisite Z-(aliphatic-hydrocarbon) halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, dimethyl sulfoxide, or a mixture of such solvents, e.g., a mixture of water and a lower-alkanol. The reaction is generally carried out at a temperature between about room temperature (about 25° C.) and 150° C., preferably at reflux, in a lower-alkanol solvent, a mixture of water and a lower-alkanol or dimethylformamide.

To illustrate the preparation of the preferred 1,3-disubstituted - 1,4 - dihydro - 4 - oxo-1,8-naphthyridines of our invention having Formula I, our process comprises reacting the corresponding 3-X-4-hydroxy-1,8-naphthyridine having the Formula II

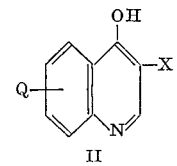

II where Q and X have the meanings given above for Formula I, with an ester having the formula Z—Y—An, where Z and Y have the meanings given above for Formula I and An is an anion of a strong inorganic acid or an organic sulfonic acid, in the presence of an acid-acceptor.

When X is carboxy, i.e., when the intermediate is a 4-hydroxy - 1,8 - naphthyridine - 3 - carboxylic acid, the reaction is conveniently carried out by refluxing the acid with a Z-(aliphatic-hydrocarbon) ester, preferably halide, in aqueous ethanol in the presence of potassium or sodium hydroxide to yield the corresponding 1-(Z—Y)-1,4-dihydro - 4 - oxo - 1,8 - naphthyridine - 3 - carboxylic acid; the same 3-carboxylic acid is also obtained using these reaction conditions and a lower-alkyl 4-hydroxy-1,8-naphthyridine-3-carboxylate as the intermediate, the ester hydrolyzing under the reaction conditions to form the acid. If the final product is desired in ester form, e.g., the ethyl ester, the intermediate ethyl 4-hydroxy-1,8-naphthyridine-3-carboxylate is reacted as above using refluxing ethanol as the solvent and sodium ethoxide as the acid-acceptor. The alkylation of the 4-hydroxy-1,8-naphthyridine-3-carboxylic acid can be carried out in the absence of an acid-acceptor by using its di-salt, e.g., by heating a mixture of the anhydrous dipotassium or disodium salt with diethyl sulfate followed by acidification to obtain the 1-ethyl - 1,4 - dihydro - 4 - oxo-1,8-naphthyridine-3-carboxylic acid.

Some of the intermediate 4-hydroxy - 1,8-naphthyridine-3-carboxylic acids and derivatives are known, e.g., 4-hydroxy - 7 - methyl - 1,8 - naphthyridine-3-carboxylic acid and ethyl ester, 7-ethoxy - 4 - hydroxy-1,8-naphthyridine-3-carboxylic acid and ethyl ester, and 4-hydroxy-1,8-naphthyridine-3-carboxylic acid. Other such intermediates, where novel, are prepared by generally known methods which are illustrated hereinbelow.

For example, the intermediate lower-alkyl 4-hydroxy-1,8-naphthyridine-3-carboxylate is obtained in two steps by first reacting a 2-aminopyridine with one molar equivalent of a dialkyl ethoxymethylenemalonate, preferably the diethyl ester, to yield a dialkyl N-(2-pyridyl) aminomethylenemalonate and then cyclizing this compound by heating it in an appropriate solvent, e.g., diethyl phthalate, Dowtherm A (eutectic mixture of diphenyl and diphenyl ether), mineral oil, to obtain the intermediate lower-alkyl 4-hydroxy - 1,8 - naphthyridine-3-carboxylate. To obtain the lower-alkyl 7-acylamino - 4 - hydroxy-1,8-naphthyridine - 3 - carboxylate one starts with the 2,6-diaminopyridine and an acyl anhydride, preferably acetic anhydride, is included in the cyclizing step.

Also within the scope of the invention are salts of our above-described 1-substituted - 1,4 - dihydro-4-oxo-1,8-naphthyridine-3-carboxylic acids. Preferred types of salts are those having cations which do not increase the toxicity of the compound as a whole toward animal organisms. These comprise the alkali metal salts, e.g., the sodium or potassiom salts; the lower-alkaline earth metal salts, e.g., magnesium or calcium salts; and, the ammonium or organic amine salts, e.g., diethanolamine or N-methylglucamine salts. Although medicinally acceptable salts are preferred, other and all cationic salts are within the scope of our invention. All such salts, including those having toxic cations, are useful in characterizing the free acids and as intermediates in purification of the free acids. The salts are prepared from the acids using methods illustrated hereinbelow in the example.

Preferred ester embodiments of our 1-substituted-1,4-dihydro - 4-oxo-1,8-naphthyridine-3-carboxylic acids are those derived from alkanols having up to eighteen carbon atoms, phenols having up, to ten carbon atoms, (lower - tertiary-amino)-(polycarbon-lower-alkanols), (lower-secondary - amino)-(polycarbon-lower-alkanols). Other ester embodiments are the corresponding thiol esters prepared from the corresponding alkylmercaptans, substituted-alkylmercaptans and thiophenols. These esters and their preparation are further illustrated in the examples hereinbelow. Although medicinally acceptable esters are preferred, other and all esters are encompassed by the scope of the invention. All esters are useful in characterizing the free acids and/or as intermediates in purification of the free acids.

Similarly, like the salts and esters, all amide and hydrazide derivatives are within the scope of the invention, and they have the same utilities as the salts and esters. Preferred amide and hydrazide embodiments, which are prepared as illustrated in the examples, are those derived from ammonia or hydrazine, unsubstituted or substituted by one or more low-molecular substituents, e.g., lower-alkyl, lower-hydroxyalkyl, lower-carboxyalkyl, lower-carbalkoxyalkyl, (lower - tertiary-amino)-(polycarbon-lower-alkyl) monocarbocyclic-aryl, and the like.

In its broader aspect, our invention encompasses not only the aforementioned 1-substituted-1,4-dihydro-3-X-4-oxo-1,8-naphthyridines where X stands for carboxy and salt, ester, amide and hydrazine derivatives thereof but also for corresponding compounds where X stands for other groups convertible to carboxy by hydrolysis, e.g., where X stands for C(=NH)O-(lower-alkyl).

C(=NH)NH (lower-alkyl), C(=S)OH, C(=S)SH and C(=O)-halide.

Other compounds encompassed by our invention are bis-compounds prepared by our process using bis-esters having the formula An—Y—An where Y has the meaning given above for Formula I and where, in each instance, An is attached to a saturated carbon atom, e.g., the reaction of 4 - hydroxy-7-methyl-1,8-naphthyridine-3-carboxylic acid with 1,3-diiodopropane, 1,6-dibromohexane or 1,4-diiodo-2-butene to yield, respectively, 1,3-bis(3-carboxy-1,4-dihydro - 7 - methyl-4-oxo-1,8-naphthyridyl-1)propane, 1,6-bis(3 - carboxy - 1,4-dihydro-7-methyl-4-oxo-1,8-naphthyridyl-1)hexane or 1,4 - bis(3-carboxy-1,4-dihydro-7-methyl - 4 - oxo-1,8-naphthyridyl-1)-2-butene. Other bis-compounds encompassed by our invention are those where the two naphthyridine rings are connected by a bis-ester grouping through the 3-carboxy substituent, e.g., the bis-ester obtained by first reacting 1-ethyl-1,4-dihydro-7-methyl-4-oxo-1,8-naphthyridine-3-carboxylic acid with phosphorus oxychloride to form the corresponding 3-carboxylic acid chloride and then reacting two molar equivalents of the acid chloride with a diol, e.g., 1,3-propanediol, 1,4-dihydroxy-2-butene and 1,6-hexanediol.

Our 1 - substituted-1,4-dihydro-4-oxo-1,8-naphthyridine 3-carboxylic acids and derivatives have the further utility as intermediates in the preparation of other of our 1-substituted-4-1,4-dihydro-oxo-1,8-naphthyridine-3-carboxylic acids and derivatives, as illustrated below for the preparation of preferred 7-substituted naphthyridine embodiments.

For example, the 7 - amino-1,4-dihydro-4-oxo-1-substituted-1,8-naphthyridine-3-carboxylic acids and derivatives are conveniently converted into the corresponding 7-diazonium salts which in turn are converted into other 7-substituted-1,4-dihydro-4-oxo-1-[Z-(aliphatic-hydrocarbyl)]-3-carboxylic acids and derivatives, e.g., the corresponding 7-halo and 7-hydroxy compounds. The 7-amino-1,4-dihydro - 4 - oxo-1-substituted-1,8-naphthyridine-3-carboxylic acids prepared by reacting a lower-alkyl 7-acylamino-4-hydroxy-1,8-naphthyridine-3-carboxylate, e.g., the ethyl 7-acetylamino compound, with a Z-(aliphatic-hydrocarbonating) agent, e.g., ethyl iodide or benzyl chloride, to obtain the lower-alkyl 7-acylamino-1,4-dihydro-4-oxo-1-substituted-1,8-naphthyridine-3-carboxylate, e.g., the ethyl 7-acetylamino - 1,4-dihydro-4-oxo-1-(ethyl or benzyl)-1,8-naphthyridine - 3-carboxylate, which is then hydrolyzed with an acidic agent, e.g., HCl, to remove both the ester and N-acyl groups.

7-hydroxy-1,4-dihydro-4-oxo-1-substituted-1,8-naphthyridine-3-carboxylic acids and derivatives are also useful as intermediates for preparation of the corresponding 7-halo compounds by their reaction with a halogenating agent effective to convert hydroxy to halo, e.g., phosphorus oxychloride, thionyl chloride, phosphorus tri or pentachloride to produce the corresponding 7-chloro compound or phosphorus tribromide to produce the 7-bromo compound.

The 7 - halo-1,4-dihydro-4-oxo-1-substituted-1,8-naphthyridine-3-carboxylic acids and derivatives, in turn, are useful for the preparation of other corresponding 7-substituted compounds, for example, the 7-alkoxy, 7-phenyloxy, 7-alkylmercapto, 7-phenylmercapto, 7-alkylamino, 7-phenylamino, 7-dialkylamino, 7-hydrazino, 7-[(lower-tertiary-amino- or lower - secondary-amino)-(polycarbon-lower-alkyl)-amino], 7-[(lower-tertiary-amino or lower-secondary - amino)-(polycarbon-lower-alkyloxy)] compounds by reacting the corresponding 7-halo compound respectively, for example, with sodium alkoxide, sodium phenoxide, sodium alkylmercaptide, sodium phenylmercaptide, alkylamine, phenylamino, dialkylamine, hydrazine, tertiary-amino- or secondary-amino-alkylamine, sodium tertiary-amino- or secondary-amino-alkoxide. The 7-halo compound also can be catalytically reduced to remove the 7-halo substituent to yield the corresponding 7-unsubstituted - 1,4 - dihydro-4-oxo-1-[Z-(aliphatic-hydrocarbyl)]-1,8-naphthyridine-3-carboxylic acid and derivatives.

As pointed out above, the 1,4-dihydro-4-oxo-1-substituted - 1,8-naphthyridine-3-carboxylic acids are useful for the preparation of their salt, ester, amide and hydrazide derivatives using methods for converting carboxylic acids into said derivatives. These methods are illustrated in the specific exemplary disclosure hereinbelow. These derivatives also have antibacterial and pharmacological properties, as illustrated in the specific examples below.

The lower-alkyl esters of our 1,4-dihydro-4-oxo-1-substituted-1,8-naphthyridine-3-carboxylic acids, especially methyl and ethyl esters, are useful in their reaction with hydrazines and ammonia or amines to form the corresponding hydrazides and amides, respectively. Also, they can be reacted with higher homologous alkanols, e.g., n-butanol, 1,3-dimethylhexanol, n-decanol, or with an aminoalcohol, e.g., 3-(1-piperidyl)propanol or 4-dimethylamino-butanol, by an ester exchange reaction to yield the corresponding higher alkyl or aminoalkyl ester, e.g., n-butyl, 1,3-dimethyl, hexyl, n-decyl, 3-(1-piperidyl)-propyl or 4-dimethylaminobutyl ester, respectively.

4 - hydroxy - 7-[2-(aryl)-ethenyl]-1,8-naphthyridine-3-carboxylic acids and derivatives are disclosed and claimed in our U.S. Pat. 3,149,104, issued Sept. 15, 1964. Compounds of this type can be prepared by reacting the corresponding lower-alkyl 4-hydroxy-7-methyl-1,8-naphthyridine-3-carboxylate with an arylaldehyde, e.g., benzaldehyde, or pyridine-2-aldehyde, in the presence of a mixture of a lower-alkanoic acid and anhydride, e.g., acetic acid and acetic anhydride, preferably by heating in the range of about 100° C. to about 150° C., thereby yielding the corresponding lower-alkyl 4 - hydroxy - 7 - [2-(aryl)-ethenyl]-1,8-naphthyridine-3-carboxylate, e.g., the corresponding 7-(2-phenylethenyl) (i.e., 7-styryl) or 7-[2-(2-pyridyl)ethenyl] ester. The corresponding acid is obtained by saponification of the ester and, in turn, can be converted into other esters or salt, amide or hydrazine derivatives, e.g., those defined hereinabove for our 1-substituted - 1,4-dihydro-4-oxo-1,8-naphthyridine-3-carboxylic acids.

Our 1,4-dihydro-4-oxo-1-substituted-1,8-naphthyridine-3-carboxylic acids and derivatives when containing a basic moiety, i.e., a lower-tertiary- or -secondary-amino moiety, for example, a 2-diethylaminoethyl ester, a 1-[3-(1-piperidyl)propyl] compound or a 7-(4-n-propylaminobutoxy) compound, are useful both in the free base form and in the form of acid-addition salts; and both forms are within the purview of the invention, and, in fact, are considered to be one and the same invention. The acid-addition salts are simply a more convenient form for use; and in practice, use of the salt form inherently amounts to use of the base form. The acids which can be used to prepare the acid-addition salts include preferably those which produce, when combined with the free base, medicinally acceptable salts, that is, salts whose anions are relatively innocuous to the animal organism in medicinal doses of the salts, so that the beneficial physiological or antibacterial properties inherent in the free base are not vitiated by side effects ascribable to the anions. In practicing our invention, we found it convenient to form the hydrochloride salts. However, other appropriate medicinally acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, and the like, giving the hydrobromide, hydriodide, nitrate, phosphate, sulfamate, acetate, citrate, tartrate, lactate, methanesulfonate, ethanesulfonate, benzenesulfonate, p-toluenesulfonate and quinate, respectively.

The acid-addition salts of said basic compounds are prepared either by dissolving the free base in aqueous or aqueous-alcohol solution containing the appropriate acid and isolating the salt by evaporating the solution, or by reacting the free base and acid in an organic solvent, in which case the salt separates directly or can be obtained by concentration of the solution.

Although medicinally acceptable salts of said basic compounds are preferred, all acid-addition salts are within the scope of our invention. All acid-addition salts are useful as sources of the free form even if the particular salt per se is desired only as an intermediate product as for example when the salt is formed only for purposes of purification or identification, or when it is used as an intermediate in preparing a medicinally acceptable salt by ion exchange procedures.

Also encompassed by our invention are quaternary-ammonium salts of the aforesaid compounds containing a lower-tertiary-amino moiety. These salts are useful for further identification of the aforesaid tertiary-amino compounds. The quaternary ammonium salts are obtained by the addition of esters having a molecular weight less than about 200 to the free base form of the compounds. A preferred class of esters comprises alkyl, alkenyl or aralkyl esters of inorganic acids or organic sulfonic acids, and include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesufonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like. The quaternary ammonium salts are prepared by mixing the free base and the alkyl, alkenyl or aralkyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

The molecular structures of the final products and intermediates of our invention are established by their mode of synthesis and confirmed by the correspondence of calculated and found values for the elementary analyses for representative examples and by infrared, ultraviolet and NMR spectral analyses.

Our 1-[Z-(aliphatic-hydrocarbyl)]-1,4-dihydro-4-oxo-1,8-naphthyridine-3-carboxylic acids and derivatives when tested according to standard in vitro bacteriological evaluation procedures possess antibacterial activity, for example, against organisms such as *Staphylococcus aureus, Eberthella typhi, Colstridium welchii*, as illustrated below in the examples. Preferred embodiments also were found to have significant in vivo activity against gram-negative bacteria, e.g., *Klebsiella pneumoniae, Salmonella typhimurium*, in mice when administered orally and/or subcutaneously at dose levels in the range of about 100 to 400 mg./kg./d. Embodiments were found to increase the hexobarbital-induced sleeping time in mice when administered intraperitoneally forty minutes before intraperitoneal administration of 40 mg./kg. of hexobarbital. Results in the following examples are given in terms of the number of animals caused to exhibit a loss of righting reflex for one minute or more at a given dose level, e.g., 200 mg./kg., or in terms of $ED_{50}$, i.e., the effective dose in mg./kg. that caused fifty percent of the animals to exhibit a loss of righting reflex for one minute or more. Positive results in this barbital-potentiating test indicate the compound tested has central nervous system depressant activity and is useful as a potentiator for barbiturates.

The following examples will further illustrate the invention without, however, limiting it thereto.

Example 1

1 - ethyl-1,4-dihydro-7-methyl-4-oxo-1,8-naphthyridine-3-carboxylic acid was prepared as follows: A mixture containing 11.6 g. of 4-hydroxy-7-methyl-1,8-naphthyridine-3-carboxylic acid, 11.1 g. of potassium hydroxide, 230 cc. ethanol (95% here and elsewhere unless otherwise indicated) and 81 cc. of water was refluxed until the solids dissolved. To this solution was added 28 cc. of ethyl iodide and the resulting mixture was refluxed for 5 days. The reaction mixture was cooled in an ice bath; and the resulting precipitate was collected, recrystallized from acetic acid, washed with water and dried in a vacuum oven (at about 70° C.) to yield 8.7 g. (66% yield) of the crystalline product, 1 - ethyl - 1,4-dihydro-7-methyl-4-oxo-1,8-naphthyridine-3-carboxylic acid, M.P. 226.8–230.2° C. (corr.).

*Analysis.*—Calcd. for $C_{12}H_{12}N_2O_3$: C, 62.05; H, 5.21; N, 12.06; N.E. (neutral equivalent), 232. Found: C, 62.12; H, 5.47; N, 11.92; N.E., 229.

The foregoing preparation was carried out using a shorter reaction period as follows: A warm solution containing 41 g. of 4-hydroxy-7-methyl-1,8-naphthyridine-3-carboxylic acid and 39 g. of potassium hydroxide in one liter of ethanol and 200 cc. of water was treated with 50 cc. of ethyl iodide and the resulting mixture was refluxed gently overnight, acidified with hydrochloric acid and cooled. The resulting precipitate was collected and recrystallized twice from acetonitrile to yield 26 g. (56% yield) of 1 - ethyl-1,4-dihydro-7-methyl-4-oxo-1,8-naphthyridine-3-carboxylic acid, M.P. 229–230° C.

1 - ethyl-1,4-dihydro-7-methyl-4-oxo-1,8-naphthyridine-3-carboxylic acid when tested according to standard in vitro bacteriological evaluation procedures was found to possess antibacterial activity, for example, as follows:

| Organism | Log reciprocal minimum effective concentration (mg./cc.) | |
| --- | --- | --- |
|  | Bacteriostatic | Bactericidal |
| Staphylococcus aureus | 4.3 | <3.3 |
| Eberthella typhi | 4.3 | 3.9 |
| Clostridium welchii | 4.6 | <3.3 |

1 - ethyl-1,4-dihydro-7-methyl-4-oxo-1,8-naphthyridine-3-carboxylic acid was found to have significant in vivo activity against *Klebsiella pneumoniae* in mice when administered orally or subcutaneously at dose levels as low as 100 mg./kg./d. and, also, against *Salmonella typhimurium* in mice when administered subcutaneously at dose level as low as 100 mg./kg./d. This compound when tested according to the procedure described hereinabove for potentiation of hexobarbital sleeping time in mice was found to have an $ED_{50}$ of less than 50 mg./kg. This same compound was found to have an acute oral toxicity ($LD_{50}$) in mice of 4000 mg./kg. after 24 hours and $3300\pm975$ after 7 days and an acute subcutaneous toxicity ($LD_{50}$) in mice of $500\pm52$ mg./kg.

Example 2

Sodium 1 - ethyl-1,4-dihydro-7-methyl-4-oxo-1,8-naphthyridine-3-carboxylate was prepared by warming on a steam bath a mixture of 6.9 g. of 1-ethyl-1,4-dihydro-7-methyl-4-oxo-1,8-naphthyridine-3-carboxylic acid, 1.1 g. of sodium hydroxide and 150 cc. of ethanol until dissolution resulted. The warm solution was filtered, the filtrate allowed to cool, and the solid collected and air-dried. There was thus obtained 7.5 g. of sodium 1-ethyl-1,4-dihydro-7-methyl - 4 - oxo - 1,8 - naphthyridine-3-carboxylate, M.P. 270.6–272.0° C. (corr.), with decomposition.

*Analysis.*—Calcd. for $C_{12}H_{11}N_2NaO_3$: N, 11.02; Na, 9.06. Found: $H_2O$, 5.95; N(dry basis), 10.68; Na(dry basis), 9.00.

Sodium 1 - ethyl-1,4-dihydro-7-methyl-4-oxo-1,8-naphthyridine-3-carboxylate was found to have significant in vivo activity against *Klebsiella pneumoniae* in mice when administered orally at dose levels as low as 100 mg./kg./d.

Example 3

Calcium 1 - ethyl-1,4-dihydro-7-methyl-4-oxo-1,8-naphthyridine-3-carboxylate was prepared as follows: To a solution containing 12 g. of 1-ethyl-1,4-dihydro-7-methyl-4-oxo-1,8-naphthyridine-3-carboxylic acid, 25 cc. of 10% aqueous potassium hydroxide solution and 300 cc. of water was added with stirring a solution containing 30 g. of calcium acetate dihydrate. The reaction mixture was stirred at room temperature for about 10 minutes; and the resulting precipitate was collected, washed with water and airdried. The solid was recrystallized once from methanol-water (4:1), a second time from methanol-water (5:1), and then air-dried to yield 5.5 g. of calcium di - (1 - ethyl - 1,4 - dihydro-7-methyl-4-oxo-1,8-naphthyridine-3-carboxylate), M.P. >300° C. (corr.).

*Analysis.*—Calcd. for $C_{24}H_{22}CaN_4O_6$: C, 57.40; H, 4.40; N, 11.14. Found: C, 57.16; H, 4.67; N, 11.35.

Calcium di - (1 - ethyl - 1,4-dihydro-7-methyl-4-oxo-1,8-naphthyridine-3-carboxylate) was found to have significant in vivo activity against *Klebsiella pneumoniae* in mice when administered orally at a dose level as low as 100 mg./kg./d. This same compound when tested according to the procedure described hereinabove for potentiation of hexobarbital sleeping time in mice was found to have an $ED_{50}$ of $120\pm20$ mg./kg.

Example 4

1,7 - dimethyl - 1,4-dihydro-4-oxo-1,8-naphthyridine-3-carboxylic acid was prepared following the procedure described in Example 1 using 20.4 g. of 4-hydroxy-7-methyl-1,8-naphthyridine-3-carboxylic acid, 49 g. of potassium hydroxide, 400 cc. of ethanol, 140 cc. of water, 55 cc. of methyl iodide and a reflux period of 5 days. The reaction mixture was cooled in an ice bath and the solid that separated was collected, washed twice with acetone and dried in a vacuum oven (about 70° C.). The solid was dissolved in water, boiled with decolorizing charcoal and filtered. The filtrate was acidified with concentrated hydrochloric acid and the resulting white precipitate was collected and recrystallized twice from dimethylformamide to yield 11.0 g. of 1,7-dimethyl-1,4-dihydro-4-oxo-1,8-naphthyridine-3-carboxylic acid, M.P. >300° C. (corr.).

*Analysis.*—Calcd. for $C_{11}H_{10}N_2O_3$: N, 12.84; N.E., 218. Found: N, 12.71; N.E., 219.

1,7 - dimethyl - 1,4 - dihydro-4-oxo-1,8-naphthyridine-3-carboxylic acid when tested according to standard in vitro bacteriological evaluation procedures was found to possess antibacterial activity, for example, to have bacteriostatic (Bs) and bactericidal (Bc) values given here and hereinafter as log reciprocal minimum effective concentrations, mg./cc.) of 4.0 and 3.12, respectively, against *Clostridium welchii*.

Example 5

7 - methyl - 1,4 - dihydro-4-oxo-1-n-propyl-1,8-naphthyridine-3-carboxylic acid was prepared following the procedure described in Example 1 using 20.4 g. of 4-hydroxy-7-methyl-1,8-naphthyridine - 3 - carboxylic acid, 19.5 g. of potassium hydroxide, 400 cc. of ethanol, 140 cc. of water, 40 cc. of n-propyl iodide and a reflux period of 6 days. The reaction mixture was cooled and the solid that separated was collected and recrystallized from ethanol to yield 17.7 g. (72%) of 7-methyl-1,4-dihydro-4-oxo-1-n-propyl-1,8-naphthyridine - 3 - carboxylic acid, M.P. 209.4–210.2° C. (corr.).

*Analysis.*—Calcd. for $C_{13}H_{14}N_2O_3$: C, 63.40; H, 5.73; N, 11.38. Found: C, 63.67; H, 5.87; N, 11.25.

7 - methyl - 1,4 - dihydro-4-oxo-1-n-propyl-1,8-naphthyridine - 3 - carboxylic acid when tested according to standard in vitro bacteriological evaluation procedures was found to possess antibacterial activity, for example, to have Bs and Bc values, respectively, of 4.3 and <3.0 against *Staphylococcus aureus*, of 5.0 and 3.6 against *Eberthella typhi* and of 5.0 and 4.0 against *Clostridium welchii*. This same compound was found to have significant in vivo activity against *Klebsiella pneumoniae* in mice when administered orally or subcutaneously at a dose level as low as 100 mg./kg./d. and, also, against *Salmonella typhimurium* in mice when administered orally at a dose level as low as 200 mg./kg./d.

Example 6

1 - n - butyl - 1,4-dihydro-7-methyl-4-oxo-1,8-naphthyridine-3-carboxylic acid was prepared following the procedure described in Example 1 using 20.4 g. of 4-hydroxy-7-methyl-1,8-naphthyridine - 3 - carboxylic acid, 19.5 g. of potassium hydroxide, 400 cc. of ethanol, 140 cc. of water, 40 cc. of n-butyl bromide and a reflux period of 5 days. The reaction mixture was cooled in an ice bath and the resulting precipitate was collected, washed with acetone and recrystallized twice from ethanol to yield about 14 g. of the product, a 1-n-butyl-1,4-dihydro-7-methyl-4-oxo-1,8-naphthyridine-3-carboxylic acid, M.P. 220.4–222.0° C. (corr.).

*Analysis.*—Calcd. for C₁₄H₁₆N₂O₃: N, 10.77; N.E. 260. Found: N, 10.69; N.E., 258.

1 - n - butyl - 1,4-dihydro-7-methyl-4-oxo-1,8-naphthyridine-3-carboxylic acid when tested according to standard in vitro bacteriological evaluation procedures was found to prossess antibacterial activity, for example, to have Bs and Bc values (as defined hereinabove) of 3.6 and 3.12 against *Eberthella typhi.*

Example 7

1 - isobutyl - 1,4 - dihydro-7-methyl-4-oxo-1,8-naphthyridine-3-carboxylic acid was prepared following the procedure described in Example 1 using 20.4 g. of 4-hydroxy-7-methyl-1,8-naphthyridine - 3 - carboxylic acid, 24.5 g. of potassium hydroxide, 400 cc. of ethanol, 140 cc. of water, 45 cc. of isobutyl iodide and a reflux period of 8 days. The reaction mixture was chilled in an ice bath and the solid that separated was collected. The filtrate was acidified with hydrochloric acid, the mixture chilled in an ice bath, and the resulting precipitate collected. The two solid portions were combined and recrystallized three times from acetic acid to yield 7.8 g. of 1 - isobutyl - 1,4-dihydro-7-methyl-4-oxo-1,8-naphthyridine - 3 - carboxylic acid, M.P. 234.8–236.8° C. (corr.).

*Analysis.*—Calcd. for C₁₄H₁₆N₂O₃: N, 10.68; N.E. 268. Found: N, 10.77; N.E., 260.

1 - isobutyl - 1,4 - dihydro-7-methyl-4-oxo-1,8-naphthyridine-3-carboxylic acid when tested according to standard in vitro bacteriological evaluation procedures was found to possess antibacterial activity, for example, to have Bs and Bc values, respectively, of 4.3 and 3.6 against *Staphylococcus aureus,* of 4.3 and 3.3 against *Eberthella typhi* and of 4.6 and 3.0 against *Clostridium welchii.* This same compound when tested as described above was found to potentiate hexobarbital sleeping time in three out of six mice at a dose level of 200 mg./kg.

Example 8

7 - methyl-1,4-dihydro-4-oxo-1-n-pentyl-1,8-naphthyridine-3-carboxylic acid was prepared following the procedure described in Example 1 using 20.4 g. of 4-hydroxy-7-methyl - 1,8-naphthyridine-3-carboxylic acid, 19.5 g. of potassium hydroxide, 400 cc. of ethanol, 140 cc. of water, 40 cc. of n-pentyl iodide and a reflux period of 5 days. The reaction mixture was cooled in an ice bath and the resulting precipitate was collected and recrystallized twice from isopropyl alcohol, the second time using decolorizing charcoal. There was thus obtained 4.1 g. of 7-methyl-1,4-dihydro - 4 - oxo-1-n-pentyl - 1,8-naphthyridine-3-carboxylic acid, M.P. 171.4—172.8° C. (corr.).

*Analysis.*—Calcd. for C₁₅H₁₈N₂O₃: C, 65.69; H, 6.62; N, 10.18. Found: C, 66.01; H, 6.57; N, 10.15.

7-methyl-1,4-dihydro - 4 - oxo - 1 - n-pentyl-1,8-naphthyridine - 3 - carboxylic acid when tested according to standard in vitro bacteriological evaluation procedures was found to possess antibacterial activity, for example, to have Bs and Bc values, respectively, of 4.12 and 3.12 against *Staphylococcus aureus* and of 4.12 and 3.3 against *Clostridium welchii.*

Example 9

1-n-hexyl-1,4-dihydro - 7 - methyl - 4 - oxo - 1,8-naphthyridine-3-carboxylic acid was prepared following the procedure described in Example 1 using 20.4 g. of 4-hydroxy-7-methyl - 1,8-naphthyridine-3-carboxylic acid, 19.5 g. of potassium hydroxide, 400 cc. of ethanol, 140 cc. of water, 40 cc. of n-hexyl iodide and a reflux period of 5 days. The reaction mixture (pH 6.4) was made more acidic with concentrated hydrochloric acid and chilled in an ice bath. The resulting precipitate was collected and recrystallized twice from isopropyl alcohol, the second time using decolorizing charcoal. There was thus obtained 8.6 g. of the product, 1-n-hexyl-1,4-dihydro-7-methyl - 4-oxo-1,8-naphthyridine - 3 - carboxylic acid, a pale yellow solid, M.P. 146.2–148.2° C. (corr.).

*Analysis.*—Calcd. for C₁₆H₂₀N₂O₃: C, 66.64; H, 6.99; N, 9.72. Found: C, 66.93; H, 6.88; N, 9.60.

1-n-hexyl-1,4-dihydro - 7 - methyl - 4 - oxo - 1,8-naphthyridine - 3 - carboxylic acid when tested according to standard in vitro bacteriological evaluation procedures was found to possess antibacterial activity, for example, to have Bs and Bc values, respectively, of 4.6 and 3.0 against *Staphylococcus aureus,* 5.0 and 4.12 against *Clostridium welchii* and of 4.12 and 4.12 against *Mycobacterium tuberculosis.*

Example 10

1-n-decyl - 1,4-dihydro - 7 - methyl - 4 - oxo-1,8-naphthyridine-3-carboxylic acid was prepared following the procedure described in Example 1 using 10.2 g. of 4-hydroxy-7-methyl - 1,8 - naphthyridine - 3 - carboxylic acid, 9.8 g. of potassium hydroxide, 200 cc. ethanol, 70 cc. of water, 20 cc. n-decyl bromide, 1 g. of potassium iodide and a reflux period of 6 days. The reaction mixture was acidified with concentrated hydrochloric acid and chilled in an ice bath. The resulting precipitate was collected, recrystallized once from ethanol using decolorizing charcoal and a second time from ethanol to yield 5.8 g. of the product, 1-n-decyl-1,4-dihydro - 7 - methyl - 4 - oxo-1,8-naphthyridine - 3 - carboxylic acid, M.P. 129.2–130.4° C. (corr.).

*Analysis.*—Calcd. for C₂₀H₂₈N₂O₃: C, 69.74; H, 8.19; N, 8.13. Found: C, 70.19, 69.86; H, 8.04, 8.00; N, 8.21.

Example 11

5,7-dimethyl - 1 - ethyl - 1,4-dihydro-4-oxo-1,8-naphthyridine - 3 - carboxylic acid was prepared by refluxing for 4 hours a mixture containing 21.8 g. of 5,7-dimethyl-4-hydroxy-1,8-naphthyridine-3-carboxylic acid, 120 cc. of 10% aqueous potassium hydroxide solution, 300 cc. of ethanol and 25 cc. of ethyl iodide. The reaction mixture was made acidic and the resulting precipitate was collected, recrystallized from acetic acid-water and then from acetic acid to yield 10.6 g. of 5,7-dimethyl - 1 - ethyl-1,4-dihydro-4-oxo-1,8-naphthyridine-3-carboxylic acid, as yellow needles, M.P. 243.6–244.8° C. (corr.).

*Analysis.*—Calcd. for C₁₃H₁₄N₂O₃: N, 11.38; N.E., 246. Found: N, 11.11; N.E., 240.

5,7-dimethyl-1-ethyl-1,4-dihydro - 4 - oxo - 1,8-naphthyridine - 3 - carboxylic acid when tested according to standard in vitro bacteriological evaluation procedures was found to possess antibacterial activity, for example to have Bs and Bc values, respectively, of 4.6 and 3.12 against *Eberthella typhi,* of 5.3 and 3.6 against *Clostridium welchii* and of 4.0 and 3.6 against *Mycobacterium tuberculosis.*

The intermediate 5,7-dimethyl - 4 - hydroxy - 1,8-naphthyridine-3-carboxylic acid was prepared in several steps starting with 2-amino-4,6-dimethylpyridine as follows: A mixture containing 92 g. of 2-amino-4,6-dimethylpyridine and 166 g. of ethoxymethylenemalonic ester was heated for 2 hours on a steam bath. The ethanol formed by the reaction was distilled off in vacuo and the remaining material was poured into an evaporating dish and cooled. The resulting solid was recrystallized two times from ethanol to yield 170 g. of diethyl N-(4-6 - dimethyl - 2 - pyridyl) aminomethylenemalonate, M.P. 96.8–98.6° C. (corr.).

*Analysis.*—Calcd. for C₁₅H₂₀N₂O₄: C, 61.62; H, 6.90; N, 9.59. Found: C, 61.52; H, 7.07; N, 9.55.

A mixture containing 29.2 g. of diethyl N-(4,6-dimethyl-2-pyridyl)aminomethylenemalonate and 180 cc. of Dowtherm A (eutectic mixture of diphenyl and diphenyl ether) was refluxed for about 30 minutes and allowed to cool. The solid that separated was collected, washed with benzene and recrystallized from ethanol using decolorizing charcoal. There was thus obtained, as a yellow solid, ethyl 5,7-dimethyl - 4 - hydroxy - 1,8-naphthyridine-3-carboxylate, M.P. 235.8–236.6° C. (corr.).

*Analysis.*—Calcd. for C₁₃H₁₄N₂O₃: C, 63.40; H, 5.73; N, 11.38. Found: C, 63.66; H, 5.75; N, 11.16.

A mixture containing 49 g. of ethyl 5,7-dimethyl-4-hydroxy-1,8-naphthyridine-3-carboxylate, 450 cc. of 10% aqueous potassium hydroxide solution and 250 cc. of ethanol was heated on a steam bath for about 2 hours after which the volume of the reaction mixture had been reduced to about 500 cc. The resulting solution was poured into a solution containing 150 cc. of 6 N hydrochloric acid and about 1 liter of water. The yellow solid that separated was collected and washed successively with water, ethanol and ether, and then dried in vacuo at 60° C. to yield 45 g. of 5,7-dimethyl - 4 - hydroxy-1,8-naphthyridine - 3 - carboxylic acid, a yellow solid, M.P. 285° C. with decomposition.

Example 12

6-bromo - 1 - ethyl-1,4-dihydro - 7 - methyl-4-oxo-1,8-naphthyridine-3-carboxylic acid was prepared as follows: A mixture containing 14.2 g. of 6-bromo-4-hydroxy-7-methyl-1,8-naphthyridine-3-carboxylic acid, 9.8 g. of potassium hydroxide, 230 cc. of ethanol and 80 cc. of water was refluxed until the solids dissolved. To this solution was added 20 cc. of ethyl iodide and the resulting reaction mixture was refluxed on a steam bath for 19 hours. The reaction mixture was then cooled in an ice bath and the resulting precipitate was collected, washed with acetone, recrystallized from dimethylformamide, washed with acetone and dried in a vacuum oven (70° C.) to yield 10.7 g. of 6 - bromo-1-ethyl-1,4-dihydro-7-methyl-4-oxo-1,8-naphthyridine-3-carboxylic acid, M.P. 279.6–280° C. (corr.) with decomposition.

Analysis.—Calcd. for $C_{12}H_{11}BrN_2O_3$: Br, 25.69; N, 9.00. Found: Br, 25.50; N, 9.28.

6-bromo - 1 - ethyl-1,4-dihydro - 7 - methyl-4-oxo-1,8-naphthyridine-3-carboxylic acid when tested according to standard in vitro bacteriological evaluation procedures was found to possess antibacterial activity, for example, to have Bs and Bc values, respectively, of 4.6 and 3.0 against *Staphylococcus aureus*, of 4.12 and 3.6 against *Eberthella typhi* and of 4.6 and 3.3 against *Clostridium welchii*.

The intermediate 6-bromo-4-hydroxy - 7 - methyl-1,8-naphthyridine-3-carboxylic acid was prepared in several steps starting with 6-amino-3-bromo-2-methylpyridine as follows: A mixture containing 91.4 g. of 6-amino-3-bromo-2-methylpyridine and 105.5 g. of diethyl ethoxymethylenemalonate was heated under vacuum on a steam bath overnight (about 15 hours). The reaction mixture, which had solidified to a yellow solid, was recrystallized from ethanol to yield 121.5 g. of diethyl N-(5-bromo-6-methyl-2-pyridyl)aminomethylenemalonate, M.P. 133–134.5° C. For analysis a 20 gram portion was recrystallized a second time from 95% ethanol and dried in a vacuum oven whereupon there was obtained 18.3 g. of the white crystalline product having the same melting point, the corrected melting point being 130.8–132.6° C.

Analysis.—Calcd. for $C_{14}H_{17}BrN_2O_4$: Br, 22.37; N, 7.85. Found: Br, 22.50; N, 7.94.

Dowtherm A (700 cc.) was heated to reflux with stirring and to it was added 101.4 g. of diethyl N-(5-bromo-6-methyl-2-pyridyl)aminomethylenemalonate dissolved in 200 cc. of warm Dowtherm A. The reaction mixture was then refluxed for 2 hours, allowed to cool and then allowed to stand overnight at room temperature. The solid that separated was collected and washed successively with n-pentane and acetone, dried in an oven at about 80° C. and recrystallized from dimethylformamide using decolorizing charcoal to yield 26.8 g. of ethyl 6-bromo-4-hydroxy-7-methyl-1,8-naphthyridine - 3 - carboxylate, M.P. 288–289° C. with decomposition.

The foregoing ester was hydrolyzed to the corresponding acid as follows: A mixture containing 26.8 g. of ethyl 6-bromo - 4 - hydroxy - 7 - methyl - 1,8 - naphthyridine-3-carboxylate and 145 cc. of 10% aqueous potassium hydroxide solution was refluxed for 2 hours and then allowed to stand at room temperature overnight. The reaction mixture was then brought to boiling and filtered to remove a small amount of tan solid. The filtrate was cooled and acidified with hydrochloric acid to yield a copious pale yellow precipitate. The mixture was chilled in an ice bath and the yellow solid was collected, washed with water and dried to yield 21.0 g. of 6-bromo-4-hydroxy-7-methyl-1,8-naphthyridine-3-carboxylic acid, M.P. 294–296° C. with decomposition.

Example 13

6-bromo - 5,7 - dimethyl-1-ethyl-1,4-dihydro - 4 - oxo-1,8-naphthyridine-3-carboxylic acid was prepared as follows: A mixture containing 31 g. of ethyl 6-bromo-5,7-dimethyl-4-hydroxy-1,8-naphthyridine - 3 - carboxylate, 98 cc. of 10% aqueous potassium hydroxide solution, 400 cc. of ethanol, 500 cc. of water and 15 cc. of ethyl iodide was refluxed for 3 hours. An addtional 1 liter of ethanol, 1 liter of water, 50 cc. of 10% aqueous potassium hydroxide solution and about 10 cc. of ethyl iodide were added and refluxing was continued for an additional 2 hours. The reaction mixture was then poured into 1 liter of water containing 100 cc. of 6 N hydrochloric acid. The finely divided precipitate that separated was collected, dried in a vacuum oven at 60° C. for about 4 hours and then recrystallized from dimethylformamide to yield 20.5 g. of 6-bromo-5,7-dimethyl-1-ethyl-1,4-dihydro-4-oxo-1,8-naphthyridine-3-carboxylic acid, M.P. 235.2–237.8° C. (corr.).

Analysis.—Calcd. for $C_{13}H_{13}BrN_2O_3$: Br, 24.58; N, 8.61. Found: Br, 24.40; N, 8.87.

The intermediate ethyl 6-bromo-5,7-dimethyl-4-hydroxy-1,8-naphthyridine-3-carboxylate was prepared in several steps starting with 6-amino-3-bromo-2,4-dimethylpyridine as follows: A mixture of 84.5 g. of 6-amino-3-bromo-2,4-dimethylpyridine and 93 g. of diethyl ethoxymethylenemalonate was heated on a steam bath for 1 hour. To the reaction mixture, which had caked, was added about 500 cc. of ethanol and the resulting mixture was refluxed and then allowed to cool to room temperature. The solid that separated was collected and washed with ethanol. There was thus obtained 125 g. of diethyl N-(5-bromo-4,6 - dimethyl-2-pyridyl)aminomethylenemalonate, M.P. 134–135.5° C. A 19 gram sample was recrystallized from ethanol to yield 17 g. of the product having the same melting point, the corrected M.P. being 132.6–133.4° C.

Analysis.—Calcd. for $C_{15}H_{19}BrN_2O_4$: Br, 21.53; N, 7.55. Found: Br, 21.53; N, 7.60.

A mixture containing 45 g. of diethyl N-(5-bromo-4,6-dimethyl-2-pyridyl)aminomethylenemalonate and 360 cc. of Dowtherm A was refluxed with stirring at the temperature of 250–252° C. Refluxing was continued for about 75 minutes and the ethanol formed by the reaction was removed by distillation. The cooled reaction mixture was filtered and the solid thus obtained was washed with benzene and n-pentane to yield 31 g. of the product. The 31 g. of product was combined with a 27 g. portion obtained in another run and the mixture was recrystallized from dimethylformamide and subsequently triturated with ethanol and dried to yield 48 g. of product, ethyl 6-bromo-5,7-dimethyl - 4 - hydroxy - 1,8 - naphthyridine-3-carboxylate, M.P. 282.0–284° C. (corr.) with decomposition.

Analysis.—Calcd. for $C_{13}H_{13}BrN_2O_3$: Br, 24.58; N, 8.62. Found: Br, 24.30; N, 8.66.

6-bromo - 5,7 - dimethyl-1-ethyl-1,4-dihydro-4-oxo-1,8-naphthyridine-3-carboxylic acid when tested according to standard in vitro bacteriological evaluation procedures was found to possess antibacterial activity, for example, to have Bs and Bc values, respectively, of 5.3 and 4.12 against *Staphylococcus aureus*, of 4.3 and 3.12 against *Eberthella typhi* and of 5.12 and 3.3 against *Clostridium welchii*.

Example 14

1-ethyl - 1,4 - dihydro-7-methyl - 4 - oxo-1,8-naphthyridine-3-carboxylic acid hydrazide was prepared as follows:

A mixture of 17 g. of ethyl 1-ethyl - 1,4 - dihydro-7-methyl-4-oxo-1,8-naphthyridine - 3 - carboxylate and 75 cc. of hydrazine hydrate was heated on a steam bath for about 15 minutes, cooled and allowed to stand at room temperature overnight. The reaction mixture was then heated to near boiling for about 5 minutes and cooled; the resulting precipitate was collected, recrystallized twice from isopropyl alcohol, the second time using decolorizing charcoal, and air-dried to yield 14 g. of the product, 1-ethyl-1,4-dihydro - 7 - methyl-4-oxo-1,8-naphthyridine-3-carboxylic acid hydrazide, M.P. 184.2–186.0° C. (corr.).

*Analysis.*—Calcd. for $C_{12}H_{14}N_4O_2$: C, 58.50; H, 5.74; N, 22.76. Found: C, 58.40; H, 5.72; N, 23.03.

1-ethyl - 1,4 - dihydro-7-methyl - 4 - oxo-1,8-naphthyridine-3-carboxylic acid hydrazide when tested as described above for potentiation of hexobarbital sleeping time in mice was found to have an $ED_{50}$ of $65 \pm 11$ mg./kg.

Example 15

1-ethyl - 1,4 - dihydro-7-methyl - 4 - oxo-1,8-naphthyridine-3-carboxamide was prepared as follows: A reaction mixture containing 7.5 g. of 1-ethyl-1,4-dihydro-7-methyl-4-oxo-1,8-naphthyridine-3-carboxylic acid hydrazide, 80 g. of Raney nickel and 150 cc. of ethanol was refluxed on a steam bath for 4 hours, and then allowed to cool to room temperature and stand overnight. The reaction mixture was heated to boiling, the catalyst filtered off, and the filtrate evaporated to dryness. The resulting crystalline material was recrystallized from acetic acid-water (1:1) and washed with acetone to yield 3 g. of the product, 1-ethyl - 1,4 - dihydro-7-methyl-4-oxo-1,8-naphthyridine-3-carboxamide, M.P. 244.8–246.4° C.

*Analysis.*—Calcd. for $C_{12}H_{13}N_3O_2$: C, 62.36; H, 5.66; N, 18.16. Found: C, 62.23; H, 5.60; N, 17.90.

1-ethyl - 1,4 - dihydro-7-methyl-4-oxo-1,8-naphthyridine-3-carboxamide was found to have significant in vivo activity against *Klebsiella pneumoniae* in mice when administered subcutaneously at a dose level of 200 mg./kg./d.

Example 16

Ethyl 1-ethyl - 1,4 - dihydro-7-methyl - 4 - oxo-1,8-naphthyridine-3-carboxylate was prepared as follows: A 6.9 g. portion of sodium was dissolved in 300 cc. of absolute ethanol (to produce a solution of sodium ethoxide in ethanol) and to the resulting solution was added 23.2 g. of ethyl 4-hydroxy-7-methyl-1,8-naphthyridine-3-carboxylate. The reaction mixture was brought to reflux on a steam bath and to the resulting suspension was added 35 cc. of ethyl iodide. The resulting reaction mixture was refluxed for 16 hours and chilled in an ice bath; and, when no solid separated, it was evaporated to about one-third its volume on a steam bath under reduced pressure, acidified, diluted and shaken well with four volumes of water, and filtered. The solid that separated from the filtrate was collected and recrystallized three times from ethyl acetate, the second time using decolorizing charcoal. There was thus obtained 7.0 g. of the product, ethyl 1-ethyl-1,4-dihydro-7-methyl - 4 - oxo-1,8-naphthyridine-3-carboxylate, M.P. 120.8–121.6° C. (corr.).

*Analysis.*—Calcd. for $C_{14}H_{16}N_2O_3$: C, 64.60; H, 6.19; N, 10.77. Found: C, 64.58; H, 6.03; N, 10.93.

n-Butyl 1 - ethyl - 1,4 - dihydro - 7 - methyl-4-oxo-1,8-naphthyridine-3-carboxylate was found to have significant in vivo activity against *Klebsiella pneumoniae* in mice when administered orally or subcutaneously at dose levels as low as 100 mg./kg./d.

Example 17 n-butyl 1-ethyl - 1,4 - dihydro - 7 - methyl-4-oxo-1,8-naphthyridine-3-carboxylate was prepared as follows: A mixture containing 13 g. of ethyl 1-ethyl-1,4-dihydro-7-methyl-4-oxo-1,8-naphthyridine-3-carboxylate, 25 cc. of n-butanol and 0.3 g. of sodium methoxide was heated in an oil bath at about 122–125° C. for a period of 48 hours. The reaction mixture was then cooled, filtered, and the filtrate concentrated in vacuo to remove the solvent. The remaining reaction mixture solidified on cooling. The solid was collected and recrystallized from cyclohexane using decolorizing charcoal. The air-dried product, n-butyl 1-ethyl - 1,4 - dihydro-7-methyl - 4 - oxo-1,8-naphthyridine-3-carboxylate, M.P. 98.0–99.4° C. (corr.), weighed 8.8 g. (61% yield).

*Analysis.*—Calcd. for $C_{16}H_{20}N_2O_3$: C, 66.66; H, 6.98; N, 9.71. Found: C, 66.49; H, 6.72; N, 9.64.

n-Butyl 1-ethyl - 1,4 - dihydro - 7 - methyl-4-oxo-1,8-naphthyridine-3-carboxylate when tested as described above was found to potentiate hexobarbital sleeping time in six out of six mice at a dose level of 200 mg./kg. This same compound was found to have significant in vivo activity against *Klebsiella pneumoniae* in mice when administered orally at a dose level of 100 mg./kg./d.

Example 18

1,3-dimethylbutyl 1-ethyl - 1,4 - dihydro-7-methyl-4-oxo-1,8-naphthyridine-3-carboxylate was prepared as follows: A mixture containing 11 g. of ethyl 1-ethyl-1,4-dihydro-7-methyl - 4 - oxo-1,8-naphthyridine-3-carboxylate, 25 cc. of 4-methyl-2-pentanol and 0.1 g. of sodium methoxide was heated for about 16 hours in an oil bath kept at about 130–135° C. The reaction mixture was cooled, filtered, and concentrated in vacuo to remove the solvent. The resulting solidified reaction mixture was recrystallized twice from cycloehxane, once from di-isopropyl ether, washed with n-pentane and dried in vacuo at 70° C. to yield 6.5 g. of product, 1,3-dimethylbutyl 1-ethyl-1,4-dihydro-7-methyl - 4 - oxo-1,8-naphthyridine-3-carboxylate, M.P. 114.6–119.4° C. (corr.).'

*Analysis.*—Calcd. for $C_{18}H_{24}N_2O_3$: C, 68.36; H, 7.64; N, 8.84. Found: C, 68.68; H, 7.25; N, 8.87.

1,3-dimethylbutyl 1-ethyl - 1,4 - dihydro - 7 - methyl-4-oxo-1,8-naphthyridine-3-carboxylate when tested as described above for potentiation of hexobarbital sleeping time in mice was found to have an $ED_{50}$ of $152 \pm 28$ mg./kg. This same compound was found to have significant in vivo activity against *Klebsiella pneumoniae* in mice when administered orally at a dose level of 100 mg./kg./d.

Example 19

2-dimethylaminoethyl 1-ethyl - 1,4 - dihydro-7-methyl-4-oxo-1,8-naphthyridine-3-carboxylate was prepared as follows: A mixture containing 11 g. of ethyl 1-ethyl-1,4-dihydro-7-methyl-4-oxo-1,8-naphthyridine-3 - carboxylate, 25 cc. of 2-dimethylaminoethanol and 0.1 g. of sodium methoxide was heated in an oil bath kept at about 135–140° C. for about 16 hours. The reaction mixture was concentrated in vacuo to remove the solvent and remaining oily material was taken up in chloroform. The chloroform solution was washed twice with water, dried over anhydrous potassium carbonate, treated with decolorizing charcoal, filtered, and concentrated in vacuo to remove the chloroform. The remaining oily material was dissolved in 40 cc. of acetonitrile; to this solution was added 6 cc. of 15% ethanolic hydrogen chloride; and the resulting mixture was cooled. The solid that separated was collected and recrystallized once from acetonitrile and once from isopropyl alcohol. There was thus obtained 3 g. of product, 2-dimethylaminoethyl 1-ethyl - 1,4 - dihydro-7-methyl-4-oxo-1,8-naphthyridine-3-carboxylate in the form of its hydrochloride, M.P. 228.6–230.2° C. (corr.).

*Analysis.*—Calcd. for $C_{16}H_{21}N_3O_3 \cdot HCl$: C, 56.52; H, 6.52; Cl, 10.44. Found: C, 56.38; H, 6.55; Cl, 10.49.

2-dimethylaminoethyl 1-ethyl-1,4-dihydro - 7 - methyl-4-oxo-1,8-naphthyridine - 3 - carboxylate hydrochloride when tested as described above was found to potentiate hexobarbital sleeping time in four out of six mice at a dose level of 200 mg./kg. This same compound was found to have significant in vivo activity against *Klebsiella pneumoniae* in mice when administered orally at a dose level of 200 mg./kg./d. or at a dose level of 100 mg./kg./d.

Example 20

1-benzyl-1,4-dihydro-7-methyl-4-oxo-1,8-naphthyridine-3-carboxylic acid was prepared following the procedure described in Example 1 using 13.3 g. of 4-hydroxy-7-methyl-1,8-naphthyridine-3-carboxylic acid, 12.7 g. of potassium hydroxide, 250 cc. of ethanol, 100 cc. of water, 25 cc. of benzyl chloride and a reflux period of 16 hours. There was thus obtained 7.5 g. of the product, 1-benzyl-1,4-dihydro-7-methyl-4-oxo-1,8-naphthyridine-3-carboxylic acid, M.P. 255.2–256.8° C. (corr.) after triturating the crude reaction mixture with boiling water and then recrystallizing it from acetic acid using decolorizing charcoal.

*Analysis.*—Calcd. for $C_{17}H_{14}N_2O_3$: N, 9.52; N.E., 294. Found: N, 9.41; N.E., 286.

1-benzyl-1,4-dihydro-7-methyl-4-oxo-1,8-naphthyridine-3-carboxylic acid when tested according to standard in vitro bacteriological evaluation procedures was found to possess antibacterial activity, for example, to have B$s$ and B$c$ values, respectively, of 4.3 and 3.6 against *Staphylococcus aureus* and of 4.0 and 3.3 against *Clostridium welchii*.

Example 21

1-(2-chlorobenzyl)-1,4-dihydro-7-methyl-4-oxo-1,8-naphthyridine-3-carboxylic acid was prepared following the procedure described in Example 1 using 12.2 g. of 4-hydroxy-7-methyl-1,8-naphthyridine-3-carboxylic acid, 11.7 g. of potassium hydroxide, 230 cc. of ethanol, 95 cc. of water, 19.3 g. of 2-chlorobenzyl chloride and a reflux period of 6 hours. The reaction mixture was allowed to stand at room temperature over the weekend and then cooled in an ice bath. The solid that separated was collected, recrystallized from acetic acid, washed with acetone and dried in a vacuum oven (70° C.) to yield 11.8 g. of the product, 1-(2-chlorobenzyl)-1,4-dihydro-7-methyl-4-oxo-1,8-naphthyridine-3-carboxylic acid, M.P. 219.6–222.0° C. (corr.) with decomposition.

*Analysis.*—Calcd. for $C_{17}H_{13}ClN_2O_3$: Cl, 10.79; N, 8.52. Found: Cl, 11.00; N, 8.34.

1-(2-chlorobenzyl)-1,4-dihydro-7-methyl-4-oxo-1,8-naphthyridine-3-carboxylic acid when tested according to standard in vitro bacteriological evaluation procedures was found to possess antibacterial activity, for example, to have B$s$ and B$c$ values, respectively, of 5.0 and 3.3 against *Staphylococcus aureus*, of 3.3 and 3.0 against *Eberthella typhi* and of 4.6 and 3.3 against *Clostridium welchii*.

Example 22

1-(3,4-dichlorobenzyl)-1,4-dihydro-7-methyl-4-oxo-1,8-naphthyridine-3-carboxylic acid was prepared following the procedure described in Example 1 using 12.2 g. of 4-hydroxy-7-methyl-1,8-naphthyridine-3-carboxylic acid, 11.7 g. of potassium hydroxide, 230 cc. of ethanol, 95 cc. of water, 23.4 g. of 3,4-dichlorobenzyl chloride and a reflux period of 5 hours. There was thus obtained 11.1 g. (51% yield) of the product, 1-(3,4-dichlorobenzyl)-1,4-dihydro-7-methyl-4-oxo-1,8-naphthyridine-3-carboxylic acid, M.P. 261.6–263.6° C. (corr.) when recrystallized from acetic acid containing ethanolic hydrogen chloride and using decolorizing charcoal.

*Analysis.*—Calcd. for $C_{17}H_{12}Cl_2N_2O_3$: Cl, 19.53; N, 7.72. Found: Cl, 19.81; N, 7.71.

Example 23

7-methyl-1,4-dihydro-1-(1-naphthylmethyl)-4-oxo-1,8-naphthyridine-3-carboxylic acid was prepared following the procedure described in Example 1 using 12.2 g. of 4-hydroxy-7-methyl-1,8-naphthyridine-3-carboxylic acid, 11.7 g. of potassium hydroxide, 230 cc. of ethanol, 95 cc. of water, 21.2 g. of 1-chloromethylnaphthalene and a reflux period of 6 hours. There was thus obtained 7.0 g. of product, 7-methyl-1,4-dihydro-1-(1-naphthylmethyl)-4-oxo-1,8-naphthyridine-3-carboxylic acid, M.P. 244.6–246.2° C. (corr.) when recrystallized from acetic acid using decolorizing charcoal.

*Analysis.*—Calcd. for $C_{21}H_{16}N_2O_3$: C, 73.25; H, 4.68; N, 8.13. Found: C, 73.50; H, 4.56; N, 7.99.

Example 24

1-2-cyclohexylethyl)-1,4-dihydro-7-methyl-4-oxo-1,8-naphthyridine-3-carboxylic acid was prepared as follows: A mixture containing 20.4 g. of 4-hydroxy-7-methyl-1,8-naphthyridine-3-carboxylic acid, 19.5 g. of potassium hydroxide, 385 cc. of ethanol, 150 cc. of water and 40 cc. of 2-cyclohexylethyl bromide was refluxed on a steam bath for about 18 hours. To the basic reaction mixture was added 25 cc. of 22% ethanolic hydrogen chloride; the acidic mixture was cooled in an ice bath; and the resulting precipitate was collected, washed with water, dried in a vacuum oven at 65° C., and recrystallized from absolute ethanol to yield 21.6 g. (69%) of the product, 1-(2-cyclohexylethyl)-1,4-dihydro-7-methyl-4-oxo-1,8-naphthyridine-3-carboxylic acid, M.P. 186.0–187.0° C. (corr.).

*Analysis.*—Calcd. for $C_{18}H_{22}N_2O_3$: C, 68.76; H, 7.05; N, 8.91. Found: C, 69.06; H, 6.80; N, 9.01.

1-(2-cyclohexylethyl)-1,4-dihydro-7-methyl-4-oxo-1,8-naphthyridine-3-carboxylic acid when tested according to standard in vitro bacteriological evaluation procedures was found to possess antibacterial activity, for example, to have B$s$ and B$c$ values, respectively, of 5.0 and 3.3. against *Staphylococcus aureus* and of 4.12 and 3.12 against *Clostridium welchii*.

Example 25

1-(2-ethoxyethyl)-1,4-dihydro-7-methyl-4-oxo-1,8-naphthyridine-3-carboxylic acid was prepared following the procedure described in Example 24 using 20.4 g. of 4-hydroxy-7-methyl-1,8-naphthyridine-3-carboxylic acid, 19.5 g. of potassium hydroxide, 385 cc. of ethanol, 150 cc. of water, 46.0 g. of 2-bromoethyl ethyl ether and a reflux period of about 18 hours. There was thus obtained 12.1 g. (44%) of the product, 1-(2-ethoxyethyl)-1,4-dihydro-7-methyl-4-oxo-1,8-naphthyridine-3-carboxylic acid, M.P. 182.6–183.4° C. (corr.), when recrystallized twice from acetonitrile using decolorizing charcoal and once from dioxane.

*Analysis.*—Calcd. for $C_{14}H_{16}N_2O_4$: C, 60.85; H, 5.83; N, 10.14. Found: C, 60.87; H, 5.62; N, 10.25.

1-(2-ethoxyethyl)-1,4-dihydro-7-methyl-4-oxo-1,8-naphthyridine-3-carboxylic acid when tested according to standard in vitro bacteriological evaluation procedures was found to possess antibacterial activity, for example, to have B$s$ and B$c$ values, respectively, of 3.6 and <3.3 against *Staphylococcus aureus* and of 3.6 and <3.3 against *Clostridium welchii*.

Example 26

1-allyl-1,4-dihydro-7-methyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 26 g. of potassium hydroxide, 385 cc. of ethanol, 150 cc. of water, 40 cc. of allyl bromide and a reflux period of 4 hours. There was thus obtained 16.0 g. of the product, 1-allyl-1,4-dihydromethyl-4-oxo-1,8-naphthyridine-3-carboxylic acid, M.P. 207.6–208.2° C. (corr.) when recrystallized from absolute ethanol.

*Analysis.*—Calcd. for $C_{13}H_{12}N_2O_3$: C, 63.93; H, 4.95; N, 11.47. Found: C, 63.87; H, 4.69; N, 11.48.

1-allyl-1,4-dihydro-7-methyl-4-oxo-1,8-naphthyridine-3-carboxylic acid when tested according to standard in vitro bacteriological evaluation procedures was found to possess antibacterial activity, for example, to have B$s$ and B$c$ values respectively, of 4.3 and 3.6 against *Eberthella typhi* and of 4.12 and 3.0 against *Clostridium welchii*. This same compound was found to have significant in vivo activity against *Klebsiella pneumoniae* in mice when administered orally at a dose level of 400 mg./kg./d. or subcutaneously at a dose level of 200 mg./kg./d. Also, when tested for potentiation of hexobarbital sleeping time in mice this compound was found to have an $ED_{50}$ of 60±7 mg./kg.

Example 27

1-(2-chloro-2-propenyl)-1,4-dihydro - 7 - methyl-4-oxo-1,8-naphthyridine-3-carboxylic acid was prepared following the procedure described in Example 1 using 20.4 g. of 4 - hydroxy-7-methyl - 1,8 - naphthyridine-3-carboxylic acid, 19.5 g. of potassium hydroxide, 385 cc. of ethanol, 150 cc. of water, 22.2 g. of 2,3-dichloropropene and a reflux period of 2 hours. There was thus obtained 7.7 g. of the product, 1-(2-chloro-2-propenyl)-1,4-dihydro-7-methyl-4-oxo-1,8-naphthyridine - 3 - carboxylic acid, M.P. 185.2–186.2° C. (corr.) when recrystallized three times from absolute ethanol.

Analysis.—Calcd. for $C_{13}H_{11}ClN_2O_3$: Cl, 12.72; N, 10.05. Found: Cl, 12.56; N, 10.14.

1-(2-chloro-2-propenyl)-1,4-dihydro - 7 - methyl-4-oxo-1,8-naphthyridine-3-carboxylic acid when tested according to standard in vitro bacteriological evaluation procedures was found to possess antibacterial activity, for example, to have B$s$ and B$c$ values, respectively, of 4.3 and 3.3. against *Staphylococcus aureus* and of 4.6 and 3.6 against *Eberthella typhi*. This same compound when tested as described above for potentiation of hexobarbital sleeping time in mice was found to have an $ED_{50}$ of 86±15.6 mg./kg.

Example 28

7 - methyl-1,4-dihydro-4-oxo-1-(2-propynyl)-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 385 cc. of ethanol, 150 cc. of water, 40 cc. of propargyl bromide and a reflux period of 4 hours. The crude product was recrystallized respectively from methanol, water acidified with hydrochloric acid and acetonitrile using decolorizing charcoal. There was thus obtained 3.5 g. of the product, 7-methyl-1,4-dihydro-4-oxo-1-(2 - propynyl)-1,8-naphthyridine-3-carboxylic acid, M.P. 253.4–254.0° C. (corr.) with decomposition.

Analysis.—Calcd. for $C_{13}H_{10}N_2O_3$: C, 64.45; H, 4.17; N, 11.57. Found: C, 64.61; H, 4.45; N, 11.63.

7 - methyl-1,4-dihydro-4-oxo-1-(2-propynyl)-1,8-naphthyridine-3-carboxylic acid when tested according to standard in vitro bacteriological evaluation procedures was found to possess antibacterial activity, for example, to has B$s$ and B$c$ values, respectively, of 4.3 and <3.0 against *Eberthella typhi* and of 4.12 and <3.0 against *Clostridium welchii*. This same compound when tested as described above for potentiation of hexobarbital sleeping time in mice was found to have an $ED_{50}$ of 71±9.9 mg./kg.

Example 29

1 - carboxymethyl - 1,4 - dihydro - 7 - methyl-4-oxo-1,8-naphthyridine-3-carboxylic acid was prepared as follows: 20.4 g. of 4-hydroxy-7-methyl-1,8-naphthyridine - 3 - carboxylic acid and 19.5 g. of potassium hydroxide were dissolved in 60 cc. of water. To this solution was added 9.5 g. of chloroacetic acid and the resulting solution was evaporated by heating with stirring on a hot plate until a stiff paste was obtained. This required about thirty minutes. The reaction mixture was dissolved in hot water, treated with decolorizing charcoal, filtered, and filtrate acidified with acetic acid. The acidic solution was chilled in an ice bath; and the resulting precipitate was collected, washed with water, dried in a vacuum oven at 65° C. and was then recrystallized from 90% aqueous acetic acid. There was thus obtained 16.0 g. (61%) of the product, 1 - carboxymethyl - 1,4 - dihydro - 7 - methyl-4-oxo-1,8-naphthyridine-3-carboxylic acid, M.P. 292.4–294° C. (corr.) with decomposition.

Analysis.—Calcd. for $C_{12}H_{10}N_2O_5$: C, 54.96; H, 3.85; N, 10.68. Found: C, 55.22; H, 4.17; N, 10.69.

Example 30

1 - (2 - diethylaminoethyl) - 1,4 - dihydro - 7 - methyl-4-oxo-1,8-naphthyridine - 3 - carboxylic acid was prepared as follows: To a solution containing 20.4 g. of 4-hydroxy-7-methyl-1,8-naphthyridine-3-carboxylic acid, 26.0 g. of potassium hydroxide, 385 cc. of ethanol and 150 cc. of water was added 34.4 g. of 2-diethylaminoethyl chloride hydrochloride and the resulting reaction mixture was refluxed for about 2 hours and then allowed to stand at room temperature overnight. The reaction solution was chilled in an ice bath; and, when no precipitate resulted, it was then evaporated to dryness by heating on a steam bath in vacuo. The residual material was taken up in ethanol and the resulting solution treated with decolorizing charcoal and filtered. To the filtrate was added 25 cc. of 20% ethanolic hydrogen chloride and the resulting solution was chilled in an ice bath. The precipitate that separated was collected and recrystallized from methanol and dried in a vacuum oven at 70° C. to yield 16.1 g. (47% yield) of the product, 1-(2-diethylaminoethyl)-1,4-dihydro - 7 - methyl - 4 - oxo-1,8-naphthyridine-3-carboxylic acid in the form of its hydrochloride salt, M.P. 268.4–270° C. (corr.) with decomposition.

Analysis.—Calcd. for $C_{16}H_{21}N_3O_3 \cdot HCl$: Cl, 10.43; N, 12.37. Found: Cl, 10.51; N, 12.45.

Example 31

7 - methyl - 1,4 - dihydro-1-(2-methyl-2-propenyl)-4-oxo - 1,8 - naphthyridine - 3 carboxylic acid was prepared as follows: A mixture containing 14.7 g. of 4-hydroxy-7-methyl-1,8-naphthyridine - 3 - carboxylic acid, 14.0 g. of potassium hydroxide, 280 cc. of ethanol, 110 cc. of water and 30 cc. of 3-chloro-2-methyl-1-propene was refluxed on a steam bath and then allowed to stand overnight at room temperature. The reaction mixture was acidified with concentrated hydrochloric acid and chilled in an ice bath. The crystalline precipitate that separated was collected, washed with water, dried in a vacuum oven (70° C.) and recrystallized from acetonitrile using decolorizing charcoal. After drying the recrystallized product in a vacuum oven at 70° C., there was obtained 9.6 g. (52%) of 7-methyl-1,4-dihydro - 1 - (2-methyl-2-propenyl) - 4 - oxo-1,8-naphthyridine-3-carboxylic acid, M.P. 218.4–219.6° C. (corr.).

Analysis.—Calcd. for $C_{14}H_{14}N_2O_3$: C, 65.11; H, 5.46; N, 10.84. Found: C, 65.25; H, 5.43; N, 10.96.

7 - methyl - 1,4 - dihydro - 1 - (2-methyl-2-propenyl)-4-oxo-1,8-naphthyridine-3-carboxylic acid when tested as described above was found to potentiate hexobarbital sleeping time in four out of six mice at a dose level of 200 mg./kg.

Example 32

1 (2 - butenyl) - 1,4 - dihydro - 7 - methyl-4-oxo-1,8-naphthyridine-3-carboxylic acid was prepared following the procedure described in Example 1 using 10.2 g. of 4-hydroxy - 7 - methyl - 1,8 - naphthyridine-3-carboxylic acid, 16.3 g. of potassium hydroxide, 190 cc. of ethanol, 75 cc. of water, 25 cc. of 1-chloro-2-butene and a reflux period of 3 hours. There was thus obtained about 7 g. of the product, 1,2-butenyl) - 1,4 - dihydro-7-methyl-4-oxo-1,8 - naphthyridine - 3 - carboxylic acid, M.P. 215.2–216.0° C. (corr.) when recrystallized twice from acetonitrile and dried in a vacuum oven (70° C.).

Analysis.—Calcd. for $C_{14}H_{14}N_2O_3$: C, 65.11; H, 5.46; N, 10.84. Found: C, 65.03; H, 5.50; N, 10.98.

1 - (2 - butenyl) - 1,4 - dihydro-7-methyl-4-oxo-1,8-naphthyridine-3-carboxylic acid when tested as described above was found to potentiate hexobarbital sleeping time in three out of six mice at dose level of 200 mg./kg.

Example 33

1 - ethyl - 1,4 - dihydro - 4 - oxo-7-styryl-1,8-naphthyridine-3-carboxylic acid was prepared as follows: A mixture containing 14.6 g. of 4-hydroxy - 7 - styryl-1,8-naphthyridine-3-carboxylic acid, 9.8 g. of potassium hydroxide, 230 cc. of ethanol, 80 cc. of water, and 20 cc. of ethyl iodide was refluxed on a steam bath for about 16 hours. The reaction mixture was then chilled in an ice bath and the solid that separated was collected, washed with acetone, dried in a vacuum oven (70° C.) and recrystallized from acetic acid to yield 12.8 g. of the product, 1 - ethyl - 1,4 - dihydro - 4 - oxo-7-styryl-1,8-naphthyridine-3-carboxylic acid, a light yellow solid, M.P. 265.0–266.8° C. (corr.).

*Analysis.*—Calcd. for $C_{19}H_{16}N_2O_3$: N, 8.75; N.E., 320. Found: N, 8.89; N.E., 316.

The intermediate 4 - hydroxy - 7 - styryl-1,8-naphthyridine-3-carboxylic acid was prepared in two steps as follows: A mixture containing 11.9 g. of ethyl 4-hydroxy-7-methyl-1,8-naphthyridine - 3 - carboxylate, 6.6 g. of benzaldehyde, 13.0 cc. of acetic acid and 22.0 cc. of acetic anhydride was refluxed for 9 hours and then allowed to stand at room temperature over the week end. The reaction mixture was then steam distilled and the yellow residue that remained was collected and recrystallized from acetic acid to yield 4.6 g. of ethyl 4-hydroxy-7-styryl-1,8-naphthyridine - 3 - carboxylate, a lemon yellow solid, M.P. 286.0–288.6° C. (corr.) with decomposition.

*Analysis.*—Calcd. for $C_{19}H_{16}N_2O_3$: C, 71.24; H, 5.03; N, 8.75; N.E., 320. Found: C, 71.07; H, 5.71; N, 8.66; N.E., 310.

In the preceding preparation the steam distillation step can be omitted. In another run, after the heating of the reaction mixture, the solvent was removed by distillation and the remaining yellow solid was recrystallized from acetic acid using decolorizing charcoal.

The foregoing ester was converted into its corresponding carboxylic acid as follows: A mixture containing 30.6 g. of ethyl 4-hydroxy-7-styryl-1,8-naphthyridine-3-carboxylate and 283 cc. of 10% aqueous potassium hydroxide solution was refluxed for 3½ hours after which time practically all of the solid had dissolved. The hot reaction mixture was filtered and allowed to cool. The cooled reaction mixture, which contained some yellow precipitate, was heated to boiling whereupon the solid dissolved; and the hot solution was acidified with concentrated hydrochloric acid. The resulting pale yellow precipitate was collected, washed with boiling water, and dried in a vacuum oven to yield 25.6 g. (91%) of the product, 4 - hydroxy - 7 - styryl - 1,8 - naphthyridine - 3 - carboxylic acid, M.P. 298–299° C. with decomposition.

1 - ethyl - 1,4 - dihydro - 4 - oxo - 7 - styryl - 1,8 - naphthyridine-3-carboxylic acid when tested according to standard in vitro bacteriological evaluation procedures was found to possess antibacterial activity, for example, to have Bs and Bc values, respectively, of 5.6 and 4.6 against *Staphylococcus aureus* and of 5.6 and 4.3 against *Clostridium welchii*. This same compound when tested as described above for potentiation of hexobarbital sleeping time in mice was found to have an $ED_{50}$ of $39\pm13$ mg./kg.

Example 34

Ethyl 1 - ethyl - 1,4 - dihydro - 4 - oxo - 7 - styryl - 1,8 - naphthyridine-3-carboxylate was obtained together with the corresponding carboxylic acid in the following synthesis: A mixture containing 64 g. of ethyl 4-hydroxy-7-styryl-1,8-naphthyridine-3-carboxylate, 52 g. of potassium hydroxide, 920 cc. of ethanol, 320 cc. of water, and 88 cc. of ethyl iodide was refluxed for about 16 hours. The acidic reaction mixture was cooled in an ice bath; and the resulting precipitate was collected, washed twice with acetone and dried to yield 39.0 g. of solid (see below). The acetone washings were diluted with water and the yellow precipitate that separated was collected, washed with boiling water, recrystallized once from acetic acid-water and a second time from absolute ethanol to yield 6.1 g. of ethyl 1-ethyl-1,4-dihydri-4-oxo-7-styryl-1,8-naphthyridine-3-carboxylate, M.P. 174.2–176.6° C. (corr.).

*Analysis.*—Calcd. for $C_{21}H_{20}N_2O_3$: C, 72.39; H, 5.79; N, 8.04. Found: C, 72.15; H, 5.49; N, 8.30.

The above 39 g. of solid was washed with hot 10% aqueous potassium carbonate solution and the resulting suspension was acidified with hydrochloric acid and filtered.

The filtered product was washed with water and dried in an oven (70° C.) to yield about 39 g. (62%) of 1-ethyl-1,4 - dihydro - 4 - oxo - 7 - styryl - 1,8 - naphthyridine - 3-carboxylic acid, the same product prepared above in Example 33.

Ethyl 1 - ethyl - 1,4 - dihydro - 4 - oxo - 7 - styryl -1,8 - napthyridine-3-carboxylate when tested according to standard in vitro bacteriological evaluation procedures was found to possess antibacterial activity, for example, to have Bs and Bc values, respectively, of 5.3 and 4.6 against *Staphylococcus aureus* and of 5.6 and 5.0 against *Clostridium welchii*. This same compound when tested as above for potentiation of hexobarbital sleeping time in mice was found to have an $ED_{50}$ of $2.28\pm0.7$ mg./kg.

Example 35 n-Propyl 1 - ethyl - 1,4 - dihydro - 4 - oxo - 7 - styryl-1,8-naphthyridine-3-carboxylate was prepared as follows: A mixture containing 14.0 g. of ethyl 1-ethyl-1,4-dihydro-7-styryl-4-oxo-1,8-naphthyridine-3-carboxylate, 200 cc. of n-propanol and 0.5 g. of sodium methoxide was refluxed on a steam bath over the week end in a flask equipped with a drying tube containing anhydrous calcium sulfate. The reaction mixture was cooled well in an ice bath and the resulting white precipitate was collected and recrystallized using decolorizing charcoal from ethanol-water to yield 7.4 g. (51%) of the product, a white solid, n-propyl 1 - ethyl - 1,4 - dihydro - 4 - oxo - 7 - styryl - 1,8 - naphthyridine-3-carboxylate, M.P. 181.8–183.0° C.

*Analysis.*—Calcd. for $C_{22}H_{22}N_2O_3$: C, 72.91; H, 6.12; N, 7.73. Found: C, 73.14; H, 6.18; N, 7.73.

n-Propyl 1 - -ethyl - 1,4 - dihydro - 4 - oxo - 7 - styryl-1,8-naphthyridine-3-carboxylate when tested as above for potentiation of hexobarbital sleeping time in mice was found to have an $ED_{50}$ of about 8 mg./kg.

Example 36

1 - methyl - 1,4 -dihydro - 4 - oxo - 7 - styryl - 1,8-naphthyridine-3-carboxylic acid was prepared following the procedure described in Example 33 using 38.0 g. of 4 - hydroxy - 7 - styryl - 1,8 - naphthyridine - 3 - carboxylic acid, 25.4 g. of potassium hydroxide, 600 cc. of ethanol, 200 cc. of water, 50 cc. of methyl iodide and a reflux period of 1½ hours. There was thus obtained 26.5 g. (67%) of the product, a cream-colored cottony solid, 1 - methyl - 1,4 - dihydro - 4 - oxo - 7 - styryl - 1,8 - naphthyridine-3-carboxylic acid, M.P. >300° C. (corr.), when recrystallized from acetic acid.

*Analysis.*—Calcd. for $C_{18}H_{14}N_4O_3$: C, 70.58; H, 4.61; N, 9.15. Found: C, 70.56; H, 4.25; N, 9.06.

Example 37

4 - oxo - 1,4 - dihydro - n - propyl - 7 - styryl - 1,8 - naphthyridine-3-carboxylic acid was prepared following the procedure described in Example 33 using 38.0 g. of 4 - hydroxy - 7 - styryl - 1,8 - naphthyridine - 3 - carboxylic acid, 25.4 g. of potassium hydroxide, 600 cc. of ethanol, 210 cc. of water, 50 cc. of n-propyl bromide and a reflux period of 28 hours. After two recrystallizations from acetonitrile, there was obtained 25.1 g. of the product, a pale yellow solid, 4-oxo-1,4-dihydro-1-n-propyl-7-styryl-1,8-naphthyridine-3-carboxylic acid, M.P. 236.6–238.0° C. (corr.).

*Analysis.*—Calcd. for $C_{20}H_{18}N_2O_3$: C, 71.84; H, 5.42; N, 8.38. Found: C, 72.18; H, 5.19; N, 8.41.

Example 38

Ethyl 1,4-dihydro-4-oxo-1-n-propyl - 7 - styryl - 1,8-naphthyridine-3-carboxylate was prepared as follows: 19.3 g. of 1,4-dihydro-4-oxo-n-propyl-7-styryl-1,8-naphthyridine-3-carboxylic acid was dissolved in 500 cc. of chloroform and to this stirred solution was added 22.1 g. of oxalyl chloride. A yellow precipitate formed immediately. The reaction mixture was refluxed for 6 hours on a steam bath and then allowed to stand at room temperature over the week end in a flask sealed with a drying tube containing anhydrous calcium sulfate. To the reaction mixture was added 30 cc. of ethanol. The resulting solution was stirred, refluxed for 30 minutes, allowed to cool to room temperature, and filtered. The filtrate was washed once with 10% potassium carbonate and twice with water, dried over anhydrous potassium carbonate, and evaporated on a steam bath in vacuo. The dark residual oily material solidified on cooling. This solid was recrystallized twice from absolute ethanol, each time using decolorizing charcoal, and then dried in an oven (80° C.) to yield 13.1 g. of the product, ethyl 1,4-dihydro-4-oxo-1-n-propyl-7-styryl - 1,8 - naphthyridine-3-carboxylate, M.P. 134.8–136.8° C. (corr.).

*Analysis.*—Calcd. for $C_{22}H_{22}N_2O_3$: C, 72.91; H, 6.12; N, 7.73. Found: C, 72.99; H, 6.04; N, 7.67.

Ethyl 1,4 - dihydro - 4 - oxo-1-n-propyl-7-styryl-1,8-naphthyridine-3-carboxylate when tested as above for potentiation of hexobarbital sleeping time in mice was found to have an $ED_{50}$ of about 2.05 mg./kg.

Example 39

Ethyl 1,4 - dihydro - 1 - methyl - 4 - oxo-7-styryl-1,8-naphthyridine-3-carboxylate was prepared following the procedure described in Example 38 using 18.3 g. of 1,4-dihydro - 1 - methyl - 4 - oxo-7-styryl-1,8-naphthyridine-3-carboxylic acid, 22.9 g. of oxalyl chloride, 500 cc. of chloroform and a reflux period of 5 hours. There was thus obtained 12.3 g. (61.5%) of the product, ethyl 1,4-dihydro-1-methyl-4-oxo-7 - styryl - 1,8 - naphthyridine-3-carboxylate, M.P. 200.5–201.4° C. (corr.), after 2 recrystallizations from acetonitrile using decolorizing charcoal.

*Analysis.*—Calcd. for $C_{20}H_{18}N_2O_3$: C, 71.84; H, 5.42; N, 8.38. Found: C, 72.02; H, 5.42; N, 8.40.

Ethyl 1,4 - dihydro - 1 - methyl - 4 - oxo-7-styryl-1,8-naphthyridine-3-carboxylate when tested as above for potentiation of hexobarbital sleeping time in mice was found to have an $ED_{50}$ of $41\pm12$ mg./kg.

Example 40

Methyl 1-ethyl-1,4-dihydro - 4 - oxo - 7 - styryl - 1,8-naphthyridine-3-carboxylate was prepared following the procedure described in Example 38 using 15.0 g. of 1-ethyl-1,4-dihydro - 4 - oxo - 7 - styryl - 1,8 - naphthyridine-3-carboxylic acid, 17.9 g. of oxalyl chloride, 400 cc. of chloroform and a reflux period of 1 hour. Dry methanol (30 cc.) was added slowly to the reaction mixture instead of the ethanol used in Example 38. After two recrystallizations of the crude product from acetonitrile using decolorizing charcoal, there was obtained 7.1 g. of the product, methyl 1 - ethyl - 1,4 - dihydro - 4 - oxo-7-styryl-1,8-naphthyridine - 3 - carboxylate, M.P. 211.6–214.2° C. (corr.).

*Analysis.*—Calcd. for $C_{20}H_{18}N_2O_3$: C, 71.84; H, 5.42; N, 8.38. Found: C, 71.97; H, 5.55; N, 8.43.

Methyl 1 - ethyl - 1,4 - dihydro - 4 - oxo-7-styryl-1,8-naphthyridine-3-carboxylate when tested as above for potentiation of hexobarbital sleeping time in mice was found to have an $ED_{50}$ of about 100 mg./kg.

Example 41

Isopropyl 1 - ethyl - 1,4 - dihydro - 4-oxo-7-styryl-1,8-naphthyridine-3-carboxylate was prepared following the procedure described in Example 38 using 13.8 g. of 1-ethyl - 1,4 - dihydro - 4 - oxo-7-styryl-1,8-naphthyridine-3-carboxylic acid, 16.4 g. of oxalyl chloride, 400 cc. of chloroform, a reflux period of 1 hour, and 30 cc. of dry isopropyl alcohol added dropwise. There was thus obtained 11.3 g. (73%) of the product, isopropyl 1-ethyl-1,4 - dihydro - 4 - oxo - 7 - styryl-1,8-naphthyridine-3-carboxylate, M.P. 183.2–184.0° C. (corr.) when recrystallized from ethanol using decolorizing charcoal.

*Analysis.*—Calcd. for $C_{22}H_{22}N_2O_3$: C, 72.91; H, 6.12; N, 7.73. Found: C, 72.76; H, 6.29; N, 7.73.

Isopropyl 1 - ethyl - 1,4 - dihydro - 4-oxo-7-styryl-1,8-naphthyridine-3-carboxylate when tested as above for potentiation of hexobarbital sleeping time in mice was found to have an $ED_{50}$ of $2.7\pm0.2$ mg./kg.

Example 42

1 - ethyl - 1,4 - dihydro - 7-(4-methoxystyryl)-4-oxo-1,8-naphthyridine-3-carboxylic acid was prepared following the procedure described in Example 33 using 51.2 g. of 4 - hydroxy - 7 - (4 - methoxystyryl)-1,8-naphthyridine-3-carboxylic acid, 31.0 g. of potassium hydroxide, 730 cc. of ethanol, 255 cc. of water, 60 cc. of ethyl iodide and a reflux period of 16 hours. There was thus obtained 28.4 g. (51%) of the product, 1-ethyl-1,4-dihydro-7-(4-methoxystyryl) - 4 - oxo - 1,8 - naphthyridine-3-carboxylic acid, M.P. 282.6–286.7° C. (corr.), after one recrystallization from acetic acid.

*Analysis.*—Calcd. for $C_{20}H_{18}N_2O_4$: C, 68.56; H, 5.18; N, 7.99. Found: C, 68.84; H, 4.98; N, 7.97.

The intermediate 4-hydroxy-7-(4-methoxystyryl)-1,8-naphthyridine-3-carboxylic acid was prepared in two steps following the procedure described in Example 33 using 10.0 g. of ethyl 4-hydroxy-7-methyl-1,8-naphthyridine-3-carboxylate, 7.1 g. of 4-methoxybenzaldehyde, 11.5 cc. of acetic acid, 19.2 cc. of acetic anhydride and a reflux period of about 64 hours. There was first obtained 5.6 g. of ethyl 4 - hydroxy - 7 - (4-methoxystyryl)-1,8-naphthyridine-3-carboxylate, M.P. >300° C. (corr.), after one recrystallization from acetic acid using decolorizing charcoal.

*Analysis.*—Calcd. for $C_{20}H_{18}N_2O_4$: C, 68.56; H, 5.18; N, 7.99. Found: C, 68.40; H, 5.10; N, 7.91.

The above ester was then hydrolyzed to its corresponding carboxylic acid following the procedure described in Example 33 for the corresponding 7-styryl compound using 91.6 g. of ethyl 4 - hydroxy - 7 - (4 - methoxystyryl) - 1,8 - naphthyridine - 3 - carboxylate, 850 cc. of 10% aqueous potassium hydroxide solution and a reflux period of 3 hours. There was thus obtained 56.4 g. of 4 - hydroxy - 7 - (4 - methoxystyryl) - 1,8 - naphthyridine - 3 - carboxylic acid, M.P. 292.6–294.4° C. (corr.) when recrystallized from diethylene glycol monoethyl ether using decolorizing charcoal.

*Analysis.*—Calcd. for $C_{18}H_{14}N_2O_4$: C, 67.07; H, 4.38; N, 8.69. Found: C, 67.41; H, 4.49; N, 8.63.

Example 43

Ethyl 1 - ethyl - 1,4 - dihydro - 7 - (4 - methoxystyryl) - 4 - oxo - 1,8 - naphthyridine - 3 - carboxylate was prepared following the procedure described in Example 38 using 18.0 g. of 1 - ethyl - 1,4 - dihydro - 7 - (4 - methoxystyryl) - 4 - oxo - 1,8 - naphthyridine - 3 - carboxylic acid, 19.6 g. of oxalyl chloride, 500 cc. of chloroform, a reflux period of 1 hour and 30 cc. of absolute ethanol added dropwise. There was thus obtained 11.8 g. of the product, ethyl 1 - ethyl - 1,4 - dihydro - 7 - (4 - methoxystyryl) - 4 - oxo - 1,8 - naphthyridine - 3 - carboxylate, M.P. 184.2–186.8° C. (corr.) after 3 recrystallizations from acetonitrile using decolorizing charcoal.

*Analysis.*—Calcd. for $C_{22}H_{22}N_2O_4$: C, 69.83; H, 5.86; N, 7.40. Found: C, 69.98; H, 5.69; N, 7.45.

Example 44

1 - ethyl - 1,4 - dihydro - 4 - oxo - 7 - (2 - phenylethyl)-1,8 - naphthyridine - 3 - carboxylic acid was prepared by catalytic hydrogenation of the corresponding 7-styryl compound as follows: A mixture containing 10.0 g. of 1 - ethyl - 1,4 - dihydro - 4 - oxo - 7 - styryl - 1,8 - naphthyridine - 3 - carboxylic acid, platinum oxide, 400 cc. of acetic acid were placed in a steel bomb and heated at a temperature of about 114–119° C. at a pressure of about 125 lbs. of hydrogen. The reaction took about 30 minutes and 1.76 mole equivalents of hydrogen were taken up. The contents of the bomb were emptied into a large beaker and rinsed with fresh acetic acid. The reaction mixture was then filtered through diatomaceous earth to remove the platinum catalyst. The clear yellow filtrate was evaporated to dryness on a steam bath under reduced pressure to yield a yellow solid. The solid was recrystallized using decolorizing charcoal from 500 cc. of absolute ethanol and then recrystallized a second time from ethyl acetate to yield 3.7 g. of the product, 1 - ethyl 1,4- dihydro - 4 - oxo - 7 - (2 - phenylethyl) - 1,8 - naphthyridine-3-carboxylic acid, M.P. 178.0–179.2° C. (corr.).

*Analysis.*—Calcd. for $C_{19}H_{18}N_2O_3$: N, 8.69; N.E., 322. Found: N, 8.73; N.E., 322.

1 - ethyl - 1,4 - dihydro - 4 - oxo - 7 - (2 - phenylethyl)- 1,8 - naphthyridine - 3 - carboxylic acid when tested according to standard in vitro bacteriological evaluation procedures was found to possess antibacterial activity, for example, to have Bs and Bc values, respectively, of 5.0 and 4.6 against *Staphylococcus aureus* and of 5.0 and 4.6 against *Clostridium welchii*. This same compound when tested as described above for potentiation of hexobarbital sleping time in mice was found to have an $ED_{50}$ of 48±13.7 mg./kg.

Example 45

1 - ethyl - 1,4 - dihydro - 4 - oxo - 1,8 - naphthyridine-3,7 - dicarboxylic acid was prepared as follows: To a stirred suspension containing 28.0 g. of 1 - ethyl 1,4-dihydro - 4 - oxo - 7 - styryl - 1,8 - naphthyridine - 3 - carboxylic acid in 192 cc. of pyridine and 35 cc. of water cooled to 15–20° C. in an ice bath was added portionwise over a period of about 1 hour 36.8 g. of potassium permanganate. The temperature was kept at 15–20° C. during the addition of the permanganate. After two 90 cc. portions of water were added to the reaction mixture, one after half of the permanganate had been added and the other after completion of the addition of the permanganate, the reaction mixture was stirred for an additional 30 minutes. After an unsuccessful attempt to remove the colloidal manganese dioxide by filtration, sodium bisulfite solution was added until all manganese dioxide had been destroyed. The mixture was then acidified with 6 N sulfuric acid whereupon pale yellow solid separated. The solid was collected and dissolved in 10% aqueous potassium carbonate solution. This solution was filtered and to the filtrate was added hydrochloric acid to reprecipitate the product. The solid was collected, washed with water and recrystallized from acetic acid using decolorizing charcoal. It was then washed with acetone and dried in a vacuum oven at 70° C. to yield 5 g. (77%) of the product, 1 - ethyl - 1,4 - dihydro - 4 - oxo - 1,8 - naphthyridine - 3,7 - dicarboxylic acid, M.P. 282–283.4° C. (corr.) with decomposition.

*Analysis.*—Calcd. for $C_{12}H_{10}N_2O_5$: N, 10.68; N.E., 131 and 262. Found: N, 10.76; N.E., 129 and 273.

Using a molar equivalent quantity of ethyl 1 - ethyl-1,4 - dihydro - 4 - oxo - 7 - styryl - 1,8 - naphthyridine-3-carboxylate in the above oxidation in place of the corresponding acid, there was obtained ethyl 1 - ethyl - 7 - carboxy - 1,4 - dihydro - 4 - oxo - 1,8 - naphthyridine-3-carboxylate, M.P. 241–243° C.

Example 46

1 - ethyl - 1,4 - dihydro - 4 - oxo - 1,8 - naphthyridine-3-carboxylic acid was prepared as follows: A mixture containing 5.8 g. of 1 - ethyl - 1,4 - dihydro - 4 - oxo-1,8 - naphthyridine - 3,7 - dicarboxylic acid and 0.29 g. of 2-pyridone suspended in 58 cc. of Dowtherm A was refluxed for about 20 minutes. The supernatant liquid was decanted into a clean flask and allowed to cool to room temperature. The solid that separated was collected, washed three times with ether, and recrystallized three times from acetonitrile, the first time using decolorizing charcoal, to yield 1.1 g. of the product, 1 - ethyl - 1,4- dihydro - 4 - oxo - 1,8 - naphthyridine - 3 - carboxylic acid, M.P. 231.0–231.8° C. (corr.).

*Analysis.*—Calcd. for $C_{11}H_{10}N_2O_3$: C, 60.54; H, 4.62; N, 12.84. Found: C, 60.36; H, 4.33; N, 12.95.

Example 47

7-amino-1-ethyl-1,4-dihydro-4-oxo-1,8 - naphthyridine-3-carboxylic acid was prepared as follows: 14 g. of ethyl 7 - acetamido - 1 - ethyl - 1,4 - dihydro - 4 - oxo - 1,8- naphthyridine - 3 - carboxylate was dissolved by boiling with a mixture of 50 cc. of 6 N hydrochloric acid and 50 cc. of water. About 10 minutes after dissolution, solid separated and to this mixture was added 100 cc. of water plus 150 cc. of 6 N hydrochloric acid. The mixture was heated near boiling for about 30 minutes to dissolve most of the solid and the resulting mixture was filtered. The filtrate was poured into a slight excess of potassium hydroxide solution and ice. When no solid separated, hydrochloric acid was added till acidic and the resulting solid was collected, recrystallized from 6 N hydrochloric acid, dried in a vacuum oven at 60° C. to yield 8.4 g. of the product, a white solid, 7-amino-1-ethyl-1,4-dihydro-4-oxo-1,8-naphthyridine-3-carboxylic acid, M.P. >300° C. (corr.).

*Analysis.*—Calcd. for $C_{11}H_{11}N_3O_3$: N, 18.02; N.E., 233. Found: N, 17.97; N.E., 231.

Ethyl 7 - acetamido-1-ethyl-1,4-dihydro-4-oxo-1,8-naphthyridine-3-carboxylate was prepared in several steps starting with 2,6-diaminopyridine as follows: To a solution containing 327 g. of 2,6-diaminopyridine in 1500 cc. of ethanol kept at about 40–45° C. was added 627 g. of diethyl ethoxymethylenemalonate and the resulting reaction solution was kept at 45–55° C. for about 25 minutes and then refluxed on a steam bath for 10 minutes. The reaction solution was then cooled and the solid that separated was collected, washed well with cold ethanol, recrystallized from benzene and dried in a vacuum oven at 60° C. to obtain about 450 g. of diethyl N-(6-amino-2-pyridyl)aminomethylenemalonate, M.P. 114–116° C.

*Analysis.*—Calcd. for $C_{13}H_{17}N_3O_4$: N, 15.05. Found: N, 15.08, 15.07.

A mixture containing 14 g. of diethyl N-(6-amino-2-pyridyl)-aminomethylenemalonate, 10 cc. of acetic anhydride and 100 cc. of Dowtherm A was heated first at 140° C. for about 15 minutes, then from 140° C. to about 250° C. over a period of 30 minutes and finally at 250° C. for about 15 minutes. The reaction mixture was cooled to 100° C. and the solid that separated was collected, washed with benzene and n-pentane, recrystallized from dimethylformamide, washed well with ethanol and dried in a vacuum oven at 60° C. There was thus obtained 7.2 g. of ethyl 7-acetamido-4-hydroxy-1,8-naphthyridine-3-carboxylate, M.P. >300° C. (corr.).

*Analysis.*—Calcd. for $C_{13}H_{13}N_3O_4$: C, 56.73; H, 4.76; N, 15.27. Found: C, 56.69; H, 4.59; N, 15.42.

Ethyl 7 - acetamido-1-ethyl-1,4-dihydro-4-oxo-1,8-naphthyridine-3-carboxylate was prepared as follows: A mixture containing 27.5 g. of ethyl 7-acetamido-4-hydroxy-1,8-naphthyridine-3-carboxylate, 58 cc. of 10% aqueous potassium hydroxide solution, 350 cc. of water, 500 cc. of ethanol and 30 cc. of ethyl iodide was refluxed for 1½ hours. The neutral reaction mixture was concentrated by heating on a steam bath to remove the ethanol. To the resulting thick white slurry was added about 500 cc. of water; and the solid was collected and recrystallized twice from ethanol to yield 18.5 g. of the product, ethyl 7 - acetamido - 1 - ethyl - 1,4 - dihydro - 4 - oxo - 1,8- naphthyridine-3-carboxylate, M.P. 192–195° C. This material was used in the above preparation without further purification.

7 - amino - 1 - ethyl-1,4-dihydro-4-oxo-1,8-naphthyridine-3-carboxylic acid when tested according to standard in vitro bacteriological evaluation procedures was found to possess antibacterial activity, for example, to have Bs and Bc values, respectively, of 3.6 and <3.0 against

*Staphylococcus aureus*, of 4.0 and 3.0 against *Eberthella typhi* and of 4.3 and 3.0 against *Clostridium welchii*.

Example 48

7 - amino - 1,4 - dihydro-1-methyl-4-oxo-1,8-naphthyridine-3-carboxylic acid was prepared as follows: A mixture containing 27.5 g. of ethyl 7-acetamido-4-hydroxy-1,8-naphthyridine-3-carboxylate, 58 cc. of 10% aqueous potassium hydroxide, 500 cc. of ethanol, 350 cc. of water and 10 cc. of methyl iodide was refluxed on a steam bath for 3 hours, with occasional small additions of methyl iodide (to replace that lost by volatilization and hydrolysis). An additional 140 cc. of 10% aqueous potassium hydroxide was added to the reaction mixture and heating was continued on a steam bath without a condenser for an additional 3 hours. The thus partially concentrated reaction mixture was filtered and the filtrate poured with stirring into 50 cc. of 6 N hydrochloric acid, adding water as needed to facilitate stirring. The resulting white precipitate was collected, washed with water, recrystallized from 6 N hydrochloric acid and dried in a vacuum oven at 70° C. to yield 16.9 g. of the product, 7-amino-1,4 - dihydro - 1 - methyl - 4 - oxo - 1,8 - naphthyridine-3-carboxylic acid, M.P. >300° C. (corr.).

*Analysis.*—Calcd. for $C_{10}H_9N_3O_3$: C, 54.79; H, 4.14; N, 19.17. Found: C, 54.72; H, 4.65; N, 19.06.

7 - amino - 1,4 - dihydro-1-methyl-4-oxo-1,8-naphthyridine-3-carboxylic acid when tested according to the procedure described above was found to potentiate hexobarbital sleeping time in four out of six mice at a dose level of 200 mg./kg.

Example 49

7 - amino - 1,4 - dihydro-1-n-propyl-4-oxo-1,8-naphthyridine-3-carboxylic acid was prepared as follows: A mixture containing 27.5 g. of ethyl 7-acetamido-4-hydroxy-1,8-naphthyridine-3-carboxylate, 58 cc. of 10% aqueous potassium hydroxide, 350 cc. of water, 500 cc. of ethanol and 25 cc. of n-propyl iodide was refluxed on a steam bath for a period of 5 hours. An additional 260 cc. of 10% aqueous potassium hydroxide solution was added to the acidic reaction mixture and refluxing was continued for an additional 5 hours, again adding about 25 cc. of n-propyl iodide. The reaction mixture was then refluxed for 1 hour without a condenser to allow removal of the excess n-propyl iodide and ethanol, filtered, and the filtrate treated with excess dilute aqueous hydrochloric acid. The solid that separated was collected, recrystallized once from ethanol and a second time from n-propanol, and dried in a vacuum oven at 60° C. to yield 10.5 g. of pale yellow solid, 7-amino-1,4-dihydro - 1 - n - propyl - 4 - oxo - 1,8 - naphthyridine - 3-carboxylic acid, M.P. 225.4–227.6° C. (corr.).

*Analysis.*—Calcd. for $C_{12}H_{13}N_3O_3$: C, 58.29; H, 5.30; N, 17.00. Found: C, 58.36; H, 5.27; N, 16.76.

7-amino-1,4-dihydro-1-n-propyl-4-oxo - 1,8 - naphthyridine-3-carboxylic acid when tested according to standard in vitro bacteriological evaluation procedures was found to possess antibacterial activity, for example, to have B*s* and B*c* values, respectively, of 3.61 and <3.01 against *Staphylococcus aureus* and of 4.31 and 3.31 against *Clostridium welchii*.

Example 50

7-acetamido-1-ethyl - 1,4 - dihydro-4-oxo-1,8-naphthyridine-3-carboxylic acid was prepared as follows: A mixture containing 18.7 g. of 7-amino-1-ethyl-1,4-dihydro-4-oxo-1,8-naphthyridine-3-carboxylic acid, 200 cc. of acetic anhydride and 200 cc. of acetic acid was refluxed with stirring for 5 hours. To the reaction mixture was then added 4 drops of concentrated sulfuric acid and refluxing was continued overnight (for about 16 hours). The reaction mixture was filtered while hot and the filtrate was chilled in an ice bath. The precipitate that separated was collected, triturated with ethyl acetate and dried in a vacuum oven at 60° C. to yield 11.0 g. of the white product, 7-acetamido-1-ethyl-1,4-dihydro-4-oxo-1,8 - naphthyridine-3-carboxylic acid, M.P.>300° C. (corr.).

*Analysis.*—Calcd. for $C_{13}H_{13}N_3O_4$: C, 56.72; H, 4.76; N, 15.27. Found: C, 56.68; H, 4.17; N, 15.31.

7-acetamido-1-ethyl - 1,4 - dihydro-4-oxo-1,8-naphthyridine-3-carboxylic acid when tested according to standard in vitro bateriological evaluation procedure was found to possess antibacterial activity, for example, to have B*s* and B*c* values, respectively, of 4.3 and 3.12 against *Eberthella typhi* and of 4.3 and 3.6 against *Clostridium welchii*. This same compound was found to have significant in vivo activity against *Klebsiella pneumoniae* in mice when administered orally at a dose level of 400 mg./kg./d. or when administered subcutaneously at a dose level of 200 mg./kg./d.

Example 51

1-ethyl-1,4-dihydro-4-oxo-7-propionamido - 1,8 - naphthyridine-3-carboxylic acid was prepared as follows: A mixture containing 12.8 g. of 7-amino-1-ethyl-1,4-dihydro-4-oxo-1,8-naphthyridine-3-carboxylic acid, 200 cc. of propionic anhydride and 6 drops of sulfuric acid was refluxed for 6 hours, allowed to cool to room temperature and then slowly poured with stirring into 1 liter of methanol. The solid that separated was collected, recrystallized once from dimethylformamide using decolorizing charcoal and once from acetonitrile using decolorizing charcoal, and then dried in a vacuum oven at 70° C. to yield 4.0 g. of the product, 1-ethyl-1,4-dihydro-4-oxo-7-propionamido - 1,8 - naphthyridine - 3 - carboxylic acid, M.P. 236.4–237.2° C. (corr.).

*Analysis.*—Calcd. for $C_{14}H_{15}N_3O_4$: C, 58.10; H, 5.23; N, 14.52. Found: C, 58.44; H, 5.29; N, 14.44.

1-ethyl-1,4-dihydro-4-oxo-7-propionamido - 1,8 - naphthyridine-3-carboxylic acid when tested according to the procedure described above for potentiation of hexobarbital sleeping time in mice was found to have an $ED_{50}$ of 230±69.8 mg./kg.

Example 52

1-ethyl-7-formamido-1,4-dihydro-4-oxo - 1,8 - naphthyridine-3-carboxylic acid was prepared as follows: A mixture containing 23.3 g. of 7-amino-1-ethyl-1,4-dihydro-4-oxo-1,8-naphthyridine-3-carboxylic acid, 75 cc. of formic acid and 75 cc. of acetic anhydride was refluxed for 2 hours and then allowed to stand at room temperature overnight (about 16 hours). The liquid was decanted from the separated solid; and the solid was stirred with 300 cc. of water for about ½ hour, filtered and washed with water. The solid was then recrystallized from pyridine acetate using decolorizing charcoal, washed successively with water and acetone, and then dried for 5 hours in a vacuum oven at 70° C. to yield a white product, 1-ethyl-7-formamido-1,4-dihydro-4-oxo-1,8-naphthyridine-3-carboxylic acid, M.P. 293.8–294.6° C. (corr.) with decomposition.

*Analysis.*—Calcd. for $C_{12}H_{11}N_3O_4$: C, 55.16; H, 4.24; N, 16.08. Found: C, 55.22; H, 4.11; N, 16.18.

Example 53

7-bromo-1-ethyl-1,4-dihydro-4-oxo - 1,8 - naphthyridine-3-carboxylic acid was prepared as follows: 18.6 g. of 7-amino-1-ethyl-1,4-dihydro-4-oxo - 1,8 - naphthyridine-3-carboxylic acid was partially dissolved in 192 cc. of 48% hydrobromic acid and the mixture was cooled to 0° C. To the stirred mixture kept at 0° C. was added dropwise first over a period of fifteen minutes 12 cc. of bromine and then over a period of 20 minutes a solution of 18.8 g. of sodium nitrite in 25 cc. of water. After the resulting mixture was stirred an additional 30 minutes, it was made alkaline with a solution containing 100 g. of sodium hydroxide in 500 cc. of water, keeping the temperature below 27° C. There resulted a large gummy orange lump. This was separated by decanting the liquid and then triturated (in a mortar) in a dilute solution of aqueous sodium hydroxide and ethanol. The mixture was allowed to stand overnight whereupon it partially solidified. The solid was removed by filtration and the filtrate was acidified with hydrochloric acid. The solid that separated was collected, triturated with ethanol and then recrystallized from dimethylformamide twice to yield 2.5 g. (10%) of the white solid product, 7-bromo-1-ethyl-1,4-dihydro-4-oxo-1,8-naphthyridine-3-carboxylic acid, M.P. 255.0–256.0° C. (corr.).

*Analysis.*—Calcd. for $C_{11}H_9BrN_2O_3$: Br, 26.92; N, 9.43. Found: Br, 26.91; N, 9.28.

7-bromo-1-ethyl-1,4-dihydro-4-oxo - 1,8 - naphthyridine-3-carboxylic acid was found to have significant in vivo activity against *Klebsiella pneumoniae* in mice when administered subcutaneously at a dose level of 100 mg./kg./d.

Example 54

1-ethyl-1,4-dihydro-7-hydroxy - 4 - oxo - 1,8 - naphthyridine-3-carboxylic acid was prepared as follows: To a partial solution of 7.0 g. of 7-amino-1-ethyl-1,4-dihydro-4-oxo-1,8-naphthyridine-3-carboxylic acid in 35 cc. of concentrated sulfuric acid and 40 cc. of water kept at 0° C. was added portionwise 3 g. of sodium nitrite; and the resulting mixture was stirred for 1 hour at 0° C. To the reaction mixture was added about 300 cc. of boiling water whereupon a white solid separated. The mixture was heated to boiling and then cooled in an ice bath. The solid was collected, washed with water, recrystallized once from ethanol, once from dimethylformamide, and then washed with ethanol to yield the product, 1-ethyl-1,4-dihydro-7-hydroxy-4-oxo-1,8-naphthyridine - 3 - carboxylic acid, M.P. 287.8–288.6° C. (corr.), when dried at 60° C.

*Analysis.*—Calcd. for $C_{11}H_{10}N_2O_4$: C, 56.41; H, 4.30; N, 11.95. Found: C, 56.46; H, 4.19; N, 12.18.

1-ethyl-1,4 - dihydro - 7 - hydroxy - 4 - oxo-1,8-naphthyridine-3-carboxylic acid when tested according to standard in vitro bacteriological evaluation procedures was found to possess antibacterial activity, for example, to have B*s* and B*c* values, respectively, of 4.3 and 3.82 against *Staphylococcus aureus*, of 3.7 and <3.7 against *Eberthella typhi* and of 4.3 and 3.7 against *Clostridium welchii*.

Example 55

7-chloro-1-ethyl - 1,4 - dihydro - 4 - oxo-1,8-naphthyridine-3-carboxylic acid was prepared as follows: A mixture containing 56 g. of 1-ethyl-1,4-dihydro-7-hydroxy-4-oxo-1,8-naphthyridine-3-carboxylic acid and 200 cc. of phosphorus oxychloride was refluxed for 30 minutes and then concentrated to remove about 125 cc. of the excess $POCl_3$. The concentrate was then poured into a mixture of water and ice; and the solid that separated was collected to yield 50 g. of the product, 7-chloro-1-ethyl-1,4-dihydro-4-oxo-1,8-naphthyridine-3-carboxylic acid, M.P. 252–255° C. with decomposition. For analysis, a 12 gram portion of the product was recrystallized from acetonitrile using decolorizing charcoal to yield 9.3 g. of white solid product which melted at 249.8–250.4° C. (corr.) and analyzed as follows:

*Analysis.*—Calcd. for $C_{11}H_9ClN_2O_3$: Cl, 14.05; N, 11.09. Found: Cl, 13.83; N, 11.24.

7-chloro-1-ethyl - 1,4 - dihydro - 4 - oxo-1,8-naphthyridine-3-carboxylic acid when tested according to standard in vitro bacteriological evaluation procedures was found to possess antibacterial activity, for example, to have B*s* and B*c* values, respectively, of 4.6 and <3.0 against *Staphylococcus aureus*, of 5.3 and 3.6 against *Eberthella typhi* and of 4.6 and 3.0 against *Clostridium welchii*.

Example 56

7-ethoxy-1-ethyl - 1,4 - dihydro - 4 - oxo-1,8-naphthyridine-3-carboxylic acid was prepared as follows: A 5.0 g. portion of 7-chloro-1-ethyl - 1,4 - dihydro - 4 - oxo - 1,8-naphthyridine-3-carboxylic acid was dissolved in 60 cc. of dry dimethylformamide at reflux. Heating was discontinued and to the solution was added over a 2 minute period 60 cc. of a 0.06 M solution of sodium ethoxide in dry ethanol. The reaction mixture was allowed to stand about 10 minutes and then poured into water. The aqueous mixture was made acidic with hydrochloric acid; and the solid that separated was collected, recrystallized once from ethanol and once from dimethylformamide to yield the product, 7-ethoxy-1-ethyl-1,4-dihydro-4-oxo-1,8-naphthyridine-3-carboxylic acid, M.P. 226.8–227.8° C. (corr.).

*Analysis.*—Calcd. for $C_{13}H_{14}N_2O_4$: C, 59.53; H, 5.38; N, 10.68. Found: C, 59.72; H, 5.25; N, 10.91.

7-ethoxy-1-ethyl - 1,4 - dihydro - 4 - oxo-1,8-naphthyridine-3-carboxylic acid when tested as described above was found to potentiate hexobarbital sleeping time in four out of six mice at a dose level of 200 mg./kg.

7-ethoxy-1-ethyl - 1,4 - dihydro - 4 - oxo-1,8-naphthyridine-3-carboxylic acid also can be obtained following the procedure described in Example 1 using molar equivalent quantities of 7-ethoxy-4-hydroxy-1,8-naphthyridine-3-carboxylic acid, potassium hydroxide, ethanol, water and ethyl iodide. The corresponding ethyl ester is obtained following the procedure described in Example 16 using ethyl 7-ethoxy-4-hydroxy-1,8-naphthyridine-3-carboxylate, sodium ethoxide, absolute ethanol and ethyl iodide.

Example 57

7-(2-diethylaminoethoxy) - 1 - ethyl - 1,4 - dihydro-4-oxo-1,8-naphthyridine-3-carboxylic acid was prepared as follows: To a solution of 13.8 g. of 2-diethylaminoethyl chloride hydrochloride in 75 cc. of dry ethanol was added 200 cc. of one molar solution of sodium ethoxide in ethanol. This mixture was combined with a solution of 14 g. of 1-ethyl - 1,4 - dihydro - 7 - hydroxy-4-oxo-1,8-naphthyridine-3-carboxylic acid in 100 cc. of dry dimethylformamide. The resulting slurry was refluxed on a steam bath for 3½ hours. Fifty cc. of water was added to the solid-liquid reaction mixture and it was concentrated to a syrupy solid which was dissolved in 100 cc. of water. The aqueous solution was treated with decolorizing charcoal and filtered. The filtrate was neutralized with acetic acid, chilled, and filtered. The filtrate was concentrated to a tan tarry solid which was extracted with hot acetone. Addition of 18% ethanolic hydrogen chloride to the hot acetone extract and cooling yielded 20 g. of cream solid which was collected and dried. The solid was dissolved in 100 cc. of water and 35 cc. of 10% potassium bicarbonate was added (pH=6.4). The solution was extracted several times with chloroform, adjusting the pH from about 6 to 7.5 between extractions. The combined extracts were dried over anhydrous sodium sulfate and concentrated to yield 11.4 g. of cream colored solid which was recrystallized twice from ethyl acetate to yield 6.8 g. (34%) of pale cream colored solid product, 7-(2-diethylaminoethoxy) - 1 - ethyl - 1,4 - dihydro - 4 - oxo-1,8-naphthyridine-3-carboxylic acid, M.P. 163.6–165.4° C. (corr.).

*Analysis.*—Calcd. for $C_{17}H_{23}N_3O_4$: C, 61.24; H, 6.95; N, 12.61. Found: C, 61.30; H, 6.74; N, 12.49.

Example 58

1-ethyl-7-ethylmercapto - 1,4 - dihydro - 4 - oxo-1,8-naphthyridine-3-carboxylic acid was prepared as follows: 12.0 g. of 7-chloro-1-ethyl - 1,4 - dihydro - 4 - oxo-1,8-naphthyridine-3-carboxylic acid was dissolved in 200 cc. of dry dimethylformamide by boiling. To this hot solution was added a mixture containing 18 g. of ethylmercaptan, 67 cc. of 10% aqueous potassium hydroxide solution and 100 cc. of ethanol. The resulting reaction mixture was allowed to stand for 5 minutes and then poured into about 1 liter of water containing excess hydrochloric acid. The precipitate that separated was collected, washed successively with water and a little ethanol, and then recrystallized from dimethylformamide. The recrystallized solid was triturated in hot ethanol, collected, and dried to yield 10.2 g. of the product, 1-ethyl-7-ethylmercapto-1,4-dihydro-4-oxo - 1,8 - naphthyridine - 3 - carboxylic acid, M.P. 217.2–218.4° C. (corr.).

*Analysis.*—Calcd. for $C_{13}H_{14}N_2O_3S$: N, 10.17; S, 11.51. Found: N, 10.32; S, 11.46.

1-ethyl-7-ethylmercapto - 1,4 - dihydro - 4 - oxo-1,8-naphthyridine-3-carboxylic acid when tested as described above was found to potentiate hexobarbital sleeping time in four out of six mice at a dose level of 200 mg./kg.

Example 59

7-dimethylamino - 1 - ethyl - 1,4 - dihydro-4-oxo-1,8-naphthyridine-3-carboxylic acid was prepared as follows: A mixture containing 12.6 g. of 7-chloro-1-ethyl-1,4-dihydro-4-oxo-1,8-naphthyridine - 3 - carboxylic acid and 50 cc. of 25% aqueous dimethylamine was heated on a steam bath for about 25 minutes. The resulting turbid solution was diluted with water and then poured into an excess of very dilute hydrochloric acid solution. The solid that separated was collected, triturated first with water and then with ethanol, and recrystallized from dimethylformamide. The recrystallized solid was triturated with boiling ethanol, collected and dried to yield 11.0 g. of the white product, 7-dimethylamino-1-ethyl - 1,4 - dihydro-4-oxo - 1,8 - naphthyridine-3-carboxylic acid, M.P. 271.4–272.2° C. (corr.).

Analysis.—Calcd. for $C_{13}H_{15}N_3O_3$: C, 59.76; N, 5.79; N, 16.08. Found: C, 59.89; H, 5.50; N, 16.08.

Example 60

7-(5-diethylamino-2-pentaylamino)-1-ethyl - 1,4 - dihydro-4-oxo - 1,8 - naphthyridine-3-carboxylic acid was prepared as follows: A mixture containing 12.6 g. of 7-chloro-1-ethyl-1,4-dihydro-4-oxo - 1,8 - naphthyridine-3-carboxylic acid, 15.9 g. of 5-diethylamino-2-pentylamine and 200 cc. of acetonitrile was refluxed for 4 hours, and the solvent was then removed by distilling in vacuo to yield a viscous, clear, oily material. The oily material was taken up in chloroform and extracted with aqueous potassium hydroxide solution. The alkaline solution was washed three times with chloroform, acidified with a slight excess of concentrated hydrochloric acid, washed with chloroform, neutralized with 10% aqueous potassium bicarbonate solution, and allowed to cool with stirring whereupon a solid slowly formed. The solid was collected and heated with isopropyl alcohol containing 20 cc. of 15% ethanolic hydrogen chloride. The hot solution was filtered, allowed to stand at room temperature, and the precipitate that formed was collected, washed with acetone, recrystallized from ethanol and air-dried to yield 5 g. of the product, 7-(5-diethylamino-2-pentylamino) - 1 - ethyl-1,4-dihydro-4-oxo-1,8-naphthyridine-3-carboxylic acid in the form of its hydrochloride, M.P. 242.0–243.2° C. (corr.).

Analysis.—Calcd. for $C_{20}H_{30}N_4O_3 \cdot HCl$: C, 58.46; H, 7.60; N, 13.62. Found: C, 58.46; H, 7.42; N, 13.58.

Example 61

1-ethyl-1,4-dihydro-7-hydrazino - 4 - oxo - 1,8 - naphthyridine-3-carboxylic acid was prepared as follows: 12.6 g. of 7-chloro-1-ethyl-1,4-dihydro-4-oxo-1,8-naphthyridine-3-carboxylic acid and 50 g. of hydrazine hydrate were mixed at room temperature and then warmed on a steam bath for about 1 hour. The reaction mixture was then allowed to cool and the solid that separated was collected and dissolved in about 200 cc. of water by warming on a steam bath. The hot solution was filtered and poured into 200 cc. of concentrated hydrochloric acid. The resulting mixture was stirred at room temperature and then cooled. The solid that separated was collected, washed well with water and then dissolved in aqueous potassium hydroxide solution. The alkaline solution was treated with decolorizing charcoal, filtered, and to the filtrate was added a slight excess of 6 N hydrochloric acid. The solid that separated was collected, washed with acetone and recrystallized from 6 N hydrochloric acid using decolorizing charcoal to yield 6.5 g. of the yellow product, 1-ethyl-1,4-dihydro - 7 - hydrazino-4-oxo-1,8-naphthyridine-3-carboxylic acid in the form of its hydrochloride, M.P. >300° C. (corr.).

Analysis.—Calcd. for $C_{11}H_{12}N_4O_3 \cdot HCl$: Cl, 12.44; H, 1968. Found: Cl, 12.40; N, 1967.

Example 62

1-(3-hydroxypropyl) - 1,4 - dihydro - 7 - methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 3-hydroxypropyl iodide. The corresponding ethyl ester is obtained following the procedure described in Example 16 using ethyl 4-hydroxy-7-methyl-1,8-naphthyridine-3-carboxylate, sodium ethoxide, absolute ethanol and 3-hydroxypropyl iodide.

Example 63

Ethyl 1-(3-chloropropyl) - 1,4 - dihydro-7-methyl-4-oxo-1,8-naphthyridine - 3 - carboxylate is obtained by reacting the corresponding 1-(3-hydroxypropyl) compound of the preceding example with a chloronating agent, for example, phosphorous oxychloride.

Example 64

1-(4-carboxybutyl) - 1,4 - dihydro - 7 - methyl-4-oxo-1,8-naphthyridine-3-carboxylic acid is obtained following the procedure described in Example 1 using 4-hydroxy-7-methyl - 1,8 - naphthyridine-3-carboxylic acid, potassium hydroxide, ethanol, water and 5-chloropentanoic acid.

Example 65

1-(2-carbethoxyethyl) - 1,4 - dihydro - 7 - methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and ethyl 3-bromopropanoate. The corresponding ethyl ester can be obtained following the procedure described in Example 16 using molar equivalent quantities of ethyl 4-hydroxy-7-methyl-1,8-naphthyridine-3-carboxylate, sodium ethoxide, absolute ethanol and ethyl 3-bromopropanoate.

Example 66

1-cyclopropylmethyl - 1,4 - dihydro - 7 - methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and cyclopropylmethyl chloride. The corresponding ethyl ester can be obtained following the procedure described in Example 16 using molar equivalent quantities of sodium ethoxide, absolute ethanol, ethyl 4-hydroxy-7-methyl-1,8-naphthyridine - 3 - carboxylate and cyclopropylmethyl chloride.

Example 67

1-cinnamyl - 1,4 - dihydro - 7 - methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and cinnamyl bromide.

Example 68

1(3-ethoxypropyl)-1,4-dihydro - 7 - methyl-4-oxo-1,8-naphthyridine-3-carboxylic acid is obtained following the procedure described in Example 24 using molar equivalent quantities of 4-hydroxy-7-methyl-1,8-naphthyridine-3-carboxylic acid, potassium hydroxide, ethanol, water and 3-ethoxypropyl bromide.

Example 69

1-(2-benzyloxyethyl)-1,4-dihydro - 7 - methyl-4-oxo-1,8-naphthyridine-3-carboxylic acid is obtained following the procedure described in Example 24 using molar equivalent quantities of 4-hydroxy-7-methyl-1,8-naphthyridine-3-carboxylic acid, potassium hydroxide, ethanol, water and 2-benzyloxyethyl iodide.

Example 70

Ethyl 1,4-dihydro-7 - methyl - 4-oxo-1-(3-phenoxypropyl)-1,8-naphthyridine-3-carboxylate is obtained following the procedure described in Example 16 using molar equivalent quantities of ethyl 4-hydroxy-7-methyl-1,8-naphthyridine-3-carboxylate, sodium ethoxide, absolute ethanol and 3-phenoxypropyl chloride.

Example 71

1-(4-ethoxybenzyl)-1,4-dihydro - 7 - methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 4-ethoxybenzyl chloride. The corresponding sodium salt can be obtained following the procedure described in Example 2 using molar equivalent quantities of the acid, sodium hydroxide and ethanol. The corresponding ethyl ester can be obtained following the procedure described in Example 16 using molar equivalent quantities of ethyl 4-hydroxy-7-methyl-1,8 - naphthyridine - 3-carboxylate, sodium ethoxide, absolute ethanol and 4-ethoxybenzyl chloride.

Example 72

1-(3-bromobenzyl)-1,4-dihydro - 7 - methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 3-bromobenzyl bromide.

Example 73

1-(4-biphenylylmethyl)-1,4-dihydro - 7 - methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 4-biphenylmethyl chloride.

Example 74

7-methyl-1,4-dihydro-4-oxo-1-(2 - thienylmethyl)-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 2-thienylmethyl chloride.

Example 75

1-(3-dimethylaminopropyl)-1,4-dihydro - 7 - methyl-4-oxo-1,8-naphthyridine-3-carboxylic acid is obtained following the procedure described in Example 30 using molar equivalent quantities of 4-hydroxy-7-methyl-1,8-naphthyridine-3-carboxylic acid, potassium hydroxide, ethanol, water and 3-dimethylaminopropyl chloride hydrochloride. The corresponding ethyl ester can be obtained following the procedure described in Example 16 using molar equivalent quantities of sodium ethoxide, absolute ethanol, ethyl 4-hydroxy-7-methyl-1,8-naphthyridine-3-carboxylate and 3-dimethylaminopropyl chloride hydrochloride.

Example 76

1(2-di-n-butylaminoethyl)-1,4-dihydro - 7 - methyl-4-oxo-1,8-naphthyridine-3-carboxylic acid is obtained following the procedure described in Example 30 using molar equivalent quantities of 4-hydroxy-7-methyl-1,8-naphthyridine-3-carboxylic acid, potassium hydroxide, ethanol, water and 2-di-n-butylaminoethyl chloride hydrochloride.

Example 77

7-methyl-1,4-dihydro-4-oxo-1-[2 - (1-piperidyl)ethyl]-1,8-naphthyridine-3-carboxylic acid is obtained following the procedure described in Example 30 using molar equivalent quantities of 4-hydroxy-7-methyl-1,8-naphthyridine-3-carboxylic acid, potassium hydroxide, ethanol, water and 2-(1-piperidyl)ethyl chloride hydrochloride.

Example 78

1-cyclohexylmethyl-1,4-dihydro - 7 - (3,4-dimethoxystyryl)-4-oxo-1,8-naphthyridine-3-carboxylic acid is obtained following the procedure described in Example 33 using 7-(3,4-dimethoxystyryl) - 4-hydroxy-1,8-naphthyridine-3-carboxylic acid, potassium hydroxide, ethanol, water and cyclohexylmethyl chloride. The corresponding ethyl ester can be prepared following the procedure described in Example 34 using ethyl 7-(3,4-dimethoxystyryl)-4-hydroxy-1,8-naphthyridine - 3-carboxylate, potassium hydroxide, ethanol, water and cyclohexylmethyl chloride. The above intermediate ethyl 7-(3,4-dimethoxystyryl)-4-hydroxy - 1,8 - naphthyridine-3-carboxylate and corresponding 3-carboxylic acid are obtained following the procedure described in Example 33 using molar equivalent quantities of ethyl 4-hydroxy-7-methyl-1,8-naphthyridine-3-carboxylate, 3,4-dimethoxybenzaldehyde, acetic and acetic anhydride to obtain the ester and then hydrolyzing it with aqueous potassium hydroxide solution to obtain the corresponding intermediate acid.

Example 79

7-(4-chlorostyryl) - 1 - [3-(N,N-dimethylcarbamyl)propyl]-1,4-dihydro-4 - oxo - 1,8 - naphthyridine-3-carboxylic acid is obtained following the procedure described in Example 33 using molar equivalent quantities of 7-(4-chlorostyryl)-4-hydroxy - 1,8 - naphthyridine-3-carboxylic acid, potassium hydroxide, ethanol, water and 3-(N,N-dimethylcarbamyl)propyl bromide. The intermediate 7-(4-chlorostyryl)-4-hydroxy - 1,8-naphthyridine-3-carboxylic acid is obtained following the procedure described in Example 33 using molar equivalent quantities of ethyl 4-hydroxy-7-methyl-1,8-naphthyridine-3-carboxylate, 4-chlorobenzaldehyde, acetic acid and acetic anhydride to obtain the intermediate ethyl ester which is then converted into the corresponding acid by hydrolysis with potassium hydroxide solution.

Example 80

Ethyl 1-carbo-n-hexyloxymethyl-1,4-dihydro - 4-oxo-7-styryl-1,8-naphthyridine-3-carboxylate is obtained following the procedure described in Example 16 using molar equivalent quantities of ethyl 4-hydroxy-7-styryl-1,8-naphthyridine-3-carboxylate, sodium ethoxide, absolute ethanol and n-hexyl chloroacetate.

Example 81

1-(2-methoxyethyl)-1,4-dihydro - 4 - oxo-7-styryl-1,8-naphthyridine-3-carboxylic acid is obtained following the procedure described in Example 33 using molar equivalent quantities of 4-hydroxy-7-styryl-1,8-naphthyridine-3-carboxylic acid, potassium hydroxide, ethanol, water and 2-methoxyethyl bromide.

Example 82

7-(4-methylmercaptostyryl) - 1,4 - dihydro-4-oxo-1-(3-phenylpropyl)-1,8-naphthyridine-3-carboxylic acid is obtained following the procedure described in Example 33 using molar equivalent quantities of 4-hydroxy-7-(4-methylmercaptostyryl)-1,8-naphthyridine-3-carboxylic acid, potassium hydroxide, ethanol, water and 3-phenylpropyl iodide. The intermediate 4-hydroxy-7-(4-methylmercaptostyryl)-1,8-naphthyridine-3-carboxylic acid is obtained following the procedure described in Example 33 using molar equivalent quantities of ethyl 4-hydroxy-7-methyl-1,8-naphthyridine-3-carboxylate, 4-methylmercaptobenzaldehyde, acetic acid and acetic anhydride to obtain the corresponding ethyl ester which is then saponified with aqueous potassium hydroxide solution to form the corresponding intermediate acid.

Example 83

4-oxo-1,4-dihydro-7-styryl - 1 - (3-thienylmethyl)-1,8-naphthyridine-3-carboxylic acid is obtained following the procedure described in Example 33 using molar equivalent quantities of 4-hydroxy-7-styryl-1,8-naphthyridine-3-carboxylic acid, potassium hydroxide, ethanol, water and 3-thienylmethyl bromide.

Example 84

4-oxo - 1,4 - dihydro-1-[3-(4-pyridyl)propyl]-7-styryl-1,8-naphthyridine-3-carboxylic acid is obtained following the procedure described in Example 33 using 4-hydroxy-7-styryl-1,8-naphthyridine-3-carboxylic acid, potassium hydroxide, ethanol, water and 3-(4-pyridyl)propyl chloride hydrochloride.

Example 85

1-(4 - dimethylaminobutyl)-1,4-dihydro-4-oxo-7-styryl-1,8-naphthyridine-3-carboxylic acid is obtained following the procedure described in Example 30 using molar equivalent quantities of 4-hydroxy-7-styryl-1,8-naphthyridine-3-carboxylic acid, potassium hydroxide, ethanol, water and 4-diethylaminobutyl chloride. The corresponding ethyl ester can be obtained following the procedure described in Example 34 using molar equivalent quantities of ethyl 4-hydroxy-7-styryl-1,8-naphthyridine-3 - carboxylate, potassium hydroxide, ethanol, water and 4-diethylaminobutyl chloride hydrochloride.

Example 86

1-[3-(1 - pyrrolidyl)propyl]-1,4-dihydro-4-oxo-7-styryl-1,8-naphthyridine-3-carboxylic acid is obtained following the procedure described in Example 30 using molar equivalent quantities of 4-hydroxy-7-styryl-1,8-naphthyridine-3-carboxylic acid, potassium hydroxide, ethanol, water and 3-(1-pyrrolidyl)propyl chloride hydrochloride.

Example 87

1-ethyl-1,4-dihydro - 4 - oxo-7-[2-(3-pyridyl)ethenyl]-1,8-naphthyridine-3-carboxylic acid is obtained following the procedure described in Example 33 using molar equivalent quantities of 4-hydroxy-7-[2-(3-pyridyl)ethenyl]-1,8-naphthyridine-3-carboxylic acid, potassium hydroxide, ethanol, water and ethyl iodide. The intermediate 4-hydroxy-7-[2-(3 - pyridyl)ethenyl]-1,8-naphthyridine-3-carboxylic acid is obtained in two steps following the procedure described in Example 33 using molar equivalent quantities first of ethyl 4-hydroxy-7-methyl - 1,8 - naphthyridine-3-carboxylate, pyridine-3-aldehyde, acetic acid and acetic anhydride to yield ethyl 4-hydroxy-7-[2-(3-pyridyl)ethenyl]-1,8-naphthyridine-3-carboxylate and then reacting this ester with aqueous potassium hydroxide solution to yield the corresponding intermediate acid.

Example 88

7-n-butoxy-1-ethyl-1,4-dihydro-4-oxo-1,8-naphthyridine-3-carboxylic acid is obtained following the procedure described in Example 56 using molar equivalent quantities of 7-chloro-1-ethyl-1,4-dihydro-4-oxo-1,8-naphthyridine-3-carboxylic acid, dimethylformamide, sodium n-butoxide and n-butanol. The sodium salt of this acid can be obtained following the procedure described in Example 2 using molar equivalent quantities of the acid and sodium hydroxide in ethanol. Alternatively, the acid can be obtained following the procedure described in Example 1 using molar equivalent quantities of 7-n-butoxy-4-hydroxy-1,8-naphthyridine-3-carboxylic acid, potassium hydroxide, ethanol, water and ethyl iodide.

Example 89

1-ethyl-1,4-dihydro-4-oxo-7-phenoxy-1,8-naphthyridine-3-carboxylic acid is obtained following the procedure described in Example 56 using molar equivalent quantities of 7-chloro-1-ethyl-1,4-dihydro-4-oxo-1,8-naphthyridine-3-carboxylic acid and sodium phenoxide.

Example 90

7-n-butanoylamino-1-ethyl-1,4-dihydro-4-oxo-1,8-naphthyridine-3-carboxylic acid is obtained following the procedure described in Example 51 using molar equivalent quantities of 7-amino-1-ethyl-1,4-dihydro-4-oxo-1,8-naphthyridine-3-carboxylic acid, n-butanoic anhydride and sulfuric acid.

Example 91

7-n-butylamino-1-ethyl-1,4-dihydro-4-oxo-1,8-naphthyridine-3-carboxylic acid is obtained following the procedure described in Example 59 using molar equivalent quantities of 7-chloro-1-ethyl-1,4-dihydro-4-oxo-1,8-naphthyridine-3-carboxylic acid and n-butylamine.

Example 92

1 - ethyl-1,4-dihydro - 4 - oxo-7-[2-(1-piperidyl)ethylamino]1,8-naphthyridine-3-carboxylic acid is obtained following the procedure described in Example 60 using molar equivalent quantities of 7-chloro-1-ethyl-1,4-dihydro-4-oxo-1,8-naphthyridine-3-carboxylic acid, 2-(1-piperidyl)ethylamine and acetonitrile. This compound can be isolated in its free base form or in the form of its acid-addition salt, for example, its hydrochloride.

Example 93

1-ethyl-1,4-dihydro-7-methyl-4-oxo-1,8-naphthyridine-3-carboxylic acid is obtained by alkylating the dipotassium salt of 4-hydroxy-7-methyl-1,8-naphthyridine-3-carboxylic acid as follows: A 4.6 g. portion of ethyl 4-hydroxy-7-methyl-1,8-naphthyridine-3-carboxylate was dissolved by warming it in an aqueous solution containing 2.6 g. of potassium hydroxide. The solution was then evaporated to dryness on a steam bath in vacuo. Benzene was added and distilled to remove the last traces of water. There was thus obtained the dipotassium salt of 4-hydroxy-7-methyl-1,8-naphthyridine-3-carboxylic acid. To this dipotassium salt was added 30 cc. of ethyl sulfate and the mixture was heated upon a steam bath in a flask sealed with a drying tube containing anhydrous calcium sulfate. The reaction mixture was heated for 4 hours and poured into water. The resulting mixture was heated with stirring and excess 10% aqueous potassium hydroxide solution was added to destroy the excess ethyl sulfate. The mixture was stirred for 30 minutes and then allowed to stand overnight. The solution was acidified with 6 N hydrochloric acid solution and the precipitate that separated was collected, recrystallized from acetonitrile using decolorizing charcoal and air-dried to yield 2.2 g. (48%) of 1-ethyl-1,4-dihydro-7-methyl-4-oxo - 1,8 - naphthyridine-3-carboxylic acid, M.P. 229–231° C. A mixed melting point of this product with the product obtained in Example 1 by reacting 4 - hydroxy-7-methyl-1,8-naphthyridine-3-carboxylic acid with ethyl iodide gave no depression.

Example 94

1-ethyl-1,4-dihydro-7-methyl - 4 - oxo - 1,8-naphthyridine-3-nitrile was prepared as follows: A mixture containing 23.1 g. of 1-ethyl-1,4-dihydro-7-methyl-4-oxo-1,8-naphthyridine-3-carboxamide, 19.4 g. of benzenesulfonyl chloride and 20 g. of pyridine was stirred at room temperature for about 10 minutes with no rise in temperature noted. The reaction mixture was then warmed with stirring up to about 75° C. Stirring was continued with no external heating whereupon the inside temperature rose slowly to about 80° C. After dissolution had been completed, the reaction mixture was allowed to cool to room temperature whereupon it solidified. It was then broken up, taken up with water and a relatively large volume of chloroform, and the resulting mixture was filtered through diatomaceous earth. The chloroform layer was separated and washed successively with 1 N hydrochloric acid, water and dilute ammonium hydroxide solution. It was then dried over anhydrous potassium carbonate, filtered, and evaporated to dryness. The resulting solid was recrystallized from ethanol using decolorizing charcoal and airdried to yield 10 g. of the product, 1-ethyl-1,4-dihydro-7-methyl-4-oxo-1,8-naphthyridine-3-nitrile, M.P. 220–226° C. (corr.).

*Analysis.*—Calcd. for $C_{12}H_{11}N_3O$: C, 67.60; H, 5.20; N, 19.70. Found: C, 67.29; H, 5.15; N, 20.00.

Example 95

1-ethyl - 1,4 - dihydro - 7 - (4-nitrostyryl)-4-oxo-1,8-naphthyridine-3-carboxylic acid is obtained following the procedure described in Example 33 using molar equivalent quantities of 4-hydroxy-7-(4-nitrostyryl)-1,8-naphthyridine-3-carboxylic acid, potassium hydroxide, ethanol, water and ethyl iodide. The corresponding ethyl ester is obtained following the procedure described in Example 34 using molar equivalent quantities of ethyl 4-hydroxy-7-(4-nitrostyryl) - 1,8 - naphthyridine - 3 - carboxylate, potassium hydroxide, ethanol, water and ethyl iodide.

The above intermediate ethyl 4-hydroxy-7-(4-nitrostyryl)-1,8-naphthyridine-3-carboxylate was obtained following the procedure described in Example 33 using 76.6 g. of ethyl 4-hydroxy-7-methyl-1,8-naphthyridine-3-carboxylate, 50 g. of 4-nitrobenzaldehyde, 110 cc. of acetic acid and 185 cc. of acetic anhydride. There was thus obtained 57.0 g. (47%) of the intermediate ester after one recrystallization from dimethylformamide using decolorizing charcoal. A 15 gram sample was recrystallized a second time from dimethylformamide for analysis to yield 13.6 g. of the doubly recrystallized ester, M.P. >300° C. (corr.).

*Analysis.*—Calcd. for $C_{19}H_{15}N_3O_5$: C, 62.48; H, 4.14; N, 11.50. Found: C, 62.74; H, 4.11; N, 11.45.

The intermediate ester is converted into its corresponding carboxylic acid following the procedure described in Example 33 using molar equivalent quantities of the ester and 10% aqueous potassium hydroxide solution.

Example 96

1,4-bis(3 - carboxy - 1,4 - dihydro-7-methyl-4-oxo-1,8-naphthyridyl-1)-2-butene was prepared as follows: To a refluxed mixture containing 20.4 g. of 4-hydroxy-7-methyl-1,8-naphthyridine-3-carboxylic acid, 19.5 g. of potassium hydroxide, 150 cc. of water and 385 cc. of ethanol was added dropwise over a period of 90 minutes a solution containing 6.25 g. of 1,4-dichloro-2-butene dissolved in 25 cc. of ethanol. Refluxing was continued for an additional 90 minutes and the reaction mixture was then allowed to cool and stand overnight at room temperature. The crystalline solid that had separated was dissolved by heating the reaction mixture to reflux and the resulting solution was acidified with 19 cc. of concentrated hydrochloric acid. Some solid separated and the resulting mixture was cooled in an ice bath to yield more solid. The solid was collected, washed with water, recrystallized from formic acid using decolorizing charcoal and then recrystallized a second time from dimethyl sulfoxide to yield 1.1 g. of product, 1,4-bis(3-carboxy-1,4-dihydro-7-methyl-4-oxo-1,8-naphthyridyl-1)-2-butene, M.P. 365° C. with decomposition.

*Analysis.*—Calcd. for $C_{24}H_{20}N_4O_6$: C, 62.60; H, 4.38; N, 12.17. Found: C, 62.56; H, 4.20; N, 12.22.

Example 97

1,4-bis(3 - carboxy - 1,4 - dihydro-7-methyl-4-oxo-1,8-naphthyridyl-1)-butane was prepared by catalytically hydrogenating the corresponding 2-butene derivative as follows: A mixture containing 0.8 g. of 1,4-bis(3-carboxy-1,4-dihydro - 7 - methyl - 4 - oxo-1,8-naphthyridine-1)-2-butene, 4 cc. of 10% aqueous potassium hydroxide solution, 150 cc. of water and Raney nickel was shaken with hydrogen under pressure (50 lbs. per sq. in.) at room temperature (27° C.). After about 40 minutes the uptake of hydrogen had stopped. The mixture was shaken for an additional hour; and the catalyst was filtered and washed with dilute potassium hydroxide solution. The filtrate was heated to boiling and acidified with concentrated hydrochloric acid. The white solid that separated was collected, recrystallized from dimethyl sulfoxide using decolorizing charcoal, washed with acetone and dried in vacuo at 70° C. to yield 0.3 g. of the product, 1,4-bis(3-carboxy-1,4-dihydro-7-methyl-4-oxo-1,8 - naphthyridyl-1) butane, M.P. 342–343° C. with decomposition.

*Analysis.*—Calcd. for $C_{24}H_{22}N_4O_6$: C, 62.33; H, 4.80; N, 12.12. Found: C, 62.35; H, 4.99; N, 11.60.

Example 98

Ethyl, 6,7 - dimethyl - 1 - ethyl-1,4-dihydro-4-oxo-1,8-naphthyridine-3-carboxylate was prepared as follows: A mixture containing 12.3 g. of ethyl 6,7-dimethyl-4-hydroxy-1,8-naphthyridine-3-carboxylate, 15.4 g. of diethyl sulfate, 21.5 g. of anhydrous potassium carbonate and 100 cc. of dimethylformamide was stirred while heating on a steam bath for about 60 minutes. The reaction mixture was poured into a mixture of ice and water (about 2 liters) and the aqueous mixture was stirred for 30 minutes. The precipitate was collected and dried at 80° C. to yield 12 g. of the product, ethyl 6,7-dimethyl-1-ethyl-1,4-dihydro-4-oxo-1,8-naphthyridine - 3 - carboxylate. A 1 gram sample of this ethyl ester was recrystallized from isopropyl alcohol, using decolorizing charcoal, and dried at 80° C. to yield an analytically pure sample melting at 181.0–183.0° C. (corr.).

*Analysis.*—Calcd. for $C_{15}H_{18}N_2O_3$: C, 65.67; H, 6.61; N, 10.21. Found: C, 65.38; H, 6.77; N, 10.28.

Ethyl 6,7-dimethyl-1-ethyl-1,4-dihydro-4-oxo-1,8-naphthyridine-3-carboxylate was found to have significant in vivo activity against *Staphylococcus aureus* in mice when administered at a dose level of 400 mg./kg./d.

The intermediate ethyl 6,7-dimethyl - 4 - hydroxy-1,8-naphthyridine-3-carboxylate was prepared in several steps starting with 2-amino-5,6-dimethylpyridine as follows: A mixture containing 33 g. of 2-amino-5,6-dimethylpyridine and 58 g. of ethoxymethylenemalonic ester was heated for 2 hours on a steam bath, allowing the ethanol to distill off during this reaction period. The reaction mixture was allowed to cool and the resulting solid was recrystallized from isopropyl alcohol using decolorizing charcoal to yield 56 g. (71% yield) of diethyl N-(5,6-dimethyl - 2 - pyridyl) - aminomethylenemalonate, M.P. 117.0–119.2° C. (corr.).

*Analysis.*—Calcd. for $C_{15}H_{20}N_2O_4$: C, 61,63; H, 6.90; N, 9.58. Found: C, 61.41; H, 6.78; N, 9.85.

A solution containing 50 g. of diethyl N-(5,6-dimethyl-2-pyridyl)aminomethylenemalonate in 50 cc. of diethyl phthalate was heated to 150° C. and added, with stirring to 400 cc. of diethyl phthalate heated to reflux (285° C.). The temperature was then brought back to 285° C. and held there for about 10 minutes. The heating source was removed and 100 cc. of ethanol was added slowly to cool the reaction mixture, the temperature dropping to about 150° C. The reaction mixture was then allowed to cool to room temperature with stirring. The precipitate was collected, washed with ethyl acetate and dried overnight at 80° C. to yield 30 g. (72%) of ethyl 6,7-dimethyl-4-hydroxy - 1,8 - naphthyridine-3-carboxylate. For analysis a 3 gram sample was recrystallized from isopropyl alcohol using decolorizing charcoal and dried at 80° C. to yield 2.5 g. of the product, M.P. 267.0–268.0° C. (corr.) with decomposition.

*Analysis.*—Calcd. for $C_{13}H_{14}N_2O_3$: C, 63.40; H, 5.73; N, 11.38. Found: C, 63.48; H, 5.87; N, 11.47.

The intermediate 2-amino-5,6-dimethylpyridine was prepared as follows: To a refluxing mixture containing sodamide (prepared from 85 g. of sodium and liquid ammonia) and 1500 cc. of xylene was added 321 g. of 2,3-dimethylpyridine during a 15 minute period. The reaction mixture was refluxed with stirring for 10 hours. To the reaction mixture was added 300 cc. of methanol with stirring to dissolve the separated solid. Two liters of water was then added slowly with stirring; the solution made acidic with concentrated hydrochloric acid; and ice added to cool the mixture. The xylene layer was separated and the aqueous layer then made basic with 35% aqueous sodium hydroxide solution, adding ice to cool the solution. The alkaline solution was then extracted with chloroform; and the chloroform extract was dried and evaporated in vacuo to remove the chloroform. The residual material was distilled in vacuo to yield a fraction distilling at 130–135° C. at 25 mm., $n_D^{25}=1.5678$. This fraction was redistilled to yield a 29 g. fraction at 120–129° C. at 23 mm. and a 5 g. fraction at 129–150° C. at 23 mm. There was thus obtained 34 g. (9.2%) of 2-amino-5,6-dimethylpyridine, a solid when cold.

Example 99

6,7-dimethyl - 1 - ethyl - 1,4 - dihydro-4-oxo-1,8-naphthyridine-3-carboxylic acid was prepared as follows: A mixture containing 9.5 g. of ethyl 6,7-dimethyl-1-ethyl-1,4 - dihydro 4-oxo-1,8-naphthyridine-3-carboxylate and 50 cc. of 10% aqueous potassium hydroxide solution was heated, with occasional stirring, on a steam bath for about 30 minutes. The reaction mixture was then treated with decolorizing charcoal, filtered, and the filtrate poured into an excess of dilute aqueous hydrochloric acid. The resulting precipitate was collected, washed with water, recrystallized once from acetonitrile and once from dioxane, and air-dried to yield 5.0 g. of the product, 6,7-dimethyl-1-ethyl-1,4-dihydro-4-oxo - 1,8 - naphthyridine-3-carboxylic acid, M.P. 266.8–267.2° C. (corr.) with decomposition.

*Analysis.*—Calcd. for $C_{13}H_{14}N_2O_3$: C, 63.40; H, 5.73; N, 11.38. Found: C, 63.56; H, 5.81; N, 11.29.

Example 100

1,6,7-trimethyl - 1,4 - dihydro-4-oxo-1,8-naphthyridine-3-carboxylic acid was prepared as follows: A mixture containing 4.9 g. of ethyl 6,7-dimethyl-4-hydroxy-1,8-naphthyridine-3-carboxylate, 5.0 g. of dimethyl sulfate, 8.3 g. of anhydrous potassium carbonate and 50 cc. of dimethylformamide was heated with stirring on a steam bath for about 2 hours. The reaction mixture was then poured into a mixture of ice and water and the resulting aqueous mixture was allowed to warm up to room temperature. The resulting precipitate was collected, warmed on a steam bath with 50 cc. of 10% aqueous potassium hydroxide solution with occasional stirring. The alkaline solution was treated with decolorizing charcoal, filtered and the filtrate acidified with concentrated hydrochloric acid. The resulting precipitate was collected, recrystallized from acetonitrile, using decolorizing charcoal, and then dried at 80° C. to yield 3.5 g. (76%) of the product, 1,6,7-trimethyl - 1,4 - dihydro-4-oxo-1,8-naphthyridine-3-carboxylic acid. M.P. 397.6–299.0° C. (corr.) with decomposition.

*Analysis.*—Calcd. for $C_{12}H_{12}N_2O_3$: C, 62.06; H, 5.21; N, 12.06. Found: C, 61.83; H, 5.04; N, 11.92.

1,6,7-trimethyl-1,4-dihydro - 4 - oxo-1,8-naphthyridine-3-carboxylic acid was found to have significant in vivo activity against *Staphylococcus aureus* in mice when administered at a dose level of 400 mg./kg./d.

Example 101

6,7-dimethyl-1,4-dihydro - 1 - n-propyl-4-oxo-1,8-naphthyridine-3-carboxylic acid was prepared as follows: A mixture containing 7.0 g. of ethyl 6,7-dimethyl - 4 - hydroxy-1,8-naphthyridine-3-carboxylate, 6.9 g. of n-propyl bromide, 11.5 g. of anhydrous potassium carbonate and 75 cc. of dimethylformamide was heated with stirring on a steam bath for 2 hours. The mixture was poured into about 700 cc. of ice and water, the resulting aqueous mixture stirred a few minutes, and the precipitate collected. The precipitate was warmed on a steam bath with about 75 cc. of 10% aqueous potassium hydroxide solution for about 30 minutes with occcasional stirring. The alkaline solution was treated with decolorizing charcoal, filtered, and the filtrate acidified with concentrated hydrochloric acid. The resulting precipitate was collected and recrystallized from isopropyl alcohol, using decolorizing charcoal, and dried at 80° C. to yield 4.0 g. (55%) of the product, 6,7 - dimethyl-1,4-dihydro-1-n-propyl - 4 - oxo-1,8-naphthyridine-3-carboxylic acid, M.P. 215.6–218.0° C. (corr.).

*Analysis.*—Calcd. for $C_{14}H_{16}N_2O_3$: C, 64.60; H, 6.20; N, 10.70. Found: C, 64.81; H, 6.18; N, 10.71.

Example 102

1,7-diethyl-1,4-dihydro - 4 - oxo-1,8-naphthyridine-3-carboxylic acid was prepared as follows: A mixture containing 12.3 g. of ethyl 7-ethyl-4-hydroxy - 18 - naphthyridine-3-carboxylate, 15.4 g. of diethyl sulfate, 20.5 g. of anhydrous potassium carbonate and 300 cc. of isobutyl methyl ketone was refluxed with stirring for 24 hours. The reaction mixture was evaporated to dryness and the residual material taken up with 200 cc. of water and 100 cc. of 10% aqueous potassium hydroxide solution. The resulting mixture was refluxed for about 3 hours, treated with decolorizing charcoal, filtered while hot, allowed to cool, washed with chloroform and acidified with dilute aqueous hydrochloric acid. The resulting precipitate was collected, recrystallized from isopropyl alcohol, using decolorizing charcoal, and dried overnight at 70° C. to yield 6.5 g. (53%) of the product, 1,7-diethyl-1,4-dihydro-4-oxo-1,8-naphthyridine - 3 - carboxylic acid, M.P. 174.2–176.0° C. (corr.).

*Analysis.*—Calcd. for $C_{13}H_{14}N_2O_3$: C, 63.40; H, 5.73; N, 11.38. Found: C, 63.61; H, 5.41; N, 11.28.

1,7-diethyl - 1,4 - dihydro-4-oxo-1,8-naphthyridine-3-carboxylic acid was found to have significant in vivo activity against *Klebsiella pneumoniae, Escherichia coli* and *Salmonella typhimurium* in mice when administered orally at respective dose levels of 200, 50 and 200 mg./kg./d.

The intermediate ethyl 7-ethyl-4-hydroxy-1,8-naphthyridine-3-carboxylate was prepared in several steps starting with 2-amino-6-ethylpyridine following the procedure described above in Example 98. There was first obtained 112 g. (84% yield) of diethyl N-(6-ethyl-2-pyridyl)aminomethylenemalonate, M.P. 64–66° C., recrystallized from n-hexane using decolorizing charcoal, from 55 g. of 2-amino - 6 - ethylpyridine and 98 g. of ethoxymethylenemalonic ester. About 35 g. of ethyl 7-ethyl-4-hydroxy-1,8-naphthyridine-3-carboxylate was obtained using 96 g. of diethyl N-(6 - ethyl-2-pyridyl)aminomethylenemalonate and 800 cc. of diethyl phthalate, this amount being obtained after one recrystallization from dimethylformamide using decolorizing charcoal. A 6 gram portion was recrystallized from dioxane, washed with n-hexane and air-dried to yield 6 g. of an analytically pure sample M.P. 254.4–256.2° C. (corr.) with decomposition.

*Analysis.*—Calcd. for $C_{13}H_{14}N_2O_3$: C, 63.40; H, 5.73; N, 11.38. Found: C, 63.70; H, 5.46; N, 11.34.

2-amino-6-ethylpyridine was prepared by reacting 2-ethylpyridine with sodamide following the procedure described in Example 98. From 107 g. of 2-ethylpyridine there was obtained 25 g. of a fraction distilling at 120–125° C. at 0.05 mm., $n_D^{25}=1.5992$, which solidified on cooling. This solid 2-amino-6-ethylpyridine was converted into its picrate which was recrystallized from ethanol and found to melt at 191–193° C.

*Anaysis.*—Calcd. for $C_{20}H_{20}N_6O_7$: C, 52.63; H, 4.42; N, 18.42. Found: C, 52.66; H, 4.18; N, 18.45.

Example 103

7-ethyl-1,4-dihydro - 1 - methyl - 4 - oxo-1,8-naphthyridine-3-carboxylic acid was prepared as follows: A mixture containing 12.3 g. of ethyl 1-ethyl-4-hydroxy-1,8-naphthyridine-3-carboxylate and 300 cc. of 10% aqueous potassium hydroxide solution was stirred on a steam bath for 1 hour after which time the naphthyridine had dissolved. To this solution was added 300 cc. of ethanol and 10 cc. of methyl iodide and the resulting reaction mixture was refluxed with stirring. Ten cc. portions of methyl iodide were added after 1, 5 and 6 hours of refluxing. The reaction mixture was then refluxed overnight with stirring. The reaction mixture was treated with decolorizing charcoal, filtered, and the filtrate evaporated to dryness. The residue was taken up in water and acidified with excess concentrated hydrochloric acid to yield a yellow precipitate. The precipitate was collected, washed with acetone, recrystallized from acetonitrile using decolorizing charcoal and dried in vacuo at 70° C. for 5 hours to yield 5 g. of the product, 7-ethyl-1,4-dihydro-1-methyl-4-oxo-1,8-naphthyridine-3-carboxylic acid, M.P. 243.4–244.2° C. (corr.).

Analysis.—Calcd. for $C_{12}H_{12}N_2O_3$: C, 62.06; H, 5.21; N, 12.06. Found: C, 62.30; H, 5.54; N, 12.05.

Example 104

1-(2-benzyloxyethyl) - 1,4-dihydro-7-methyl-4-oxo-1,8-naphthyridine-3 - carboxylic acid was prepared following the procedure described in Example 1 using 59.6 g. of 4 - hydroxy-7-methyl-1,8-naphthyridine-3-carboxylic acid, 62.2 g. of potassium hydroxide, 1230 cc. of ethanol, 480 cc. of water, 108.7 g. of 2-benzyloxyethyl chloride, 10 g. of potassium iodide, and a reflux period of 5 days. After recrystallizing from acetonitrile and drying in a vacuum oven at 70° C., there was obtained 42.3 g. of 1-(2- benzyloxyethyl) - 1,4 - dihydro - 7 - methyl-4-oxo-1,8-naphthyridine-3-carboxylic acid, M.P. 161.4–162.2° C. (corr.).

Analysis.—Calcd. for $C_{19}H_{18}N_2O_4$: C, 67.44; H, 5.38; N, 8.28. Found: C, 67.31; H, 5.43; N, 8.15.

Example 105

1-(2-hydroxyethyl)-1,4-dihydro-7-methyl - 4 - oxo-1,8-naphthyridine-3-carboxylic acid was prepared following the procedure described in Example 1 using 20.4 g. of 4 - hydroxy - 7 - methyl-1,8-naphthyridine-3-carboxylic acid, 39 g. of potassium hydroxide, 385 cc. of ethanol, 150 cc. of water, 42.8 g. of vinyl 2-chloroethyl ether, 3 g. of potassium iodide, and a reflux period of 5 days. The reaction mixture which contained 1,4 - dihydro-7-methyl-4 - oxo - 1 - (2-vinyloxyethyl)-1,8-naphthyridine-3-carboxylic acid was heated to reflux and acidified with concentrated hydrochloric acid to cleave the vinyl ether and produce the corresponding 1-(2-hydroxyethyl) compound. The reaction mixture was cooled in an ice bath and the separated product was collected, washed with water, recrystallized once from acetonitrile and twice from methanol, and dried in a vacuum oven at 70° C. for 6 hours to yield 3.4 g. of the product, 1-(2-hydroxyethyl)-1,4-dihydro-7-methyl-4-oxo-1,8-naphthyridine - 3 - carboxylic acid, M.P. 230–234.2° C. (corr.) with decomposition.

Analysis.—Calcd. for $C_{12}H_{12}N_2O_4$: C, 58.04; H, 4.88; N, 11.29. Found: C, 57.95; H, 4.65; N, 11.15.

1-(2-hydroxyethyl)-1,4-dihydro-7-methyl - 4 - oxo-1,8-naphthyridine-3-carboxylic acid was found to have significant in vivo activity against Klebsiella pneumoniae in mice when administered orally at a dose level or 200 mg./kg./d.

1-(2-hydroxyethyl)-1,4-dihydro-7-methyl - 4 - oxo-1,8-naphthyridine-3-carboxylic acid was also prepared by catalytically reducing the corresponding 1-(2-benzyloxyethyl) compound of Example 104 using 3.5 g. of the 1-(2-benzyloxyethyl) compound, 150 cc. of acetic acid, 0.5 g. of 10% palladium on charcoal and an initial pressure of hydrogen of 49 lbs. per sq. inch. A mixed melting point with the above product obtained from the vinyl ether was not depressed.

Analysis.—Calcd. for $C_{12}H_{12}N_2O_4$: N, 11.29; N.E., 248. Found: N, 11.62; N.E., 256.5 (N.E.=neutral equivalent).

Example 106

Cupric di(1-ethyl-1,4-dihydro-7-methyl-4-oxo-1,8-naphthyridine-3-carboxylate) was prepared as follows: To a solution containing 11.6 g. of 1-ethyl-1,4-dihydro-7-methyl-4-oxo-1,8-naphthyridine-3-carboxylic acid and 3.0 g. of sodium methoxide dissolved in 400 cc. of hot methanol was added with stirring a solution containing 5.0 g. of cupric acetate monohydrate in 300 cc. of hot methanol. The reaction mixture was stirred at room temperature for 2 hours and the precipitated blue solid was collected and dried in a vacuum oven at 70° C. overnight. There was obtained 10 g. of the product, cupric di(1-ethyl-1,4-dihydro-7-methyl-4-oxo - 1,8 - naphthyridine - 3 - carboxylate), M.P. 278.0–279.0° C. (corr.) with decomposition.

Analysis.—Calcd. for $C_{24}H_{22}N_4O_6Cu$: N, 10.64; Cu, 12.08. Found: N, 10.60; Cu, 11.75.

Cupric di(1-ethyl-1,4-dihydro-7-methyl-4-oxo-1,8-naphthyridine-3-carboxylate was found to have significant in vivo activity against Klebsiella pneumoniae in mice when administered orally at a dose level as low as 50 mg./kg./d.

Example 107

7 - amino-1-(2,4-dichlorobenzyl)-1,4-dihydro-4-oxo-1,8-naphthyridine-3-carboxylic acid was prepared following the procedure described in Example 48 using 33 g. of ethyl 7-acetamido - 4 - hydroxy-1,8-naphthyridine-3-carboxylate, 20.2 g. of potassium hydroxide, 500 cc. of ethanol, 150 cc. of water, 39 g. of 2,4-dichlorobenzyl chloride, and a reflux period of 3 hours. The product was isolated as its potassium salt, converted into the acid, recrystallized from dimethylformamide-ethanol and dried at 60° C. in vacuo to yield 12.6 g. of the product 7-amino-1-(2,4-dichlorobenzyl)-1,4-dihydro-4-oxo - 1,8 - naphthyridine-3-carboxylic acid, M.P. 288.2–289.2° C. (corr.).

Analysis.—Calcd. for $C_{16}H_{11}Cl_2N_3O_3$: C, 52.75; H, 3.05; N, 11.54. Found: C, 52.91; H, 3.97; N, 11.66.

Example 108

The N-methyglucamine salt of 1-ethyl-1,4-dihydro-7-methyl-4-oxo-1,8-naphthyridine-3-carboxylic acid was prepared by adding a hot solution of 61.0 g. of the amine dissolved in 600 cc. of hot ethanol to a hot suspension of 69.6 g. of the acid in 600 cc. of ethanol, heating the mixture to effect dissolution, filtering the hot solution, allowing the filtrate to cool to about 40° C., and allowing it to stand for several hours at that temperature. The salt was recrystallized by dissolving it in 2400 cc. of hot absolute ethanol and 100 cc. of hot water, concentrating the resulting volume to about 2 liters and then allowing the solution to cool. The resulting precipitate was collected, washed first with absolute ethanol and then n-hexane, and dried in vacuo at 65° C. for 8 hours to yield 9 g. of the product, the N-methylglucamine salt of 1-ethyl-1,4-dihydro-7-methyl-4-oxo-1,8-naphthyridine - 3 - carboxylic acid, M.P. 202.4–207.0° C. (corr.).

Analysis.—Calcd. for $C_{12}H_{12}N_2O_3 \cdot C_7H_{17}NO_5$: C, 53.30; H, 6.84; N, 9.83. Found: C, 53.61 H, 6.54; N, 9.80.

The N-methylglucamine salt of 1-ethyl-1,4-dihydro-7-methyl-4-oxo-1,8-naphthyridine - 3 - carboxylic acid was found to have significant in vivo activity against Klebsiella pneumoniae in mice when administered subcutaneously at a dose level of 100 mg./kg./d.

Example 109

1,2 - ethylene-bis(1 - ethyl-1,4-dihydro-7-methyl-4-oxo-1,8-naphthyridine-3-carboxylate) was prepared following the procedure described in Example 17 using 16 g. of ethyl 1-ethyl - 1,4 - dihydro-7-methyl-4-oxo-1,8-naphthyridine-3-carboxylate, 1.75 g. of ethylene glycol, 0.3 g. of sodium methoxide and a reaction temperature of 123–129° C. for 16 hours. The reaction mixture which solidified on cooling was dissolved in ethylene dichloride; this solution washed with water, dried over anhydrous sodium sulfate, treated with decolorizing charcoal, filtered, and concentrated in vacuo to remove the solvent. The remaining solid was triturated with warm ethyl acetate and then recrystallized once from acetonitrile and twice from dimethylformamide to yield 2.0 g. of the product, 1,2-ethylene-bis(1-ethyl - 1,4 - dihydro-7-methyl-4-oxo-1,8-naphthyridine-3-carboxylate), M.P. 244.2–246.0° C. (corr).

Analysis.—Calcd. for $C_{26}H_{26}N_4O_6$: C, 63.67; H, 5.35; N, 11.43. Found: C, 63.96; H, 5.45; N, 11.63.

1,2-ethylene-bis(1-ethyl - 1,4 - dihydro-7-methyl-4-oxo-1,8-naphthyridine-3-carboxylate was found to have significant in vivo activity against Klebsiella pneumoniae in mice when administered orally at a dose level of 400 mg./kg./d.

Example 110

N-(3 - diethylaminopropyl) - 1 - ethyl-1,4-dihydro-7-methyl-4-oxo-1,8-naphthyridine-3-carboxamide was prepared as follows: A mixture of 13 g. of ethyl 1-ethyl-1,4-dihydro - 7 - methyl-4-oxo-1,8-naphthyridine-3-carboxylate and 13 g. of 3-diethylaminopropylamine was heated in an oil bath kept at 123–129° C. for 16 hours. The excess 3-diethylaminopropylamine was removed by distillating in vacuo. The remaining material was triturated with acetone, filtered, and recrystallized once from n-heptane and once from acetone to yield 1.5 g. of the product, N - (3-diethylaminopropyl)-1-ethyl-1,4-dihydro-7-methyl-4-oxo-1,8-naphthyridine - 3 - carboxamide, M.P. 119.4–120.8° C. (corr.).

*Analysis.*—Calcd. for $C_{19}H_{28}N_4O_2$: C, 66.24; H, 8.19; N, 16.27. Found: C, 66.54; H, 8.32; N, 16.19.

Example 111

Ethyl 7-carboxy - 1 - ethyl-1,4-dihydro-4-oxo-1,8-naphthyridine-3-carboxylate was prepared as follows: A 60 gram portion of ethyl 1-ethyl-1,4-dihydro-4-oxo-7-styryl-1,8-naphthyridine-3-carboxylate was suspended in a mixture of 380 cc. of pyridine and 66 cc. of water. The mixture was cooled to 10° C. and to it was added with stirring in small portions over a period of 90 minutes 85.5 g. of potassium permanganate. The temperature of the reaction mixture was kept at 10–15° C. using an ice bath. At 30 minute intervals 110 cc. portions of water were added to facilitate stirring. Stirring was continued for an additional hour after all of the potassium permanganate had been added. The reaction mixture was then allowed to stand overnight allowing the temperature to rise to room temperature. The precipitated manganese dioxide was filtered off and washed with water. The filtrate and washings were combined and acidified with concentrated hydrochloric acid to yield a pale yellow precipitate. The mixture was cooled overnight in a cold room; and the precipitate was then collected, washed with a little water, washed with acetone, and air-dried to yield 33.9 g. (68% yield) of the product, ethyl 7-carboxy-1-ethyl-1,4-dihydro-4-oxo - 1,8 - naphthyridine-3-carboxylate, M.P. 241–243° C.

Example 112

Ethyl 7-carboethylmercapto-1-ethyl-1,4-dihydro-4-oxo-1,8-naphthyridine-3-carboxylate was prepared as follows: To a suspension of 10.0 g. of ethyl 7-carboxy-1-ethyl-1,4-dihydro-4-oxo-1,8-naphthyridine-3-carboxylate in 200 cc. of chloroform was added 4.8 g. of oxalyl chloride and the resulting mixture was refluxed on a steam bath. An additional 2.2 g. portion of oxalyl chloride was added after 15 minutes and again after 10 more minutes for a total of 9.2 g. of this reactant. Refluxing was continued for 5 minutes more, the reaction mixture cooled slightly, and 20 g. of ethyl mercaptan added. The mixture was stirred and allowed to stand at room temperature overnight. A small amount of insoluble material was filtered off and the filtrate was evaporated to dryness on steam bath to yield a brown solid residue which was washed well with ether, dried, and recrystallized from ethyl acetate (about 200 cc.) using decolorizing charcoal and dried at 80° C. for 2 hours to yield 6.3 g. of the product, ethyl 7-carboethylmercapto-1-ethyl-1,4-dihydro-4-oxo-1,8-naphthyridine - 3 - carboxylate, M.P. 189.2–190.8° C. (corr.).

*Analysis.*—Calcd. for $C_{16}H_{18}N_2O_4S$: N, 8.38; S, 9.59. Found: N, 8.49; S, 9.71.

Example 113

Ethyl 1 - ethyl-1,4-dihydro-7-hydroxymethyl-4-oxo-1,8-naphthyridine-3-carboxylate was prepared as follows: A mixture containing 3.3 g. of ethyl 7-carboethylmercapto-1-ethyl - 1,4 - dihydro-4-oxo - 1,8 - naphthyridine-3- carboxylate, 20 g. of Raney nickel and 100 cc. of ethanol was refluxed on a steam bath with stirring for 3 days. The reaction mixture was filtered through a sintered glass funnel to remove the nickel catalyst; the catalyst rinsed with fresh ethanol; and the combined ethanol washings and filtrate from the reaction mixture were evaporated to dryness on a steam bath. The remaining residue was triturated with a small amount of ethyl acetate and the solid that formed was collected, washed with cold ethyl acetate and air-dried. This solid material was then boiled with ethyl acetate and the hot mixture filtered; most of the solid did not dissolve. The filtrate on cooling yielded a crystalline product which was recrystallized again from ethyl acetate to yield a small quantity of the desired product, ethyl 1-ethyl - 1,4 - dihydro-7-hydroxymethyl-4-oxo - 1,8 - naphthyridine - 3 - carboxylate, M.P. 173.5–174.0° C.

*Analysis.*—Calcd. for $C_{14}H_{16}N_2O_4$: N, 10.14; C, 60.86; H, 5.84. Found: N, 10.19; C, 61.14; H, 5.52.

Example 114

1-ethyl-1,4-dihydro-hydroxymethyl - 4 - oxo-1,8-naphthyridine-3-carboxylic acid was prepared by hydrolyzing its ethyl ester as follows: A mixture of a small portion of the ethyl ester and 5% aqueous potassium hydroxide was boiled for 2 to 3 minutes, after which time the ester had dissolved; boiling was continued for another 2 minutes and the reaction mixture was allowed to cool slowly. The cooled solution was made slightly acidic with 6 N hydrochloric acid. The white precipitate was collected, washed successively with water and acetone, recrystallized from absolute ethanol, and air-dried to yield the desired product, 1-ethyl - 1,4 - dihydro-hydroxymethyl-4-oxo-1,8-naphthyridine-3-carboxylic acid, M.P. 258–260° C.

*Analysis.*—Calcd. for $C_{12}H_{12}N_2O_4$: C, 58.06; H, 4.87; N, 11.29. Found: C, 57.98; H, 4.94; N, 11.33.

1 - ethyl - 1,4 - dihydro-hydroxymethyl-4-oxo-1,8-naphthyridine-3-carboxylic acid was found to have significant in vivo activity against *Klebsiella pneumoniae, Escherichia coli, Salmonella typhimurium* and *Staphylococcus aureus* (Smith) in mice when administered orally at respective doses of 25, 12.5, 25 and 600 mg./kg./d.

Example 115

7-acetoxymethyl - 1 - ethyl-1,4-dihydro-4-oxo-1,8-naphthyridine-3-carboxylic acid was prepared by acylating the corresponding 7-hydroxymethyl compound as follows: A mixture containing 10.0 g. of 1-ethyl-1,4-dihydro-7-hydroxymethyl - 4 - oxo-1,8-naphthyridine-3-carboxylic acid, 8.2 g. of acetic anhydride and 50 cc. of pyridine was warmed on a steam bath for 1 hour. The reaction mixture was then poured into a mixture of ice and water with stirring followed by addition of 20 cc. of acetic acid. The mixture was stirred; and the precipitate was collected, recrystallized twice from isopropyl alcohol and dried in vacuo at 70° C. for 7 hours to yield 8.0 g. of the product, 7-acetoxymethyl-1-ethyl-1,4-dihydro - 4 - oxo-1,8 - naphthyridine-3-carboxylic acid, M.P. 169.8–171.6° C. (corr.).

*Analysis.*—Calcd. for $C_{14}H_{14}N_2O_5$: C, 57.93; H, 4.86; N, 9.65. Found: C, 57.63; H, 4.84; N, 9.79.

7-acetoxymethyl - 1 - ethyl-1,4-dihydro-4-oxo-1,8-naphthyridine-3-carboxylic acid was found to have significant in vivo activity against *Klebsiella pneumoniae, Escherichia coli* and *Salmonella typhimurium* in mice when administered orally at respective dose levels of 50, 50 and 100 mg./kg./d.

Example 116

Ethyl 7 - carbamyl-1-ethyl-1,4-dihydro-4-oxo-1,8-naphthyridine-3-carboxylate was prepared as follows: A mixture of 36.0 g. of ethyl 7-carboxy-1-ethyl-1,4-dihydro-4-oxo-1,8-naphthyridine-3-carboxylate and 100 cc. of thionyl chloride was stirred for 15 minutes at room temperature, then warmed slightly on a steam bath for about 5 minutes until a clear, pale yellow solution resulted. Stirring was continued for an additional 5 minutes and the mixture was evaporated on a steam bath to remove most of the excess liquid. The remaining material was suspended in 200 cc. of warm dioxane and the suspension poured into 300 cc. of 28% ammonium hydroxide containing about 40-50 g. of ice; and the resulting mixture was stirred overnight. The yellow precipitate was collected, recrystallized once from dimethylformamide using decolorizing charcoal and a second time from dimethylformamide, washed well with acetone, and dried in a vacuum oven to yield 14.0 g. (39%) of the product, ethyl 7-carbamyl-1 - ethyl - 1,4 - dihydro-4-oxo-1,8-naphthyridine-3-carboxylate, M.P. 280.2–294.2° C. (corr.) with decomposition.

*Analysis.*—Calcd. for $C_{14}H_{15}N_3O_4$: C, 58.12; H, 5.22; N, 14.53. Found: C, 58.03; H, 5.02; N, 14.38.

Example 117

1 - ethyl-1,4-dihydro-7-methyl-4-oxo-1,8-naphthyridine-3-hydroxamic acid was prepared as follows: A solution of 13.9 g. of hydroxylamine hydrochloride in 75 cc. of methanol was cooled and mixed, with shaking and cooling in an ice bath, with a cold solution containing 16.2 g. of sodium methoxide dissolved in 75 cc. of methanol. After allowing the mixture to stand in an ice bath for 5 minutes to insure precipitation of the sodium chloride, a solution containing 26.0 g. of ethyl 1-ethyl-1,4-dihydro-7-methyl - 4 - oxo-1,8-naphthyridine-3-carboxylate in 150 cc. of methanol was added, the mixture shaken vigorously and filtered immediately through a sintered glass funnel. The white residue was rinsed with 50 cc. of methanol and the combined filtrates were allowed to stand at room temperature in a stoppered flask for about 4 days. The crystals that separated were collected, washed with absolute ethanol and air-dried to yield 26.1 g. (97%) of yellow crystalline sodium 1 - ethyl - 1,4 - dihydro-7-methyl-4-oxo-1,8-naphthyridine-3-hydroxamate.

A mixture containing 13.5 g. of sodium 1-ethyl-1,4-dihydro-7-methyl-4-oxo-1,8-naphthyridine-3 - hydroxamate, 2.9 cc. of acetic acid and 40 cc. of water was stirred and warmed on a steam bath for about 2 hours. The reaction mixture was then cooled in an ice bath and the separated product was collected, recrystallized from acetic acid using decolorizing charcoal, washed with acetone and dried for 1 hour in an oven at 70° C. to yield 6.8 g. (55%) of the product, 1 - ethyl-1,4-dihydro-7-methyl-4-oxo-1,8-naphthyridine-3-hydroxamic acid, M.P. 234.0–234.6° C. (corr.) with decomposition.

*Analysis.*—Calcd. for $C_{12}H_{13}N_3O_3$: C, 58.29; H, 5.30; N, 17.00. Found: C, 58.36; H, 5.33; N, 16.88.

Example 118

1 - ethyl-1,4-dihydro-7-methyl-4-oxo-1,8-naphthyridine-(N-acetoxy)-carboxamide was prepared as follows: To a solution containing 9.0 g. of sodium 1-ethyl-1,4-dihydro-7-methyl-4-oxo-1,8-naphthyridine-3-hydroxamate in 200 cc. of water was added 10 cc. of acetic anhydride. A copious, pale yellow solid separated and the mixture was stirred at room temperature for about 5 minutes. The solid was collected, washed with a small quantity of water, recrystallized from ethanol and dried overnight in a vacuum dessicator to yield 6.3 g. of the product, 1-ethyl-1,4-dihydro-7-methyl - 4 - oxo-1,8-naphthyridine-3-(N-acetoxy)-carboxamide, M.P. 195.0–195.6° C. (corr.) with decomposition.

*Analysis.*— Calcd. for $C_{14}H_{15}N_3O_4$: C, 58.12; H, 5.23; N, 14.53. Found: C, 58.32; H, 5.34; N, 14.75.

Example 119

Trans - 2 - [7-(3-carbethoxy-1-ethyl-1,4-dihydro-4-oxo-1,8-naphthyridinyl)]-1-chloro-1-phenylethylene was prepared as follows: A mixture containing 48.0 g. of 1-ethyl-1,4 - dihydro-4-oxo-7-styryl-1,8-naphthyridine-3-carboxylic acid and 175 cc. of thionyl chloride was stirred on a steam bath for about 40 minutes. The reaction mixture was evaporated to dryness by heating on a steam bath. To the syrupy residue was added 240 cc. of absolute ethanol and the resulting mixture was refluxed for 1 hour and then allowed to stand overnight at room temperature. The resulting yellow crystalline precipitate was collected, recrystallized several times from acetonitrile, and air-dried to yield 23.3 g. (39%) of the product, trans-2-[7-(3 - carbethoxy - 1-ethyl-1,4-dihydro-4-oxo-1,8-naphthyridinyl)]-1-chloro-1-phenylethylene, M.P. 178.0–179.6° C. (corr.).

*Analysis.*—Calcd. for $C_{21}H_{19}ClN_2O_3$: Cl, 9.26; N, 7.31. Found: Cl, 9.38; N, 7.23.

The corresponding acid was obtained by refluxing a mixture of 1.9 g. of the above ethyl ester and 25 cc. of 10% aqueous potassium hydroxide solution for 90 minutes. The reaction mixture was cooled and the supernatant liquid was decanted from a solid cake which was broken up and triturated well with ether. There resulted an emulsion which was separated by filtering several times through a sintered glass funnel. The solid was dissolved in boiling water containing a little potassium hydroxide. The solution was acidified with hydrochloric acid and the resulting white precipitate was collected, recrystallized from acetic acid, washed with acetone and dried in a vacuum oven at 70° C. to yield trans-2-[7-(3-carboxy-1-ethyl - 1,4 - dihydro-4-oxo-1,8-naphthyridinyl)]-1-chloro-1-phenylethylene, M.P. 245–247° C., which was used in the following preparation without further purification.

Example 120

1 - ethyl - 1,4-dihydro-4-oxo-7-phenylethinyl-1,8-naphthyridine - 3 - carboxylic acid was prepared as follows: Sodium (1.5 g.) was dissolved with magnetic stirring in 100 cc. of liqud ammonia containing a trace of ferric nitrate. After the blue color had disappeared, 5.5 g. of trans - 2 - [7-(3-carboxy-1-ethyl-1,4-dihydro-4-oxo-1,8-naphthyridinyl)] - 1 - chloro-1-phenylethylene was added cautiously. The reaction mixture was stirred for about 30 minutes, 100 cc. of benzene was added, and the resulting mixture allowed to stand overnight. About 300 cc. of water was added and the resulting mixture was heated until the solids dissolved and most of the benzene had distilled off. The solution was filtered through infusorial earth. The filtrate was extracted twice with chloroform; the combined chloroform extracts were dried over anhydrous calcium sulfate and evaporated to dryness on a steam bath to yield a solid. The solid was triturated with water, recrystallized from acetic acid using decolorizing charcoal, washed wth acetone and air-dried to yield the product, 1 - ethyl-1,4-dihydro-4-oxo-7-phenylethinyl-1,8-naphthyridine - 3 - carboxylic acid, M.P. 237.4–240.0° C. (corr.).

*Analysis.*—Calcd. for $C_{19}H_{14}N_2O_3$: C, 71.69; H, 4.43; N, 8.80. Found: C, 71.38; H, 4.46; N, 9.06.

Example 121

Ethyl 1 - ethyl-1,4-dihydro-4-oxo-7-triromomethyl-1,8-naphthyridine-3-carboxylate was prepared according to the procedure described in Example 98 using 7.0 g. of ethyl 4 - hydroxy - 7-tribromomethyl-1,8-naphthyridine-3-carboxylate, 4.6 g. of diethyl sulfate, 6.2 g. of anhydrous potassium carbonate and 40 cc. of dimethylformamide. There was obtained 1.25 g. of the product, ethyl 1-ethyl-1,4 - dihydro - 4-oxo-7-tribromomethyl-1,8-naphthyridine-3-carboxylate, M.P. 146–147° C., after one recrystallization from ethanol and air-drying.

*Analysis.*—Calcd. for $C_{14}H_{13}Br_3N_2O_3$: C, 33.83; H, 2.64; Br, 48.24; N, 5.64. Found: C, 34.12; H, 2.82; Br, 50.94; N, 5.66.

The intermediate ethyl 4-hydroxy-7-tribromomethyl-1,8-naphthyridine-3-carboxylate was prepared as follows: A solution of 86 g. of bromine in 100 cc. of acetic acid was added slowly with stirring to a heated mixture containing 42 g. of ethyl 4-hydroxy-7-methyl-1,8-naphthyridine-3-carboxylate, 89 g. of anhydrous sodium acetate and 900 cc. of acetic acid, keeping the temperature of the reaction mixture at 60° C. After addition had been completed, the reaction mixture was heated on a steam bath for 2 hours and allowed to stand at room temperature overnight. The mixture was then refluxed for 90 minutes, lected and triturated successively with benzene, acetone (twice) and warm acetone. The resulting red-brown solid material was triturated further on a steam bath with 700 cc. of water and the undissolved material filtered off. The filtrate was concentrated and to the mushy concentrate was added acetone. The resulting solid was collected and recrystallized from ethanol to yield 9.8 g. of the product, 1 - (3 - carbethoxy - 1 - ethyl-1,4-dihydro-4-oxo-1,8-naphthyridine-7-yl-methyl)pyridinium iodide, M.P. 224.0–225.0° C. (corr.), with decomposition.

*Analysis.*—Calcd. for $C_{19}H_{20}IN_3O_3$: N, 9.04; I, 27.28. Found: N, 9.25; I, 27.97.

3.2 g. of the above ester was hydrolyzed to the corresponding acid by heating on a steam bath with 5 cc. of 6 N hydrochloric acid solution. There was thus obtained 1.3 g. of the acid, M.P. 260–262° C.

Examples 151–156

The 7-hydroxymethyl-1-substituted-1,4-dihydro-4-oxo-1,8-naphthyridine-3-carboxylic acids of Table A below can be prepared following the procedures of Examples 112, 113 and 114 using molar equivalent quantities of the corresponding ethyl 7 - carboxy - 1,4-dihydro-4-oxo-1-substituted-1,8-naphthyridine-3-carboxylate in place of ethyl 7 - carboxy-1-ethyl-1,4-dihydro-4-oxo-1,8-naphthyridine-3-carboxylate to prepare first the corresponding ethyl 7-carboethylmercapto - 1-substituted-1,4-dihydro-4-oxo-1,8-naphthyridine-3-carboxylate, then the corresponding ethyl 7 - hydroxymethyl - 1-substituted-1,4-dihydro-4-oxo-1,8-naphthyridine-3-carboxylate, and finally the corresponding 7 - hydroxymethyl - 1-substituted-1,4-dihydro-4-oxo-1,8-naphthyridine-3-carboxylic acid.

TABLE A

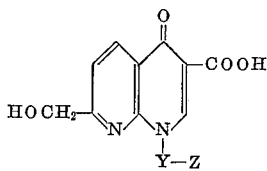

| | Y-Z | M.P.,° C. |
|---|---|---|
| Example No.: | | |
| 151 | CH₂CH₂CH₃ | 208.5–210 |
| 152 | (CH₂)₅CH₃ | 170–171.5 |
| 153 | CH₂CH=CH₂ | 211.5–214 |
| 154 | CH₃ | 295–>320 |
| 155 | CH₂C₆H₄—2—Cl | 225–235 |
| 156 | CH₂C(Cl)=CH₂ | 150 |

The intermediate ethyl 7-carboxy-1,4-dihydro-4-oxo-1-substituted-1,8-naphthyridine-3-carboxylates can be prepared following the procedure described in Example 45 by oxidizing the corresponding ethyl 1,4-dihydro-4-oxo-7-styryl-1-substituted-1,8-naphthyridine-3-carboxylate.

7 - hydroxymethyl - 1,4-dihydro-4-oxo-1-n-propyl-1,8-naphthyridine-3-carboxylic acid (Example 151) was found to have significant in vivo activity against *Klebsiella pneumoniae, Salmonella typhimurium* and *Proteus rettgeri* in mice when administered orally at respective dose levels of 50, 400 and 200 mg./kg./d. This same compound when tested as described hereinabove was found to potentiate hexobarbital sleeping time in four out of ten mice at a dose level of 100 mg./kg.

1 - (2 - chlorobenzyl)-1,4-dihydro-7-hydroxymethyl-4-oxo-1,8-naphthyridine-3-carboxylic acid (Example 155) was found to have significant in vivo activity against *Klebsiella pneumoniae* in mice when administered subcutaneously at a dose level of 100 mg./kg./d.

Example 157

4 - oxo - 1,4-dihydro-1-n-propyl-1,8-naphthyridine-3,7-dicarboxylic acid was prepared as follows: A mixture containing 1 g. of 1,4 - dihydro-7-hydroxymethyl-4-oxo-1-n-propyl-1,8-naphthyridine-3-carboxylic acid, 2 g. of potassium premanganate, 100 cc. of water and about 60 drops of 10% aqueous potassium hydroxide solution was stirred for two hours. The excess potassium permanganate was reduced using sodium bisulfite. The precipitate of manganese dioxide was filtered off and washed with water. The filtrate and washings were combined and acidified with hydrochloric acid. The resulting precipitate was collected and recrystallized from ethanol to yield the product, 4-oxo - 1,4-dihydro-1-n-propyl-1,8-naphthyridine-3,7-dicarboxylic acid, M.P. 251.2–252.2° C. (corr.).

*Analysis.*—Calcd. for $C_{13}H_{12}N_2O_5$: C, 56.52; H, 4.38; N, 10.14; O, 28.96. Found: C, 56.53; H, 4.19; N, 10.32; O, 28.96.

Example 158

7 - acetoxymethyl - 1,4-dihydro-1-n-propyl-4-oxo-1,8-naphthyridine-3-carboxylic acid was prepared as follows: A mixture containing 2.12 g. of 1,4-dihydro-7-hydroxymethyl - 1-n-propyl-4-oxo-1,8-naphthyridine-3-carboxylic acid, 50 cc. of acetic anhydride and 40 cc. of pyridine was allowed to stand for 90 minutes. The reaction mixture was added to a mixture of ice and cold water and allowed to stand overnight in a refrigerator. The resulting white solid was collected, washed successively with water and a small amount of ether, and recrystallized from ethanol to yield 1.95 g. of the product, M.P. 149.2–150.4° C. (corr.).

*Analysis.*—Calcd. for $C_{15}H_{16}N_2O_5$: C, 59.20; H, 5.30; N, 9.20. Found: C, 59.36; H, 5.36; N, 9.32.

7-acetoxymethyl - 1,4 - dihydro-1-n-propyl-4-oxo-1,8-naphthyridine-3-carboxylic acid was found to have significant in vivo activity against *Klebsiella pneumoniae* and *Escherichia coli* in mice when administered orally at respective dose levels of 200 and 100 mg./kg./d.

Example 159

7-dichloroacetoxymethyl - 1 - ethyl-1,4-dihydro-4-oxo-1,8-naphthyridine-3-carboxylic acid was prepared as follows: A mixture of 1-ethyl-1,4-dihydro-7-hydroxymethyl-4-oxo-1,8-naphthyridine-3-carboxylic acid and 5 cc. of dichloroacetic anhydride was placed in a warm water bath for about 15 minutes and then poured into ice water whereupon a yellow oil separated. The water was decanted and the oil washed once with water whereupon it solidified. The solid was then recrystallized from ethanol, using decolorizing charcoal, to yield 3.2 g. of the product, 7-dichloroacetoxy - 1 - ethyl-1,4-dihydro-4-oxo-1,8-naphthyridine-3-carboxylic acid, M.P. 133.0—139.4° C. (corr.).

*Analysis.*—Calcd. for $C_{14}H_{12}Cl_2N_2O_5$: N, 7.80; C, 19.75. Found: N, 8.09; C, 19.41.

7-dichloroacetoxymethyl - 1 - ethyl-1,4-dihydro-4-oxo-1,8-naphthyridine-3-carboxylic acid was found to have significant in vivo activity against *Klebsiella pneumoniae* in mice when administered orally at a dose level of 200 mg./kg./d.

Example 160

7-isobutyroxymethyl - 1 - ethyl-1,4-dihydro-4-oxo-1,8-naphthyridine-3-carboxylic acid was prepared as follows: A mixture containing 2 g. of 1-ethyl-1,4-dihydro-7-hydroxymethyl-4-oxo-1,8-naphthyridine - 3 - carboxylic acid, about 8 cc. of isobutyric anhydride and about 50 cc. of pyridine was warmed in a water bath for about 3 hours. The reaction mixture was poured onto crushed ice and the resulting precipitate was collected and recrystallized from ethanol to yield 1.47 g. of the product, 7-isobutyroxymethyl-1-ethyl - 1,4 - dihydro-4-oxo-1,8-naphthyridine-3-carboxylic acid, M.P. 139.2–141.2° C. (corr.).

*Analysis.*—Calcd. for $C_{16}H_{18}N_2O_5$: C, 60.37; H, 5.70; N, 8.80. Found: C, 60.13; H, 5.74; N, 8.61.

7-isobutyroxymethyl - 1 - ethyl-1,4-dihydro-4-oxo-1,8-naphthyridine-3-carboxylic acid was found to have significant in vivo activity against *Klebsiella pneumoniae* in mice when administered orally at 200 mg./kg./d.

Example 161

1-ethyl - 1,4 - dihydro - 4 - oxo-7-succinoxymethyl-1,8-naphthyridine-3-carboxylic acid was prepared as follows: A mixture containing 2 g. of 1-ethyl-1,4-dihydro-7-hydroxymethyl-4-oxo-1,8-naphthyridine-3-carboxylic acid, 1.5 g. of succinic anhydride and about 50 cc. of pyridine was warmed on a water bath for about 3 hours and then poured onto crushed ice. The resulting mixture was made acidic to litmus using hydrochloric acid, and the precipitate that separated was collected and recrystallized from water to yield 2.15 g. of the product, 1-ethyl-1,4-dihydro-4-oxo-7-succinoxymethyl-1,8-naphthyridine-3-carboxylic acid, M.P. 145.8–148.2° C. (corr.).

*Analysis.*—Calcd. for $C_{16}H_{16}N_2O_7$: C, 55.17; H, 4.63; N, 8.04. Found: C, 55.11; H, 4.53; N, 8.11.

1-ethyl-1,4-dihydro-4-oxo-7-succinoxymethyl-1,8-naphthyridine-3-carboxylic acid was found to have significant in vivo activity against *Klebsiella pneumoniae* in mice when administered orally at a dose level of 400 mg./kg./d.

Example 162

1-ethyl-1,4-dihydro-4-oxo-7-propionoxymethyl-1,8-naphthyridine-3-carboxylic acid was prepared following the procedure described in Example 160 using 2 g. of 1-ethyl-1,4-dihydro-7-hydroxymethyl-4-oxo-1,8-naphthyridine-3-carboxylic acid, 6 cc. of propionic anhydride and about 50 cc. of pyridine. There was thus obtained 1.54 g. of the product, 1-ethyl-1,4-dihydro-4-oxo-7-propionoxy-methyl-1,8-naphthyridine-3-carboxylic acid, M.P. 149.8–151.0° C. (corr.), after one recrystallization from ethanol.

*Analysis.*—Calcd for $C_{15}H_{16}N_2O_5$: C, 59.20; H, 5.30; N, 9.21. Found: C, 58.86; H, 4.97; N, 9.46.

1-ethyl-1,4-dihydro-4-oxo-7-propionoxymethyl-1,8-naphthyridine-3-carboxylic acid was found to have significant in vivo activity against *Klebsiella pneumoniae* in mice when administered orally at a dose level of 200 mg./kg./d.

Example 163

7-butyroxymethyl-1-ethyl-1,4-dihydro-oxo-1,8-naphthyridine-3-carboxylic acid was prepared following the procedure described in Example 160 using 2 g. of 1-ethyl-1,4-dihydro-7-hydroxymethyl-4-oxo-1,8-naphthyridine-3-carboxylic acid, about 8 cc. of butyric anhydride and about 50 cc. of pyridine. There was thus obtained 1.76 g. of the product, 7-butyroxymethyl-1-ethyl-1,4-dihydro-4-oxo-1,8-naphthyridine-3-carboxylic acid, M.P. 128.2–129.4° C. (corr.), after one recrystallization from ethanol-water.

*Analysis.*—Calcd. for $C_{16}H_{18}N_2O_5$: C, 60.37; H, 5.70; N, 8.80. Found: C, 59.88; H, 5.47; N, 9.10.

7-butyroxymethyl-1-ethyl-1,4-dihydro-4-oxo-1,8-naphthyridine-3-carboxylic acid was found to have significant in vivo activity against *Klebsiella pneumoniae* in mice when administered orally at a dose level of 200 mg./kg./d.

Also encompassed by our invention and prepared by hereinabove described procedures are the following compounds:

164. 1-(2-cyanoethyl)-1,4-dihydro-7-methyl-4-oxo-1,8-naphthyridine-3-carboxylic acid.

165. 1-(2-carbamylethyl)-1,4-dihydro-7-methyl-4-oxo-1,8-naphthyridine-3-carboxylic acid.

166. Ethyl 1-(2-carbamylethyl)-1,4-dihydro-7-methyl-4-oxo-1,8-naphthyridine-3-carboxylate.

167. 7-methyl-1,4-dihydro-4-oxo-1-[2-(3-pyridyl)ethyl]1,8-naphthyridine-3-carboxylic acid.

168. 7-methyl-1,4-dihydro-4-oxo-1-(2-n-propylaminoethyl)-1,8-naphthyridine-3-carboxylic acid.

169. Ethyl 1-(5-ethylaminopentyl)-1,4-dihydro-7-methyl-4-oxo-1,8-naphthyridine-3-carboxylate.

170. 1-[2-(2-chlorobenzylamino)ethyl]-1,4-dihydro-7-methyl-4-oxo-1,8-naphthyridine-3-carboxylic acid.

171. 1-(4-cyanobutyl)-1,4-dihydro-4-oxo-7-styryl-1,8-naphthyridine-3-carboxylic acid.

172. 1-[3-(3-hydroxypropylamino)propyl]-1,4-dihydro-4-oxo-7-styryl-1,8-naphthyridine-3-carboxylic acid.

173. Ethyl-1,4-dihydro-4-oxo-1-[2-(2-phenylethylamino)ethyl]-7-styryl-1,8-naphthyridine-3-carboxylate.

174. 7-n-butoxy-1-ethyl-1,4-dihydro-4-oxo-1,8-naphthyridine-3-carboxylic acid.

175. 5,6-dimethoxy-1-ethyl-1,4-dihydro-4-oxo-1,8-naphthyridine-3-carboxylic acid.

176. 1,7-diethyl-1,4-dihydro-4-oxo-1,8-naphthyridine-3-carboxylic acid.

177. 4-oxo-1,4-dihydro-1-n-propyl-7-trifluoromethyl-1,8-naphthyridine-3-carboxylic acid.

178. 4-oxo-1,4-dihydro-1,5,6,7-tetramethyl-1,8-naphthyridine-3-carboxylic acid.

179. 2,7-dimethyl-1-ethyl-1,4-dihydro-4-oxo-1,8-naphthyridine-3-carboxylic acid.

180. 7-benzyloxy-1,4-dihydro-4-oxo-1-n-propyl-1,8-naphthyridine-3-carboxylic acid.

181. Ethyl 7-acetamido-1-ethyl-5-ethoxy-1,4-dihydro-4-oxo-1,8-naphthyridine-3-carboxylate.

182. 1-ethyl-7-fluoro-1,4-dihydro-4-oxo-1,8-naphthyridine-3-carboxylic acid.

183. 1-ethyl-1,4-dihydro-4-oxo-7-trichloromethyl-1,8-naphthyridine-3-carboxylic acid.

184. 1-ethyl-1,4-dihydro-6-hydroxy-7-methyl-4-oxo-1,8-naphthyridine-3-carboxylic acid.

185. Unsubstituted-phenyl 1-ethyl-1,4-dihydro-7-methyl-4-oxo-1,8-naphthyridine-3-carboxylate.

186. 4-chlorophenyl 1-ethyl-1,4-dihydro-7-methyl-4-oxo-1,8-naphthyridine-3-carboxylate.

187. 3-methylphenyl 1-ethyl-1,4-dihydro-7-methyl-4-oxo-1,8-naphthyridine-3-carboxylate.

188. Unsubstituted-phenyl 1-ethyl-1,4-dihydro-7-methyl-4-oxo-1,8-naphthyridine-3-carbothiolate.

189. Ethyl 1-ethyl-1,4-dihydro-7-methyl-4-oxo-1,8-naphthyridine-3-carbothiolate.

190. 6-acetyl-1-ethyl-1,4-dihydro-4-oxo-1,8-naphthyridine-3-carboxylic acid.

191. 1-ethyl-1,4-dihydro-6-methyl-4-oxo-1,8-naphthyridine-3-carboxylic acid.

192. 1-ethyl-1,4-dihydro-5-methyl-4-oxo-1,8-naphthyridine-3-carboxylic acid.

193. 6-bromo-1-ethyl-1,4-dihydro-2,5,7-trimethyl-4-oxo-1,8-naphthyridine-3-carboxylic acid.

194. 1-ethyl-7-ethylsulfinyl-1,4-dihydro-4-oxo-1,8-naphthyridine-3-carboxylic acid.

195. 7-n-butylsulfonyl-1-ethyl-1,4-dihydro-4-oxo-1,8-naphthyridine-3-carboxylic acid.

196. 1-ethyl-1,4-dihydro-7-methyl-6-nitro-4-oxo-1,8-naphthyridine-3-carboxylic acid.

197. 1-ethyl-7-(3-ethylaminopropyl)-1,4-dihydro-4-oxo-1,8-naphthyridine-3-carboxylic acid.

198. 1-ethyl-1,4-dihydro-7-[2-(1-piperidyl)ethyl]-4-oxo-1,8-naphthyridine-3-carboxylic acid.

199. Ethyl 1-ethyl-1,4-dihydro-7-(2-n-propylaminoethylamino)-4-oxo-1,8-naphthyridine-3-carboxylate.

200. Ethyl 1-ethyl-7-(3-ethylaminopropoxy)-1,4-dihydro-4-oxo-1,8-naphthyridine-3-carboxylate.

201. 1-ethyl-1,4-dihydro-7-(unsubstituted-phenyl)-4-oxo-1,8-naphthyridine-3-carboxylic acid.

202. 7-(4-ethoxyphenylamino)-1,4-dihydro-1-n-propyl-4-oxo-1,8-naphthyridine-3-carboxylic acid.

203. 7-[2-(3,4-dimethoxyphenyl)ethoxyl]-1-ethyl-1,4-dihydro-4-oxo-1,8-naphthyridine-3-carboxylic acid.

204. 7-cyano-1-ethyl-1,4-dihydro-4-oxo-1,8-naphthyridine-3-carboxylic acid.

205. Ethyl 7-aminomethyl-1-ethyl-1,4-dihydro-4-oxo-1,8-naphthyridine-3-carboxylate.

206. 7-carbamyl-1,4-dihydro-1-methyl-4-oxo-1,8-naphthyridine-3-carboxylic acid.

207. Diethyl 1-ethyl-1,4-dihydro-4-oxo-1,8-naphthyridine-3,7-dicarboxylate.

208. 1-ethyl-1,4-dihydro-7-(2-hydroxyethyl)-4-oxo-1,8-naphthyridine-3-carboxylic acid.

209. 7-acetaminomethyl-1-ethyl-1,4-dihydro-4-oxo-1,8-naphthyridine-3-carboxylic acid.

210. 6-bromo-1-ethyl-1,4-dihydro-4-oxo-1,8-naphthyridine-3-carboxylic acid.

211. 1-ethyl-2-hydroxy-1,4-dihydro-7-methyl-4-oxo-1,8-naphthyridine-3-carboxylic acid.

Example 138

Ethyl 1 - cyanomethyl - 1,4 - dihydro - 7 - methyl - 4-oxo - 1,8 - naphthyridine - 3 - carboxylate was prepared as follows: A mixture containing 11.6 g. of ethyl 4-hydroxy-7-methyl-1,8-naphthydridine-3-carboxylate, 7.6 g. of chloroacetonitrile, 21 g. of anhydrous potassium carbonate and 200 cc. of dimethyl sulfoxide was stirred for 60 minutes at about 40° C. The reaction mixture was poured into three liters of water and the resulting mixture stirred for an additional 30 minutes. The solid which separated was collected and recrystallized from ethanol using decolorizing charcoal to yield 6 g. of the product, ethyl 1 - cyanomethyl - 1,4 - dihydro - 7 - methyl-4-oxo-1,8-naphthyridine - 3 - carboxylate, M.P. 199.0–200.4° C. (corr.).

*Analysis.*—Calcd. $C_{14}H_{13}N_3O_3$: C, 61.98; H, 4.83. Found: C, 61.96; H, 4.69.

Example 139

1 - ethyl - 1,4 - dihydro - 4 - oxo - 7 - n - propyl - 1,8-naphthydridine-3-carboxylic acid was prepared following the procedure described in Example 10 using 6.0 g. of ethyl 4 - hydroxy-7-n-propyl-1,8-naphthyridine-3-carboxylate, 7.8 g. of ethyl iodide, 13.8 g. of anhydrous potassium carbonate and 100 cc. of dimethylformamide to prepare first ethyl 1-ethyl-1,4-dihydro-4-oxo-7-n-propyl-1,8-naphthyridine-3-carboxylate, which was then saponified using 100 cc. of 5% potassium hydroxide solution. There was thus obtained 4.5 g. of the product, 1-ethyl-1,4-dihydro-4-oxo-7-n-propyl - 1,8 - naphthyridine - 3 - carboxylic acid, M.P. 149.6–151.0° C. (corr.).

*Analysis.*—Calcd. for $C_{14}H_{16}N_2O_3$: C, 64.60; H, 6.20; N, 10.76. Found: C, 64.68; H, 5.96; N, 10.67.

The intermediate ethyl 4-hydroxy-7-n-propyl-1,8-naphthyridine-3-carboxylate was prepared in several steps starting with 2-amino-6-n-propylpyridine following the procedure described in Example 98. Diethyl N-(6-n-propyl-2-pyridyl)-aminomethylenemalonate, distilling at 159° C. at 0.07 mm., was obtained using 32 g. of 2-amino-6-n-propylpyridine and 50 g. of ethoxymethylenemalonic ester. 15 g. of ethyl 7-n-propyl-4-hydroxy-1,8-naphthyridine-3-carboxylate was obtained using 37 g. of diethyl N-(6-n-propyl - 2 - pyridyl) - aminomethylenemalonate and 400 cc. of Dowtherm A. A sample of this intermediate ester when recrystallized from isopropyl alcohol with charcoaling melted at 234.8–238.4° C. (corr.).

*Analysis.*—Calcd. for $C_{14}H_{16}N_2O_3$: C, 64.60; H, 6.20; N, 10.76. Found C, 64.87; H, 6.18; N, 10.69.

2-amino-6-n-propylpyridine was prepared by reacting 2-n-propylpyridine with sodamide following the procedure described in Example 98. Using 200 g. of 2-n-propylpyridine, 80 g. of sodamide and 1500 cc. of xylene, there was obtained 32 g. of 2-amino-6-n-propylpyridine distilling at 118–135° C. at 15 mm., $n_D^{25}$=1.5550.

Example 140

1,7-di-n-propyl-1,4-dihydro-4-oxo - 1,8 - naphthyridine-3-carboxylic acid was prepared following the procedure described in Example 100 using 6.0 g. of ethyl 4-hydroxy-7-n-propyl-1,8-naphthyridine-3-carboxylate, 8.5 g. of n-propyl iodide, 13.8 g. of anhydrous potassium carbonate, 100 cc. of dimethylformamide, and a heating period of four hours to obtain ethyl 1,7-di-n-propyl-1,4-dihydro-4-oxo-1,8-naphthyridine - 3 - carboxylate which was then saponified using 50 cc. of 10% aqueous potassium hydroxide solution. There was thus obtained 5.0 g. of the product, 1,7-di-n-propyl-1,4-dihydro-4-oxo - 1,8 - naphthyridine-2-carboxylic acid, M.P. 177.8–179.0° C. (corr.), when recrystallized from isopropyl alcohol using decolorizing charcoal.

*Analysis.*—Calcd. for $C_{15}H_{18}N_2O_3$: C, 65.67; H, 6.61; N, 10.21. Found: C, 65.95; H, 6.53; N, 10.25.

Example 141

Ethyl 1-ethyl-1,4-dihydro-4-oxo - 7 - triazo - 1,8 - naphthyridine-3-carboxylate was prepared as follows: To a solution containing 14.0 g. of ethyl 7-chloro-1-ethyl-1,4-dihydro-4-oxo-1,8-naphthyridine-3 - carboxylate dissolved in 200 cc. of warm ethanol was added 13.0 g. of sodium azide in 50 cc. of water and 12 cc. of concentrated hydrochloric acid. The reaction mixture was refluxed gently and evaporated to dryness. The residual material was taken up with water; and the solid was collected, washed with water, recrystallized from isopropyl alcohol and washed with n-hexane to yield 10.5 g. of the product, ethyl 1-ethyl-1,4-dihydro-4-oxo-7-triazo - 1,8 - naphthyridine-3-carboxylate, M.P. 169.6–172.8° C. (corr.) with decomposition.

*Analysis.*—Calcd. for $C_{13}H_{13}N_5O_3$: C, 54.35; H, 4.56; N, 24.38. Found: C, 54.52; H, 4.28; N, 24.18.

Example 142

1-ethyl-1,4-dihydro-7-methyl-4-oxo-1,8 - naphthyridine-3-(N-n-butyl)carboxamide was prepared as follows: A suspension containing 23.2 g. of 1-ethyl-1,4-dihydro-7-methyl-4-oxo-1,8-naphthyridine-3-carboxylic acid, 15.3 g. of phosphorus oxychloride and 250 cc. of chloroform was refluxed for 80 minutes, cooled to room temperature and to this suspension then was added cautiously 75 cc. of n-butylamine. The resulting reaction mixture was stirred for three hours, washed successively with 10% aqueous potassium carbonate solution and water, dried over anhydrous potassium carbonate and evaporated to dryness by heating on a steam bath at atmospheric pressure. The remaining solid was triturated several times with n-pentane and then recrystallized from acetonitrile using decolorizing charcoal. There was thus obtained 10.9 g. of the product, 1-ethyl-1,4-dihydro-7-methyl - 4 - oxo - 1,8-naphthyridine-3-(N - n - butyl)carboxamide, M.P. 156.2–157.4° C. (corr.).

*Analysis.*—Calcd. for $C_{16}H_{21}N_3O_2$: C, 66.87; H, 7.37; N, 14.62. Found: C, 66.82; H, 7.42; N, 14.56.

Example 143

1-ethyl-1,4-dihydro-7-methyl-4-oxo-1,8 - naphthyridine-3-(N,N-pentamethylene)carboxamide was prepared following the procedure described in Example 142 using 4.6 g. of 1-ethyl-1,4-dihydro-7-methyl-4-oxo - 1,8 - naphthyridine-3-carboxylic acid, 3.1 g. of phosphorus oxychloride, 50 cc. of chloroform and 15 cc. of piperidine. After two recrystallizations from cyclohexane, using decolorizing charcoal during the first recrystallization, there was obtained 2.6 g. of the product, 1-ethyl-1,4-dihydro-7-methyl-4-oxo-1,8-naphthyridine-3-(N,N - pentamethylene) carboxamide, M.P. 166.8–167.8° C. (corr.).

*Analysis.*—Calcd. for $C_{17}H_{21}N_3O_2$: C, 68.20; H, 7.07; N, 14.04. Found: C, 67.97; H, 7.31; N, 13.79.

Example 144

1-ethyl-1,4-dihydro-7-methyl-4-oxo-1,8 - naphthyridine-3-(N,N-diethyl)carboxamide was prepared following the procedure described in Example 142 using 34.9 g. of 1-ethyl-1,4-dihydro-7-methyl-4-oxo - 1,8 - naphthyridine-3-carboxylic acid, 23.0 g. of phosphorus oxychloride, 375 cc. of chloroform and 110 cc. of diethylamine. There was thus obtained 22.4 g. of the product, 1-ethyl-1,4-dihydro-7-methyl-4-oxo-1,8-naphthyridine-3-(N,N - diethyl) - carboxamide, 136.8–137.2° C. (corr.), after trituration with n-pentane and recrystallization from cyclohexane using decolorizing charcoal.

*Analysis.*—Calcd. for $C_{16}H_{21}N_3O_2$: C, 66.87; H, 7.37; N, 14.62. Found: C, 66.92; H, 7.33; N, 14.81.

Example 145

7-(diethylaminoacetoxymethyl) - 1 - ethyl-1,4-dihydro-4-oxo-1,8-naphthyridine-3-carboxylic acid was prepared as follows: A mixture containing 7.0 g. of 7-chloroacetoxymethyl - 1 - ethyl - 1,4 - dihydro - 4 - oxo - 1,8 - naphthyridine-3-carboxylic acid, 20 cc. of diethylamine and 100 cc. of ethanol was refluxed gently on a steam bath for three hours and then evaporated to dryness in vacuo. The remaining solid material was taken up in water; the aqueous mixture filtered; and the filtrate acidified with acetic acid. The resulting precipitate was collected, recrystallized successively from isopropyl alcohol and acetic acid, washed with acetone and air-dried to yield 2.5 g. of the product, 7-(diethylaminoacetoxymethyl)-1-ethyl - 1,4 - dihydro - 4 - oxo - 1,8 - naphthyridine-3-carboxylic acid, M.P. 249.8–255.0° C. (corr.).

*Analysis.*—Calcd. for $C_{18}H_{23}N_3O_5$: C, 59.82; H, 6.42; N, 11.62. Found: C, 69.75; H, 6.52; N, 11.49.

7-(diethylaminoacetoxymethyl) - 1 - ethyl - 1,4 - dihydro - 4 - oxo - 1,8 - naphthyridine - 3 - carboxylic acid was found to have significant in vivo activity against *Klebsiella pneumoniae* in mice when administered orally at a dose level of 100 mg./kg./d.

The intermediate 7-chloroacetoxymethyl - 1 - ethyl-1,4 - dihydro - 4 - oxo - 1,8 - naphthyridine-3-carboxylic acid was prepared as follows: A mixture containing 17.4 g. of 1-ethyl - 1,4 - dihydro - 7 - hydroxymethyl-4-oxo-1,8-naphthyridine-3-carboxylic acid, 24.0 g. of chloroacetic anhydride and 150 cc. of acetic acid was heated on a steam bath with stirring for three hours and then poured into two liters of water with stirring. The solid precipitate was collected and recrystallized from isopropyl alcohol to yield 7-chloroacetoxymethyl - 1 - ethyl-1,4-dihydro - 4 - oxo - 1,8 - naphthyridine - 3 - carboxylic acid, M.P. 159–163° C., which was used in the above reaction without further recrystallization.

Example 146

Ethyl 7-cyano - 1 - ethyl - 1,4 - dihydro - 4 - oxo-1,8-naphthyridine - 3 - carboxylate was prepared as follows: A solid mixture containing 56 g. of ethyl 7-chloro-1-ethyl-1,4 - dihydro - 4 - oxo - 1,8 - naphthyridine - 3 - carboxylate and 21 g. of cuprous cyanide was ground well and heated at 180° C. (internal temperature) in an oil bath for five hours with occasional stirring. The resulting mass was dissolved in 70 cc. of dimethylformamide during one hour of reflux. This hot solution was added to a solution of 30 g. of sodium cyanide in 60 cc. of water with vigorous stirring and cooling using an ice bath to keep the temperature below 45° C. After 30 minutes of stirring, the separated solid was collected and triturated in a mortar with 100 cc. of 10% aqueous sodium cyanide solution. The resulting solid was collected, dried in vacuo at 60° C., pulverized and extracted with 700 cc. of refluxing benzene. The insoluble material was filtered off and the benzene solution was concentrated to 500 cc. and cooled. There separated 15.4 g. of the solid product, ethyl 7-cyano - 1 - ethyl - 1,4 - dihydro - 4 - oxo-1,8-naphthyridine - 3 - carboxylate, which was found to melt at 198–202° C. A sample recrystallized from ethanol melted at 203.2–204.0° C. (corr.).

*Analysis.*—Calcd. for $C_{14}H_{13}N_3O_3$: C, 61.98; H, 4.83; N, 15.49. Found: C, 62.25; H, 4.64; N, 15.12.

Ethyl 7-cyano - 1 - ethyl - 1,4 - dihydro - 4 - oxo-1,8-naphthyridine - 3 - carboxylate was found to have significant in vivo activity against *Klebsiella pneumoniae* in mice when administered at a dose level of 400 mg./kg./d.

Example 147

Ethyl 7-acetamidomethyl - 1 - ethyl - 1,4 - dihydro-4-oxo - 1,8 - naphthyridine - 3 - carboxylate was prepared as follows: 2.8 g. of ethyl 7-cyano - 1 - ethyl - 1,4 - dihydro - 4 - oxo - 1,8 -naphthyridine - 3 - carboxylate was dissolved in 300 cc. of acetic anhydride by warming. To this solution were added 1.5 g. of potassium acetate and about 1 g. of Raney nickel catalyst which had been washed with acetic anhydride; and the mixture was reduced at 50° C. using 50 pounds per sq. inch of hydrogen for 90 minutes. The catalyst was filtered off and the filtrates from 7 such runs were combined and concentrated. The residue was taken up with chloroform and the mixture washed twice with water. The chloroform layer was then clarified by filtering through a filter aid, e.g., Filter-Cel, and then evaporated in vacuo. 100 cc. of acetone was added to the residual orange oil whereupon crystallization resulted. The solid was collected, washed with cold acetone and recrystallized twice from acetone to yield 4.0 g. of the product, ethyl 7-acetamidomethyl - 1 - ethyl - 1,4 - dihydro - 4 - oxo - 1,8 - naphthyridine - 3 - carboxylate, M.P. 165.4–166.4° C. (corr.).

*Analysis.*—Calcd. for $C_{16}H_{19}N_3O_4$: C, 60.55; H, 6.04; N, 13.24. Found: C, 60.83; H, 5.82; N, 13.50.

Example 148

7-aminomethyl - 1 - ethyl - 1,4 - dihydro - 4 - oxo-1,8-naphthyridine - 3 - carboxylic acid was obtained as its hydrochloride as follows: A mixture containing 7.6 g. of ethyl 7-acetamidomethyl - 1 - ethyl - 1,4 - dihydro-4-oxo - 1,8 - naphthyridine - 3 - carboxylate and 35 cc. of concentrated hydrochloric acid was heated on a steam bath for seven hours. Another 25 cc. portion of concentrated hydrochloric acid was added to the reaction mixture and heating was continued on the steam bath for an additional two hours. The reaction mixture was then concentrated on the steam bath in vacuo to yield a pale yellow solid. The solid was dissolved in about 100 cc. of water, the solution filtered and the filtrate allowed to stand. The solid that separated was recrystallized from above 150 cc. of water to yield 5.4 g. of the product, 7-aminomethyl - 1 - ethyl - 1,4 - dihydro - 4 - oxo - 1,8-naphthyridine - 3 - carboxylic acid hydrochloride, M.P. 278.0–280.8° C. (corr.) with decomposition after drying at 80° C. in a vacuum oven.

*Analysis.*—Calcd. for $C_{12}H_{13}N_3O_3 \cdot HCl$: N, 14.81; Cl, 12.50. Found: N, 14.67; Cl, 12.33.

Example 149

4-oxo - 1,4 - dihydro-1-n-propyl - 1,8 - naphthyridine-3-carboxylic acid was prepared as follows: 5.9 g. of ethyl 7-chloro - 1,4 - dihydro - 4 - oxo-1-n-propyl - 1,8 - naphthyridine - 3 - carboxylate was dissolved in 300 cc. of ethanol and to this solution were added 5.9 g. of potassium acetate and about 3 g. of Raney nickel which had been washed with ethanol. The mixture was placed in a Paar apparatus and hydrogenated at an initial pressure of 50 pounds per sq. inch of hydrogen at room temperature for about 90 minutes. After the catalyst had been filtered off, the filtrate was concentrated and washed with water. The oily layer was separated off and the aqueous layer was washed with ether. The combined oil and ether layers were evaporated in vacuo to yield an oily material containing ethyl - 1,4 - dihydro-4-oxo-1-n-propyl - 1,8 - naphthyridine - 3 - carboxylate. This ester was hydrolyzed by heating the oily material for about 30 minutes on a steam bath with a mixture of 20 cc. of 10% aqueous potassium hydroxide solution and 5 cc. of ethanol. The solution was then diluted with 75 cc. of water and neutralized with hydrochloric acid. The resulting precipitate was collected, washed with water and dried to obtain 3.5 g. of the product, 4-oxo - 1,4 - dihydro-1-n-propyl-1,8-naphthyridine - 3 - carboxylic acid, M.P. 158–160° C. A sample for analysis was recrystallized from ethanol, the M.P. being 160.0–163.4° C. (corr.).

*Analysis.*—Calcd. for $C_{12}H_{12}N_2O_3$: C, 62.06; H, 5.21; N, 12.06. Found: C, 61.90; H, 5.22; N, 12.03.

Example 150

1 - (3 - carbethoxy - 1 - ethyl-1,4-dihydro-4-oxo-1,8-naphthyridine - 7-yl-methyl)pyridinium iodide was prepared as follows: 78 g. of ethyl 1-ethyl-1,4-dihydro-7-methyl - 4-oxo-1,8-naphthyridine-3-carboxylate was dissolved in 200 cc. of pyridine by warming and a solution of 77 g. of iodine was added. The solution was refluxed for 16 hours and then poured into two liters of benzene with stirring. The resulting precipitate was col- Yet other compounds encompassed by our invention and prepared by hereinabove described procedures unless otherwise indicated are the following:

212. 7-benzyl - 1 - ethyl 1,4-dihydro-4-oxo-1,8-naphthyridine-3-carboxylic acid, M.P. 157.4–160.0° C. (corr.).

213. Ethyl 7-benzyl - 1 - ethyl-1,4-dihydro-4-oxo-1,8-naphthyridine - 3-carboxylate, M.P. 139.0–140.2° C. (corr.).

214. 7-benzyl-1,4-dihydro - 1 - methyl-4-oxo-1,8-naphthyridine-3-carboxylic acid, M.P. 172.0–173.0° C. (corr.).

215. 7-benzyl-1,4-dihydro - 4 - oxo-1-n-propyl-1,8-naphthyridine-3-carboxylic acid, M.P. 157.0–158.0° C. (corr.).

216. 1-ethyl-1,4-dihydro - 4 - oxo-7-phenoxy-1,8-naphthyridine-3-carboxylic acid, M.P. 233.0–236.5° C. (corr.).

217. 7-(4-chlorophenoxy) - 1 - ethyl-1,4-dihydro-4-oxo-1,8-naphthyridine-3-carboxylic acid, M.P. 233.4–234.8° C. (corr.).

218. 1-ethyl-1,4 - dihydro - 4 - oxo-7-(4-methylphenoxy)-1,8-naphthyridine-3-carboxylic acid, M.P. 236.0–238.5° C. (corr.).

219. 4-oxo-1,4-dihydro - 7 - phenoxy-1-n-propyl-1,8-naphthyridine - 3 - carboxylic acid, M.P. 190.0–192.0° C. (corr.).

220. 1-methyl-1,4 - dihydro - 4 - oxo-7-phenoxy-1,8-naphthyridine-3-carboxylic acid, M.P. 254.0–256.0° C. (corr.).

221. 1-ethyl-1,4-dihydro - 7 - (4-methoxyphenoxy)-4-oxo-1,8-naphthyridine-3-carboxylic acid, M.P. 215.5–217.5° C. (corr.).

222. 1-ethyl-1,4-dihydro - 7 - (4-nitrophenoxy)-4-oxo-1,8-naphthyridine-3-carboxylic acid, M.P. 235.5–238.0° C. (corr.).

223. 1-ethyl-1,4-dihydro-4-oxo - 7 - phenylmercapto-1,8-naphthyridine-3-carboxylic acid, M.P. 200.0–203.0° C. (corr.).

224. 7-anilino-1-ethyl - 1,4 - dihydro-4-oxo-N-phenyl-1,8-naphthyridine-3-carboxamide, M.P. 263.6–265.8° C. (corr.).

225. 7-(α,α-dimethylbenzyl) - 1 - ethyl-1,4-dihydro-4-oxo-1,8 - naphthyridine-3-carboxylic acid, M.P. 154.6–155.8° C. (corr.) (prepared by reacting at room temperature the ethyl ester of the corresponding 7-benzyl compound with two molar equivalents of methyl iodide in the presence of sodium methoxide using dimethylformamide as the solvent, and then saponifying the resulting ester by warming with aqueous sodium hydroxide).

226. 7-anilino-1-ethyl-1,4-dihydro - 4 - oxo-1,8-naphthyridine-3-carboxylic acid, M.P. >300° C.

227. 1-ethyl-1,4-dihydro - 7 - (α-methylbenzyl)-4-oxo-1,8-naphthyridine-3-carboxylic acid, M.P. 133.6–134.2° C. (corr.) (prepared by reacting at room temperature the corresponding 7-benzyl compound with one molar equivalent of methyl iodide in the presence of sodium methoxide using dimethylformamide as the solvent).

228. 7-benzoyl-1-ethyl-1,4-dihydro - 4 - oxo-1,8-naphthyridine-3-carboxylic acid, M.P. 264.0–266.0° C. (corr.).

229. 1-ethyl-1,4-dihydro - 7 - (α-hydroxybenzyl)-4-oxo-1,8-naphthyridine-3-carboxylic acid, M.P. 214.8–215.6° C. (corr.) (prepared by reduction of the corresponding 7-benzoyl compound with sodium borohydride).

230. N - cyclohexyl-1-ethyl - 1,4 - dihydro-4-oxo-7-(phenoxymethyl)-1,8-naphthyridine-3-carboxamide, M.P. 193.0–194.0° C. (corr.).

231. 7-benzyl - 1 - ethyl-1,4,5,6,7,8-hexahydro-4-oxo-1,8-naphthyridine-3-carboxylic acid, M.P. 288.0–290.0° C. (dec.) (corr.) (prepared by catalytic hydrogenation of 7-benzyl-1-ethyl - 1,4 - dihydro-4-oxo-1,8-naphthyridine-3-carboxylic acid using 10% palladium on charcoal as the catalyst and 6 N HCl as the solvent).

232. 7-(cyclohexyloxy) - 1 - ethyl-1,4-dihydro-4-oxo-1,8-naphthyridine-3-carboxylic acid, M.P. 207.0–208.0° C. (corr.) (prepared by reaction of the corresponding 7-chloro compound with the sodium salt of cyclohexanol).

233. n-Octyl 1-ethyl-1,4 - dihydro - 7 - methyl-4-oxo-1,8-naphthyridine-3-carboxylate, M.P. 84.6–85.6° C. (corr.)

234. Benzyl 1-ethyl - 1,4 - dihydro - 7 - methyl-4-oxo-1,8-naphthyridine-3-carboxylate, M.P. 128.2–131.8° C. (corr.).

235. n-Tetradecyl 1-ethyl - 1,4 - dihydro - 7 - methyl-4-oxo-1,8-naphthyridine-3-carboxylate, M.P. 76.6–78.4° C. (corr.).

236. n-Hexadecyl 1-ethyl - 1,4 - dihydro - 7 - methyl-4-oxo-1,8-naphthyridine-3-carboxylate, M.P. 81.4–82.6° C. (corr.).

237. 1,4-dihydro - 7 - hydroxy - 1 - methyl-4-oxo-1,8-naphthyridine-3-carboxylic acid, M.P. >300.0° C.

238. 1,4-dihydro - 7 - hydroxy - 4 - oxo-1-n-propyl-1,8-naphthyridine-3-carboxylic acid, M.P. 257.0–258.8° C. (corr.).

239. 7-chloro - 1,4 - dihydro - 1 - methyl-4-oxo-1,8-naphthyridine-3-carboxylic acid, M.P. >300.0° C.

240. Ethoxycarbonylmethyl 1-ethyl - 1,4 - dihydro-7-methyl - 4 - oxo - 1,8 - napthyridine-3-carboxylate, M.P. 149.0–152.0° C. (corr.).

241. Sodium 1-ethyl - 1,4 - dihydro - 7 - (hydroxymethyl)-4-oxo-1,8-naphthyridine - 3 - carboxylate decomposes at 243.5° C. (corr.).

242. Magnesium 1-ethyl - 1,4 - dihydro - 7 - methyl-4-oxo - 1,8 - naphthyridine - 3 - carboxylate dihydrate, M.P. >300.0° C. (uncorr.).

243. 1-ethyl - 1,4,5,6,7,8-hexahydro - 7 - methyl-4-oxo-1,8-naphthyridine-3-carboxylic acid, M.P. 294.2–296.0° C. (dec.) (corr.). (prepared by catalytic hydrogenation of 1-ethyl-1,4 - dihydro - 7 - methyl-4-oxo-1,8-naphthyridine-3-carboxylic acid using 10% Pd on charcoal as the catalyst and acetic acid as the solvent).

244. 1-ethyl - 1,4,5,6,7,8 - hexahydro - 4 - oxo - 1,8-naphthyridine-3-carboxylic acid, M.P. >300° C. (corr.) (prepared by catalytic hydrogenation of ethyl 7-chloro-1-ethyl-1,4-dihydro-4-oxo - 1,8-naphthyridine-3-carboxylate using 10% Pd on charcoal as the catalyst and acetic acid as the solvent to form ethyl 1-ethyl-1,4,5,6,7,8-hexahydro-4-oxo-1,8-naphthyridine-3-carboxylate hydrochloride and saponifying the latter by heating it on a steam bath for one hour in 10% aqueous potassium hydroxide).

245. 8-acetyl-1-ethyl - 1,4,5,6,7,8 - hexahydro - 4 - oxo-1,8-naphthyridine-3-carboxylic acid, M.P. 182.7–184.4° C. (corr.) (prepared by reacting 1-ethyl-1,4,5,6,7,8-hexahydro-4-oxo-1,8-naphthyridine-3-carboxylic acid with acetic anhydride).

Other novel intermediates prepared by procedures described hereinabove unless otherwise indicated are: ethyl 7-benzyl-4-hydroxy-1,8-naphthyridine-3-carboxylate, M.P. 218.5–219.5° C. (corr.); 7-benzyl-4-hydroxy-1,8-naphthyridine-3-carboxylic acid, M.P. 209.5–211° C.; 7-benzoyl-4 - hydroxy-1,8-naphthyridine-3-carboxylic acid, M.P. 290.4–291.0° C. (dec.) (corr.) (prepared by oxidation of the corresponding 7-benzyl compound with potassium ferricyanide); diethyl N-(6-benzyl-2-pyridyl)aminoethylenemalonate, M.P. 77.8–79.8° C. (corr.); and, 2-amino-6-benzylpyridine, M.P. 55–57° C. (prepared by amination of 2-benzylpyridine by heating it in dimethylaniline with sodamide for 16 hours at 140° C.).

Still other compounds embodied by our invention and prepared by procedures described hereinabove are the following:

246. 1-ethyl-1,4-dihydro-7-(2-methoxyphenoxy)-4-oxo-1,8-naphthyridine-3-carboxylic acid.

247. 1-ethyl-1,4-dihydro-7-(3-methoxyphenoxy)-4-oxo-1,8-naphthyridine-3-carboxylic acid.

248. 1-ethyl-1,4-dihydro-7-(2 - methylphenoxy)-4-oxo-1,8-naphthyridine-3-carboxylic acid.

249. 1-ethyl-1,4-dihydro-7-(3 - methylphenoxy)-4-oxo-1,8-naphthyridine-3-carboxylic acid.

250. 7-(2 - chlorophenoxy)-1-ethyl-1,4-dihydro-4-oxo-1,8-naphthyridine-3-carboxylic acid.

251. 7-(3 - chlorophenoxy)-1-ethyl-1,4-dihydro-4-oxo-1,8-naphthyridine-3-carboxylic acid.

252. 7-(3,4 - dimethoxyphenoxy)-1-ethyl-1,4-dihydro-4-oxo-1,8-naphthyridine-3-carboxylic acid.

253. 7-(2,4 - dichlorophenoxy)-1-ethyl-1,4-dihydro-4-oxo-1,8-naphthyridine-3-carboxylic acid.

254. 7-(3,4 - dichlorophenoxy)-1-ethyl-1,4-dihydro-4-oxo-1,8-naphthyridine-3-carboxylic acid.

255. 7-benzyloxy-1-ethyl-1,4-dihydro-4-oxo-1,8 - naphthyridine-3-carboxylic acid.

256. 1-ethyl-1,4-dihydro-7-(2-nitrophenoxy)-4-oxo-1,8-naphthyridine-3-carboxylic acid.

257. 1-ethyl-1,4-dihydro-7-(3 - nitrophenoxy-4-oxo-1,8-naphthyridine-3-carboxylic acid.

258. 1-ethyl-1,4-dihydro-7-(1 - naphthyloxy)-4-oxo-1,8-naphthyridine-3-carboxylic acid.

259. 1-ethyl-1,4-dihydro-7-(2 - naphthyloxy)-4-oxo-1,8-naphthyridine-3-carboxylic acid.

260. 1-ethyl-1,4-dihydro-4-oxo-7-(2 - pyridyloxy)-1,8-naphthyridine-3-carboxylic acid.

261. 1-ethyl-1,4-dihydro-4-oxo-7-(3 - pyridyloxy)-1,8-naphthyridine-3-carboxylic acid.

262. 1-ethyl-1,4-dihydro-4-oxo-7-(4 - pyridyloxy)-1,8-naphthyridine-3-carboxylic acid.

263. 7-(4-aminobenzyl)-1-ethyl-1,4-dihydro-4-oxo-1,8-naphthyridine-3-carboxylic acid.

264. 7-(4-acetylaminobenzyl)-1-ethyl-1,4-dihydro-4-oxo-1,8-naphthyridine-3-carboxylic acid.

265. 1-ethyl-1,4-dihydro-7-methyl-4-oxo-6 - phenylmercapto-1,8-naphthyridine-3-carboxylic acid.

266. 1-ethyl-1,4-dihydro-4-oxo-6-phenylmercapto - 1,8-naphthyridine-3-carboxylic acid.

267. 1-ethyl-1,4-dihydro-4-oxo-6-anilino - 1,8 - naphthyridine-3-carboxylic acid.

268. 1-ethyl-1,4-dihydro-4-oxo-6-phenoxy - 1,8 - naphthyridine-3-carboxylic acid.

269. 6-benzyl-1-ethyl-1,4-dihydro-4-oxo - 1,8 - naphthyridine-3-carboxylic acid.

270. 1-ethyl-1,4-dihydro-7-(4 - methoxybenzyl)-4-oxo-1,8-naphthyridine-3-carboxylic acid.

271. 7-(3,4-dimethoxybenzyl)-1-ethyl-1,4-dihydro - 4-oxo-1,8-naphthyridine-3-carboxylic acid.

272. 7-(4 - ethoxyphenoxy)-1-ethyl-1,4-dihydro-4-oxo-1,8-naphthyridine-3-carboxylic acid.

273. 1-ethyl-1,4-dihydro-7-(1 - naphthylmethyl)-4-oxo-1,8-naphthyridine-3-carboxylic acid.

274. 1-ethyl-1,4-dihydro-4-oxo-7-(3 - pyridylmethyl)-1,8-naphthyridine-3-carboxylic acid.

275. 1-ethyl-1,4-dihydro-4-oxo-7-(4 - pyridylmercapto)-1,8-naphthyridine-3-carboxylic acid.

276. 1-ethyl-1,4-dihydro-4-oxo-7-(2-pyridylamino)-1,8-naphthyridine-3-carboxylic acid.

277. 1-ethyl-1,4-dihydro-4-oxo-7-(2 - pyrimidyloxy)-1,8-naphthyridine-3-carboxylic acid.

278. 7-(4-biphenylyloxy)-1-ethyl-1,4-dihydro-4-oxo-1,8-naphthyridine-3-carboxylic acid.

279. 1-ethyl-7-(2-furyloxy) - 1,4 - dihydro-4-oxo-1,8-naphthyridine-3-carboxylic acid.

280. 1-ethyl-1,4-dihydro-4-oxo-7-(2 - thiazolyloxy)1,8-naphthyridine-3-carboxylic acid.

281. 1-ethyl-1,4-dihydro-7-(2 - oxazolyloxy)-4-oxo-1,8-naphthyridine-3-carboxylic acid.

282. 1-ethyl-1,4-dihydro-4-oxo-7-(2-s-triazinyloxy)-1,8-naphthyridine-3-carboxylic acid.

283. 1-ethyl-1,4-dihydro-4-oxo - 7 - (2-thienyloxy)-1,8-naphthyridine-3-carboxylic acid.

284. 1-ethyl-1,4 - dihydro - 4-oxo-7-(2-thienylmethyl)-1,8-naphthyridine-3-carboxylic acid.

285. 7benzyl-3-cyano-1-ethyl - 1,4-dihydro - 4-oxo-1,8-naphthyridine.

286. 3 - cyano - 1 - ethyl-1,4-dihydro-4-oxo-7-phenoxy-1,8-naphthyridine.

287. 7 - benzyl - 1 - ethyl-1,4-dihydro-4-oxo-1,8-naphthyridine-3-carboxamide.

288. 1 ethyl - 1,4 - dihydro - 4 - oxo-7-phenoxy1,8-naphthyridine-3-carboxamide.

289. 1 - (2 - furylmethyl) - 1,4 - dihydro - 7-methyl-4-oxo-1,8-naphthyridine-3-carboxylic acid.

290. 7 methyl - 1,4 - dihydro - 4 - oxo-1-(2-thiazolylmethyl)-1,8-naphthyridine-3-carboxylic acid.

291. 7 - methyl - 1,4 - dihydro - 1-(2-oxazolylmethyl)-4-oxo-1,8-naphthyridine-3-carboxylic acid.

292. 7 - methyl - 1,4 - dihydro - 4 - oxo-1-(2-s-triazinylmethyl-1,8-naphthyridine-3-carboxylic acid.

293. 1 - ethyl - 1,4 - dihydro - 7-n-hexyloxy-4-oxo-1,8-naphthyridine-3-carboxylic acid.

294. 1 - ethyl - 1,4 - dihydro-7-n-hexylmercapto-4-oxo-1,8-naphthyridine-3-carboxylic acid.

295. 1 - ethyl - 1,4 - dihydro - 7-n-hexylamino-4-oxo-1,8-naphthyridine-3-carboxylic acid.

296. 7 - (2 - ethoxyethyl) - 1 - ethyl-1,4-dihydro-4-oxo-1,8-naphthyridrine-3-carboxylic acid.

297. 7-cyclohexyl-1-ethyl-1,4-dihydro - 4 - oxo - 1,8-naphthyridine-3-carboxylic acid.

298. 7 - cyclohexylmercapto - 1 - ethyl-1,4-dihydro-4-oxo-1,8-naphthyridine-3-carboxylic acid.

299. 7 - cyclohexylamino - 1 - ethyl-1,4-dihydro-4-oxo-1,8-naphthyridine-3-carboxylic acid.

300. 7 - cyclohexylmethyl - 1 - ethyl-1,4-dihydro-4-oxo-1,8-naphthyridine-3-carboxylic acid.

301. 1 - ethyl - 1,4 - dihydro-4-oxo-7-(4-quinolyloxy)-1,8-naphthyridine-3-carboxylic acid.

302. 1 - ethyl-1,4-dihydro-4-oxo-7-(2-quinolylamino)-1,8-naphthyridine-3-carboxylic acid.

303. 1 - ethyl - 1,4 - dihydro - 4 - oxo-7-(4-quinolylmercapto)-1,8-naphthyridine-3-carboxylic acid.

304. 7 - methyl - 1,4 - dihydro - 4-oxo-1-(4-quinolylmethyl)-1,8-naphthyridine-3-carboxylic acid.

Our 1,4-dihydro-4-oxo-1-substituted - 1,8-naphthyridine-3-carboxylic acids and derivatives of Formula I where Q is AR—CH$_2$, AR—O, AR—S or AR—NH where AR is defined hereinabove, in particular, where these substituents are at the 7-position of the naphthyridine nucleus, and related compounds, e.g., corresponding 5,6,7,8-tetrahydro derivatives and 7-cyclohexyloxy compounds, when tested according to standard pharmacological evaluation procedures in animals, have been found to possess the inherent applied use characteristics of exerting a central nervous stimulant effect in animal organisms. For example, when administered orally to mice using a modified procedure of the photocell activity cage method of Dews [Brit. J. Pharmacol. 8, 46 (1953)], these embodiments were found to have psychomotor stimulatory properties at dose levels of about 1 to 300 mg. per kg. of body weight. Also, when administered intraperitoneally to mice in the Reserpine Ptosis Reversal and Prevention Tests, as described below, these compounds were found to prevent and to reverse reserpine-induced eyelid ptosis at dose levels of about 0.5 to 50 mg. per kg. of body weight.

The Reserpine Ptosis Reversal Test (RPRT) is described briefly as follows: Unfasted male mice weighing 17 to 30 gms. are grouped in cages of 8 animals each. The mice are injected intraperitoneally with 2 mg./kg. of reserpine, and 3 hours later with test agent. One-half hour after administration of test agent the degree of eyelid ptosis is scored. The scores are evaluated by means of the rank sum test and the results are reported as probability values. The compounds are initially tested at 30 and 50 mg. per kg. If significant activity is noted at these doses, the compound is further tested at progressively lower doses, e.g., 10, 1, 0.5, 0.25, 0.1 mg. (salt)/kg., until an inactive dose is found.

The Reserpine Ptosis Prevention Test (RPPT) is described briefly as follows: Unfasted male mice weighing 17 to 30 gms. are grouped in cages of 8 animals each. The mice are injected intraperitoneally with the test agent. Two hours later the mice are injected intraperitoneally with 2 mg./kg. of reserpine. Three hours after the administration of reserpine the degree of eyelid ptosis is scored. The scores are evaluated by means of the rank sum test and the results are reported as probability values. The compounds are initially tested at 30 and 50 mg. per kg. If significant activity is noted at these doses, the compound is further tested at progressively lower doses, e.g. 10, 1, 0.5, 0.25, 0.1 mg. (salt)/kg., until an inactive dose is found.

For purpose of illustration but without limiting the generality of the foregoing, compounds having activity as central nervous stimulants are given as follows, with PST designating the above-noted Psychomotor Stimulatory Test, and RPRT or RPPT designating respectively the Reserpine Ptosis Reversal or Prevention Test: 7-benzyl-1-ethyl - 1,4 - dihydro-4-oxo-1,8-naphthyridine-3-carboxylic acid (PST, 1 mg./kg.; RPRT, 0.5 mg./kg.; RPPT, 10 mg./kg.); ethyl 7 - benzyl - 1-ethyl-1,4-dihydro-4-oxo-1,8-naphthyridine-3-carboxylate (RPRT, 10 mg./kg.; RPPT, 50 mg./kg.); 7 - benzyl - 1,4-dihydro-1-methyl-4-oxo-1,8-naphthyridine-3-carboxylic acid (PST, 10 mg./kg.; RPRT, 10 mg./kg.; RPPT, 50 mg./kg.); 7-benzyl-1,4-dihydro-4-oxo-1-n-propyl-1,8-naphthyridine-3-carboxylic acid (PST, 1 mg./kg.; RPRT, 10 mg./kg.; RPPT, 50 mg./kg.); 1-ethyl - 1,4 - dihydro-4-oxo-7-phenoxy-1,8-naphthyridine-3-carboxylic acid (RPRT, 10 mg./kg.; RPPT, 30 mg./kg.); 1 - ethyl - 1,4-dihydro-7-(4-methoxyphenoxy)-4-oxo-1,8-naphthyridine-3-carboxylic acid (RPRT, 10 mg./kg.; RPPT, 10 mg./kg.); 1-ethyl-1,4-dihydro-4-oxo-7-phenylmercapto-1,8-naphthyridine-3-carboxylic acid (RPRT, 1 mg./kg.; RPPT, 10 mg./kg.); 7-cyclohexyloxy-1-ethyl-1,4-dihydro-4-oxo-1,8-naphthyridine-3-carboxylic acid (RPRT, 50 mg./kg.); 7 - benzyl - 1-ethyl-4-oxo-1,4-5,6,7,8-hexahydro - 1,8 - naphthyridine-3-carboxylic acid (RPRT, 50 mg./kg.; RPPT, 50 mg./kg.); and, 7-anilino-1-ethyl-1,4-dihydro-4-oxo-1,8-naphthyridine-3-carboxylic acid (RPRT, 50 mg./kg.).

The invention sought to be patented, in its process aspect, is described as residing in the concept of reacting in the presence of an acid-acceptor, e.g., potassium carbonate, sodium methoxide, sodium hydroxide, sodium acetate, potassium hydroxide, sodamide, sodium hydride, and the like, preferably in the presence of a suitable nonaqueous polar solvent, e.g., dimethylformamide, loweralkanol, dimethyl sulfoxide, etc., a compound of the Formula III

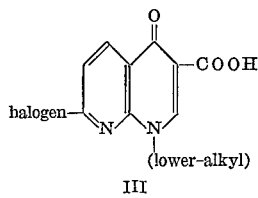

III where halogen is chloro, bromo, iodo or fluoro, preferably chloro, with a 1–2 ringed aryl-methyl cyanide of the formula AR—CH$_2$CN, where AR is defined as hereinabove for Formula I, to yield a compound of Formula IV

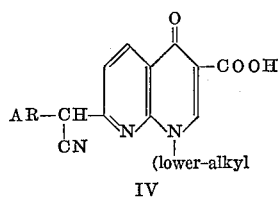

IV and reacting, preferably by heating, the compound of Formula IV with water and a strong acid, inorganic or organic, e.g., hydrochloric acid, sulfuric acid, hydrobromic acid, phosphoric acid, benzenesulfonic acid, paratoluenesulfonic acid, trifluoroacetic acid, and the like, preferably in a suitable polar solvent, e.g., acetic acid, propionic acid, n-butanol, to yield a compound of the Formula V

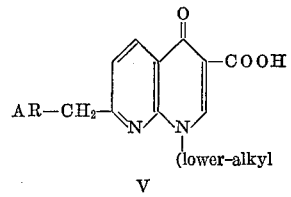

V

The purpose of the acid-acceptor used in the preparation of the compound of Formula III is to take up the hydrogen halide which is formed during the course of the reaction; it is a basic substance, e.g., potassium carbonate and others as noted above, which preferably forms freely water-soluble by-products easily separable from the product of the reaction. Without limiting the generality of the foregoing, the process aspect of the invention is illustrated by the reaction of 7-chloro-1-ethyl-1,4-dihydro-4-oxo-1,8-naphthyridine-3-carboxylic acid with benzyl cyanide to yield 7 - (α - cyanobenzyl)-1-ethyl-1,4-dihydro-4-oxo-1,8-naphthyridine-3-carboxylic acid which is then reacted with water and HCl in acetic acid to form 7-benzyl-1-ethyl-1,4-dihydro-4-oxo-1,8-naphthyridine-3-carboxylic acid. Experimental details of this illustration are given as follows:

Example 305

A mixture containing 20.2 g. of 7-chloro-1-ethyl-1,4-dihydro-4-oxo-1,8-naphthyridine-3-carboxylic acid, 42.8 g. of anhydrous potassium carbonate, 41.6 g. of benzyl cyanide and 600 cc. of dimethylformamide was heated on a steam bath with stirring for about seven hours. The reaction mixture was filtered and the filtrate was acidified with 6 N hydrochloric acid and then diluted with water to a volume of about 3.5 liters whereupon the product separated as a colloidal suspension. The mixture was shaken with about 800 cc. of ether to dissolve the unreacted benzyl cyanide whereupon the precipitated product separated in the ether phase. The aqueous dimethylformamide phase was separated from the ether phase and the precipitated product was collected by filtering the ether phase. The product was washed successively with ether, a small quantity of ethanol and finally ether, and then dried for thirty minutes at 80° C. in a vacuum oven. This solid product was recrystallized from acetonitrile to yield 8.3 g. of 7-(α-cyanobenzyl)-1-ethyl-1,4-dihydro - 4 - oxo - 1,8-naphthyridine-3-carboxylic acid, M.P. 187.0–188.6° C. (corr.).

Analysis.—Calcd. for $C_{19}H_{15}N_3O_3$: C, 68.46; H, 4.54; N, 12.61. Found: C, 68.37; H, 4.57; N, 12.65.

To a boiling solution containing 1.0 g. of 7-(α-cyanobenzyl) - 1 - ethyl-1,4-dihydro-4-oxo-1,8-naphthyridine-3-carboxylic acid in 10 cc. of acetic acid was added 15 cc. of concentrated hydrochloric acid and the resulting reaction mixture was heated for six and one-half hours. The reaction mixture was then poured into 300 cc. of ice water and the solid that separated was collected and recrystallized from ethanol to yield 630 mg. of 7-benzyl-1-ethyl-1,4 - dihydro - 4-oxo-1,8-naphthyridine-3-carboxylic acid, M.P. 157–161.5° C. A mixed melting point of this product and the 7 - benzyl - 1 - ethyl-1,4-dihydro-4-oxo-1,8-naphthyridine-3-carboxylic acid obtained by alkylation of 7 - benzyl - 4-hydroxy-1,8-naphthyridine-3-carboxylic acid with ethyl iodide gave no depression. Also, the infrared spectra of the two compounds were identical.

Example 306

Ethyl 1 - ethyl - 1,4-dihydro-7-[2-(5-nitro-2-thienyl) vinyl] - 4 - oxo - 1,8 - naphthyridine-3-carboxylate—A mixture containing 26.8 g. of ethyl 4-hydroxy-7-[2-(5-nitro-2-thienyl)vinyl]-1,8-naphthyridine - 3 - carboxylate, 29.8 g. of finely ground anhydrous potassium carbonate, 16.9 g. of ethyl iodide and 400 ml. of dimethylformamide was refluxed with stirring on a steam bath for two hours in a flask covered with aluminum foil. The reaction mixture was poured into 3000 ml. of water and stirred. The separated green solid was collected, triturated with acetone, collected again and dried in vacuo at 60° C. to yield 28 g. of ethyl 1-ethyl-1,4-dihydro-7-[2-(5-nitro-2-thienyl) vinyl] - 4 - oxo-1,8-naphthyridine-3-carboxylate which was used in Example 307 without further purification.

The above intermediate ethyl 4-hydroxy-7-[2-(5-nitro-2 - thienyl)vinyl] - 1,8-naphthyridine-3-carboxylate was prepared as follows: A mixture containing 36.6 g. of 5-nitrothiophene-2-carboxaldehyde, 54.0 g. of ethyl 4-hydroxy-7-methyl-1,8-naphthyridine-3-carboxylate, 23.8 g. of acetic anhydride and 325 ml. of acetic acid was refluxed with stirring for seventeen hours in a flask covered with aluminum foil. The yellow suspension was then cooled in an ice bath and the solid collected. The solid was washed well with acetone, air-dried, recrystallized from 6600 ml. of dimethylformamide using decolorizing charcoal, washed well with acetone and dried in a vacuum oven at 60° C. to yield 51.9 g. of ethyl 4-hydroxy-7-[2-(5-nitro-2-thienyl)vinyl]-1,8-naphthyridine-3-carboxylate, M.P. 335–336° C. with decomposition. This compound, a golden-orange powder, is sensitive to light, as is the final product of the immediately preceding paragraph.

Example 307

1 - ethyl - 1,4 - dihydro-7-[2-(5-nitro-2-thienyl)vinyl]-4-oxo-1,8-naphthyridine-3-carboxylic acid—a mixture containing 21.0 g. of ethyl 1-ethyl-1,4-dihydro-7-[2-(5-nitro-2-thienyl)vinyl] - 4 - oxo - 1,8-naphthyridine-3-carboxylate (from Example 306), 420 ml. of acetic acid, 150 ml. of water and 5 ml. of concentrated hydrochloric acid was refluxed with stirring for twenty-four hours in a flask covered with aluminum foil and then allowed to stand at room temperature for thirty-six hours. The separated solid was collected, washed with acetone, recrystallized from dimethylformamide using decolorizing charcoal, washed with acetone and dried in vacuo at 60° C. to yield 13.5 g. of 1-ethyl-1,4-dihydro-7-[2-(5-nitro-2-thienyl)vinyl]-4-oxo-1,8-naphthyridine-3-carboxylic acid, M.P. 282–284° C. with decomposition. This golden-orange solid is light sensitive.

Example 308

Ethyl 1,4 - dihydro - 1 - methyl-7-[2-(5-nitro-2-thienyl)vinyl] - 4 - oxo - 1,8-naphthyridine-3-carboxylate, M.P. 274–275° C., 6.0 g., was prepared as in Example 306 using 8.7 g. of ethyl 4-hydroxy-7-[2-(5-nitro-2-thienyl)vinyl]-1,8-naphthyridine-3-carboxylate, 9.6 g. of anhydrous potassium carbonate, 5.0 g. of methyl iodide, 130 ml. of dimethylformamide and recrystallization from dimethylformamide (180 ml.) using decolorizing charcoal. The recrystallized product was washed with acetone and air-dried in the absence of light.

Example 309

1 - methyl - 1,4 - dihydro - 7-[2-(5-nitro-2-thienyl)vinyl]-4-oxo-1,8-naphthyridine - 3 - carboxylic acid, M.P. 329–330° C. with decomposition, 4.7 g., was prepared as in Example 307 using 6.0 g. of ethyl 1,4-dihydro-1-methyl - 7 - [2-(5-nitro-2-thienyl)vinyl]-4-oxo-1,8-naphthyridine-3-carboxylate, 120 ml. of acetic acid, 45 ml. of water, 1.5 ml. of concentrated hydrochloric acid and recrystallization from dimethylformamide (350 ml.) using decolorizing charcoal. The compound is light sensitive.

Example 310

Ethyl 7 - [1 - ethyl-2-(5-nitro-2-furyl)vinyl]-1,4-dihydro-1-methyl - 4 - oxo-1,8-naphthyridine-3-carboxylate, M.P. 252–253° C. with decomposition, 25.8 g., was prepared as in Example 306, using 29.1 g. of ethyl 7-[1-ethyl-2-(5-nitro-2-furyl)vinyl]-4-hydroxy-1,8-naphthyridine - 3 - carboxylate, 19.2 g. of sodium bicarbonate, 16.2 g. of methyl iodide, 420 ml. of dimethylformamide and recrystallization from dimethylformamide (350 ml.) using decolorizing charcoal. The product is light sensitive.

The above intermediate ethyl 7-[1-ethyl-2-(5-nitro-2-furyl)vinyl] - 4 - hydroxy-1,8-naphthyridine-3-carboxylate was prepared as follows: A mixture containing 16.0 g. of 5-nitro-2-furaldehyde, 29.5 g. of ethyl 4-hydroxy-7-n-propyl-1,8-naphthyridine-3-carboxylate, 160 ml. of acetic acid and 11.5 g. of acetic anhydride was refluxed with stirring for eighteen hours in a flask covered with aluminum foil. After cooling the reaction mixture in an ice bath, the brown precipitate was collected, washed well with acetone, air-dried, recrystallized from dimethylformamide, washed with acetone and dried in vacuo at 60° C. to yield 13.5 g. of ethyl 7-[1-ethyl-2-(5-nitro-2-furyl) vinyl]-4-hydroxy-1,8-naphthyridine - 3 - carboxylate, M.P. 262–263° C. with decomposition. The yellow solid compound is light sensitive.

Example 311

7 - [1 - ethyl - 2 - (5-nitro-2-furyl)vinyl]-1,4-dihydro-1 - methyl - 4 - oxo-1,8-naphthyridine-3-carboxylic acid, M.P. 246–248° C., 19.7 g., was prepared as in Example 307 using 25.8 g. of ethyl 7-[1-ethyl-2-(5-nitro-2-furyl) vinyl] - 1,4 - dihydro-1-methyl-4-oxo-1,8-naphthyridine-3-carboxylate, 400 ml. of acetic acid, 160 ml. of water, 5 ml. of hydrochloric acid, a reflux period of twenty hours and recrystallization from dimethylformamide. The bright yellow solid is light sensitive.

Example 312

Ethyl 1,4 - dihydro-1,6-dimethyl-7-[2-(5-nitro-2-furyl) vinyl] - 4 - oxo - 1,8-naphthyridine-3-carboxylate, M.P. 312° C. with decomposition, 39.5 g., was prepared as in Example 306 using 39.3 g. of ethyl 4-hydroxy-6-methyl-7-[2 - (5-nitro-2-furyl)-vinyl]-1,8-naphthyridine-3-carboxylate, 22.6 g. of methyl iodide, 26.7 g. of sodium bicarbonate and 600 ml. of dimethylformamide. The product, a light-sensitive yellow solid, was purified by washing successively with water and acetone, and drying in vacuo at 60° C.

The intermediate ethyl 4-hydroxy-6-methyl-7-[2-(5-nitro - 2 - furyl)vinyl]-1,8-naphthyridine-3-carboxylate, a light-sensitive yellow solid, M.P. 328° C. with decomposition, 53.2 g., was prepared as in Example 310 using 25.7 g. of 5-nitro-2-furaldehyde, 44.8 g. of ethyl 4-hydroxy-6,7-dimethyl-1,8-naphthyridine - 3 - carboxylate, 257 ml. of acetic acid and 18.6 g. of acetic anhydride.

Example 313

1,6 - dimethyl - 1,4 - dihydro-7-[2-(5-nitro-2-furyl) vinyl] - 4 - oxo-1,8-naphthyridine-3-carboxylic acid, a light-sensitive yellow solid, M.P.>330° C., 27.0 g., was prepared as in Example 307 using 29.4 g. of ethyl 1,4-dihydro - 1,6 - dimethyl - 7 - [2-(5-nitro-2-furyl)-vinyl]-4-oxo-1,8-naphthyridine-3-carboxylate, 300 ml. of acetic acid, 100 ml. of water, 3 ml. of concentrated hydrochloric acid, a reflux period of five and one-half hours and a standing period of fifteen hours at room temperature.

Example 314

Ethyl 1,4 - dihydro - 1,5 - dimethyl - 7 - [2-(5-nitro-2 - furyl)vinyl] - 4 - oxo - 1,8 - naphthyridine - 3 - carboxylate, a light-sensitive yellow solid, M.P. 294° C. with decomposition, 25.4 g., was prepared as in Example 306 using 36.9 g. of ethyl 4 - hydroxy - 5 - methyl - 7 - [2-(5 - nitro - 2 - furyl)vinyl] - 1,8 - naphthyridine - 3-carboxylate, 25.2 g. of sodium bicarbonate, 9.3 ml. of methyl iodide and 400 ml. of dimethylformamide.

The above light-sensitive intermediate, ethyl 4 - hydroxy - 5 - methyl - 7 - [2 - (5 - nitro - 2 - furyl)vinyl]-1,8 - naphthyridine - 3 - carboxylate, M.P.>300° C., 75 g., was prepared as in Example 310 using 153 g. of ethyl 4 - hydroxy - 5,7 - dimethyl - 1,8 - naphthyridine-3-carboxylate, 89 g. of 5 - nitrofuraldehyde and 1000 ml. of acetic acid.

Example 315

1.5 - dimethyl - 1,4 - dihydro - 7 - [2 - (5 - nitro-2-furyl)vinyl] - 4 - oxo - 1,8 - naphthyridine - 3 - carboxylic acid, a light-sensitive yellow solid, M.P. 315–317° C. with decomposition, 20.9 g., was prepared as in Example 307 using 21.0 g. of ethyl 1,4 - dihydro - 1,5 - dimethyl-7-[2 - (5 - nitro - 2 - furyl)vinyl] - 4-oxo-1,8-naphthyridine-3 - carboxylate, 400 ml. of acetic acid, 120 ml. of water and a refluxing period of twenty-four hours. The product was purified by triturating successively with water and ethanol.

Example 316

1 - methoxymethyl - 1,4 - dihydro - 7 - [2 - (5 - nitro-2 - furyl)vinyl] - 4 - oxo - 1,8 - naphthyridine - 3 - carboxylic acid, a light-sensitive yellow solid, M.P. 295° C., 22.7 g., was prepared as in Example 306 using 32.7 g. of 4 - hydroxy - 7 - [2 - (5 - nitro - 2 - furyl)vinyl]-1,8-naphthyridine - 3 - carboxylic acid, 34.5 g. of anhydrous potassium carbonate, 40.3 g. of chloromethyl methyl ether, 1000 ml. of dimethylformamide and a heating period of three and one-half hours. The crude product was suspended in 800 ml. of water and the suspension acidified with a mixture of hydrochloric acid and acetic acid. The solid was collected, washed successively with water and acetone, dried, recrystallized from about 700 ml. of dimethylformamide, triturated with acetone and dried in vacuo at 80° C.

The above 4 - hydroxy - 7 - [2 - (5 - nitro-2-furyl)vinyl] - 1,8 - naphthyridine - 3 - carboxylic acid is prepared by hydrolyzing its ethyl ester which is prepared as in Example 310 by reacting ethyl 4 - hydroxy - 7-methyl - 1,8 - naphthyridine - 3 - carboxylate with 5-nitro-2-furaldehyde.

Example 317

Ethyl 1,4 - dihydro - 1 - methyl - 7 - [2-(5-nitro-2-pyrrolyl)vinyl] - 4 - oxo - 1,8 - naphthyridine - 3 - carboxylate, a light-sensitive yellow powder, M.P.>300° C., 8.4 g., was prepared as in Example 306 using 16.0 g. of ethyl 4 - hydroxy - 7 - [2 - (5 - nitro - 2 - pyrrolyl)vinyl] - 1,8 - naphthyridine - 3 - carboxylate, 6.1 g. of methyl iodide, 7.6 g. of sodium bicarbonate, 250 ml. of dimethylformamide, a heating period of four hours and recrystallization from dimethylformamide (400 ml.) using decolorizing charcoal.

The above intermediate ethyl 4 - hydroxy - 7 - [2-(5 - nitro - 2 - pyrrolyl)vinyl] - 1,8 - naphthyridine-3-carboxylate, M.P.>300° C., 25.9 g., was prepared as in Example 306 using 31 g. of 5 - nitropyrrole - 2 - carboxaldehyde, 102 g. of ethyl 4 - hydroxy - 7 - methyl - 1,8-naphthyridine - 3 - carboxylate, 45 g. of acetic anhydride, 620 ml. of acetic acid, a reflux period of five and one-half hours, and recrystallization from dimethylformamide (800 ml.) using decolorizing charcoal.

Example 318

1,4 - dihydro - 1 - methyl - 7 - [2 - (5 - nitro - 2-pyrrolyl)vinyl] - 4 - oxo - 1,8 - naphthyridine - 3 - carboxylic acid, a light-sensitive dark yellow powder, M.P.>300° C., 6.3 g., was prepared as in Example 307 using 8.4 g. of ethyl 1,4 - dihydro - 1 - methyl - 7-[2-(5 - nitro - 2 - pyrrolyl)vinyl] - 4 - oxo-1,8-naphthyridine-3 - carboxylate, 135 ml. of acetic acid, 50 ml. of water and 2 ml. of concentrated hydrochloric acid.

Example 319

Ethyl 1,4 - dihydro - 1 - methyl - 7 - [2-(1-methyl-5-nitro - 2 - pyrrolyl)vinyl] - 4 - oxo - 1,8 - naphthyridine-3 - carboxylate—A mixture containing 16.4 g. of ethyl 4 - hydroxy - 7 - [2 - (5 - nitro - 2 - pyrrolyl)vinyl] - 1,8-naphthyridine - 3 - carboxylate, 16.3 g. of methyl iodide, 11.6 g. of sodium bicarbonate and 260 ml. of dimethylformamide was refluxed with stirring on a steam bath for four hours and fifteen minutes in a flask covered with aluminum foil. The reaction mixture was allowed to stand overnight (about fifteen hours) at room temperature and was then poured into 1200 ml. of water. The mixture was stirred well and the solid was collected, washed successively with water and acetone, air-dried, recrystallized from 1300 ml. of dimethylformamide using decolorizing charcoal washed with acetone and air-dried to yield 9.9 g. of ethyl 1,4 - dihydro - 1 - methyl - 7 - [2 - (1-methyl-5 - nitro - 2 - pyrrolyl)vinyl] - 4 - oxo - 1,8 - naphthyridine - 3 - carboxylate, a light-sensitive yellow solid, M.P.>300° C.

Example 320

1,4 - dihydro - 1 - methyl - 7 - [2 - (1 - methyl-5-nitro - 2 - pyrrolyl)vinyl] - 4 - oxo - 1,8 - naphthyridine-3 - carboxylic acid, M.P.>300° C., 8.1 g., was prepared as in Example 307 using 9.9 g. of ethyl 1,4 - dihydro-1 - methyl - 7 - [2 - (1 - methyl - 5 - nitro - 2 - pyrrolyl)vinyl]- 4 - oxo - 1,8 - naphthyridine - 3 - carboxylate, 160 ml. of acetic acid, 60 ml. of water and 2 ml. of concentrated hydrochloric acid.

Example 321

Ethyl 1 - (2,2,2 - trifluoroethyl) - 1,4 - dihydro - 7-methyl - 4 - oxo - 1,8 - naphthyridine - 3 - carboxylate—To a solution containing 4.6 g. of ethyl 4 - hydroxy - 7-methyl - 1,8 - naphthyridine - 3 - carboxylate in 50 ml. of hexamethylphosphoramide was added 1.2 g. of sodium hydride and the mixture was stirred until foaming stopped. Next, 12.6 g. of 2,2,2 - trifluoroethyl iodide was added and the reaction mixture was heated with stirring on a steam bath for two hours. The mixture was chilled and then poured into 500 ml. of water and the resulting mixture cooled well in an ice bath. The separated solid was collected, washed with water, dried in vacuo at 60° C., washed with n-pentane and air-dried to yield 3.9 g. of ethyl 1 - (2,2,2 - trifluoroethyl) - 1,4 - dihydro - 7-methyl-4 - oxo - 1,8 - naphthyridine - 3 - carboxylate, M.P. 168–169° C.

Example 322

1 - (2,2,2 - trifluoroethyl) - 1,4 - dihydro - 7 - methyl-4 - oxo - 1,8 - naphthyridine - 3 - carboxylic acid—A mixture containing 1.3 g. of ethyl 1-(2,2,2-trifluoroethyl)-1,4 - dihydro - 7 - methyl - 4 - oxo - 1,8-naphthyridine-3 - carboxylate and 10 ml. of 3 N hydrochloric acid was heated on a steam bath with stirring for eighteen hours. The reaction mixture was cooled in an ice beath and the separated product was collected, washed with a small quantity of fresh water, recrystallized from 50 ml. of absolute ethanol using decolorizing charcoal and dried overnight (about fifteen hours) in vacuo at 60° C. to yield 1.0 g. of 1-(2,2,2-trifluoroethyl) - 1,4 - dihydro-7 - methyl - 4 - oxo - 1,8 - naphthyridine-3-carboxylic acid, M.P. 219–220° C.

Other compounds encompassed by our invention and prepared by hereinabove described procedures are the following:

323. Ethyl 7-benzyl - 1 - cyanomethyl-1,4-dihydro-4-oxo-1,8-naphthyridine-3-carboxylate, M.P. 215–217° C.

324. 7-benzyl - 1,4 - dihydro-1-(2-hydroxyethyl)-4-oxo-1,8-naphthyridine-3-carboxylic acid, M.P. 172–174° C.

325. 7-benzyl - 1,4 - dihydro-4-oxo-1-(2-phenylethyl)-1,8-naphthyridine-3-carboxylic acid, M.P. 189–190° C.

326. 7-(4-benzyloxyphenoxy) - 1 - ethyl-1,4-dihydro-4-oxo-1,8-naphthyridine - 3 - carboxylic acid, M.P. 187.0–188.0° C. (corr.).

327. 7-benzyl - 1 - (2-diethylaminoethyl)-1,4-dihydro-4 - oxo-1,8-naphthyridine-3-carboxylic acid, M.P. 134.5–135° C.

328. 7-(2 - carboxybenzoyl) - 1 - ethyl-1,4-dihydro-4-oxo-1,8-naphthyridine - 3 - carboxylic acid, M.P. 258–260° C.

329. 7-(di-n-butylaminomethoxy) - 1 - ethyl-1,4-dihydro-4-oxo-1,8-naphthyridine-3-carboxylic acid, M.P. 189–192° C.

330. 7-benzyl-1,4-dihydro-4-oxo - 1 - (2 - propynyl)1,8-naphthyridine-3-carboxylic acid, M.P. 154–155° C.

331. 7-benzyl-1,4-dihydro-1-methoxymethyl - 4 - oxo-1,8-naphthyridine-3-carboxylic acid, M.P. 132.0–134.0° C. (corr.).

332. 7-benzyl-1-ethyl-1,4-dihydro - 4 - oxo-1,8-naphthyridine-3-carbohydroxamic acid, M.P. 197–200° C.

333. 7-benzyl - 1 - ethyl-1,4-dihydro-4-oxo-1,8-naphthyridine-3-carboxylic acid hydrazide, M.P. 178–180° C.

334. 1-ethyl-1,4-dihydro - 7 - hydroxy-6-nitro-4-oxo-1,8-naphthyridine-3-carboxylic acid, M.P. 264–266° C. with decomposition.

335. 7-cyanomethyl - 1 - ethyl-1,4-dihydro-4-oxo-1,8-naphthyridine-3-carboxylic acid, M.P. 208–209° C.

336. 7-(α-cyanofurfuryl) - 1 - ethyl-1,4-dihydro-4-oxo-1,8-naphthyridine-3-carboxylic acid, M.P. 165–166.5° C.

337. 7-(carboxymethyl) - 1 - ethyl-1,4-dihydro-4-oxo-1,8-naphthyridine-3-carboxylic acid, M.P. 224–225° C. with decomposition.

338. 1-ethyl-1,4-dihydro - 7 - (4-nitrostyryl)-4-oxo-1,8-naphthyridine-3-carboxylic acid, M.P. 343–344° C. with decomposition.

339. Ethyl 1-ethyl-1,4-dihydro - 7 - (4 - nitrostyryl)-4-oxo-1,8-naphthyridine-3-carboxylate, M.P. 286–287° C.

340. Methyl 7-[1-cyano - 1 - (ethoxycarbonyl)ethyl]-1-ethyl-1,4-dihydro - 4 - oxo-1,8-naphthyridine-3-carboxylate, M.P. 150.5–152.0° C.

341. Methyl 7-(1-cyano - 1 - methylethyl)-1-ethyl-1,4-dihydro-4-oxo-1,8-naphthyridine - 3 - carboxylate, M.P. 138–140° C.

342. 7-(α-cyanoethyl) - 1 - ethyl-1,4-dihydro-4-oxo-1,8-naphthyridine-3-carboxylic acid, M.P. 187.5–189° C.

343. 1-ethyl-1,4-dihydro - 7 - isopropyl - 1,8 - naphthyridine-3-carboxylic acid, M.P. 155–156° C.

344. 7-methyl-1,4-dihydro - 1 - methylmercaptomethyl-4-oxo-1,8-naphthyridine - 3 - carboxylic acid, M.P. 207–208° C.

345. 1-methyl-1,4-dihydro - 4 - oxo-1,8-naphthyridine-3,7-dicarboxylic acid, M.P. 297–298° C. with decomposition.

346. 7-formyl-1,4-dihydro - 4 - oxo-1,8-naphthyridine-3-carboxylci acid, M.P. 268–270° C. with decomposition.

347. 1-ethyl-1,4-dihydro - 4 - oxo-7-(succinoxymethyl)-1,8-naphthyridine-3-carboxylic acid disodium salt, M.P. 260° C. with decomposition.

348. Potassium 1 - ethyl-1,4-dihydro-7-hydroxymethyl-4-oxo-1,8-naphthyridine-3-carboxylate, M.P. 305° C.

349. 4-sulfamoylbenzylammonium 1-ethyl - 1,4 - dihydro-7-methyl-4-oxo-1,8-naphthyridine - 3 - carboxylate, M.P. 177.0° C. (corr.).

350. Sodium 7-benzyl-1-ethyl-1,4-dihydro - 4 - oxo-1,8-naphthyridine - 3 - carboxylate, M.P. 193.0–194.0° C. (corr.).

351. 1-ethyl-1,4-dihydro - 7 - (1-naphthyloxy)-4-oxo-1,8 - naphthyridine-3-carboxylic acid, M.P. 183.8–184.0° C. (corr.).

352. 1-ethyl-1,4-dihydro - 7 - (4 - nitrobenzyl)-4-oxo-1,8 - naphthyridine-3-carboxylic acid, M.P. 194.0–207.0° C. (corr.).

353. 1-ethyl-1,4-dihydro - 7 - (2,3-dimethoxyphenoxy)-4-oxo-1,8 - naphthyridine-3-carboxylic acid, M.P. 179.8–181.2° C. (corr.).

354. 7-(4-acetamidophenoxy) - 1 - ethyl-1,4-dihydro-4-oxo,1,8-naphthyridine - 3 - carboxylic acid, M.P. 263.0–264.4° C. (corr.).

355. 1-ethyl-1,4-dihydro - 7 - (3-methoxyphenoxy)-4-oxo-1,8-naphthyridine - 3 - carboxylic acid, M.P. 187.6–188.8° C. (corr.).

356. 7-(α-cyano - 4 - nitrobenzyl)-1-ethyl-1,4-dihydro-4-oxo-1,8-naphthyridine-3-carboxylic acid, M.P. 223.0–223.4° C., (corr.). with decomposition.

357. 1-ethyl-1,4-dihydro - 7 - (4-methoxybenzyl)-4-oxo-1,8-naphthyridine - 3 - carboxylic acid, M.P. 166.0–169.0° C. (corr.).

358. 1-ethyl-1,4-dihydro - 4 - oxo-7-(3-pyridyloxy)-1,8-naphthyridine-3-carboxylic acid, M.P. 180.–182.0° C. (corr.).

359. 7-(4-chlorobenzyl) - 1 - ethyl-1,4-dihydro-4-oxo-1,8-naphthyridine-3-carboxylic acid, M.P. 180.0–182.0° C. (corr.).

360. 7-(α-cyano-α,α-diphenylmethyl) - 1 - ethyl-1,4-dihydro - 4 - oxo-1,8-naphthyridine-3-carboxylic acid, M.P. 226.0–229.0° C. (corr.).

361. 7-(4-aminobenzyl) - 1 - ethyl-1,4-dihydro-4-oxo-1,8-naphthyridine-3-carboxylic acid, M.P. 161.4–163.0° C. (corr.).

362. 7-benzyloxy - 1 - ethyl - 1,4 - dihydro-4-oxo-1,8-naphthyridine-3-carboxylic acid, M.P. 228.8–231.0° C. (corr.).

363. 1-ethyl-1,4-dihydro - 7 - (4-methylbenzyl)-4-oxo-1,8-naphthyridine-3-carboxylic acid, M.P. 177.0–179.0° C. (corr.).

364. 7-(4-aminophenoxy) - 1 - ethyl-1,4-dihydro-4-oxo-1,8-naphthyridine-3-carboxylic acid, M.P. 267.0–268.2° C. (corr.).

365. 1-ethyl-1,4-dihydro - 4 - oxo-7-(3-pyridylmethyl)-1,8-naphthyridine-3-carboxylic acid, M.P. 205.0–206.0° C. (corr.).

366. 7 - benzyl-1,4-dihydro-1-isopropyl-4-oxo-1,8-naphthyridine-3-carboxylic acid, M.P. 206–208° C.

367. 1 - ethyl-1,4-dihydro-7-(1-naphthylmethyl)-4-oxo-1,8-naphthyridine-3-carboxylic acid, M.P. 189.0–190.0° C. (corr.).

368. t - Butoxycarbonylmethyl 1 - ethyl - 1,4-dihydro-7-methyl - 4 - oxo - 1,8 - naphthyridine - 3-carboxylate, M.P. 151.0–152.0° C. (corr.).

369. 7 - (4-acetamidophenylmercapto)-1-ethyl-1,4-dihydro - 4 - oxo - 1,8 - naphthyridine - 3 - carboxylic acid, M.P. 253.0–255.0° C. (corr.).

370. 7-(4-aminophenylmercapto)-1-ethyl-1,4-dihydro-4-oxo - 1,8 - naphthyridine - 3 - carboxylic acid, M.P. 223.0–224.4° C. (corr.).

371. 1 - ethyl-1,4-dihydro-4-oxo-7-(4-methylphenylmercapto)-1,8-naphthyridine-3-carboxylic acid, M.P. 176.0–178.0° C. (corr.).

372. 7-(α-cyano-3,4-dimethoxybenzyl)-1-ethyl-1,4-dihydro - 4 - oxo - 1,8 - naphthyridine - 3 - carboxylic acid, M.P. 196.0–198.6° C. (corr.).

373. 1 - ethyl-1,4-dihydro-7-(3,4-dimethyloxybenzyl)-4-oxo - 1,8 - naphthyridine - 3 - carboxylic acid, M.P. 144.0–146.0° C. (corr.)

374. 1 - ethyl - 1,4 - dihydro - 7-(4-methylmercaptophenoxy) - 4 - oxo-1,8-naphthyridine-3-carboxylic acid, M.P. 221.0–222.8° C. (corr.).

375. 7 - (4-chlorophenylmercapto)-1-ethyl-1,4-dihydro-4-oxo-1,8-naphthyridine-3-carboxylic acid, M.P. 191.0–199.0° C. (corr.).

376. 1 - ethyl - 7-(4-fluorophenoxy)-1,4-dihydro-4-oxo-1,8-naphthyridine-3-carboxylic acid, M.P. 218.0–220.0° C. (corr.).

377. 1 - ethyl - 1,4 - dihydro-7-(2-naphthylmercapto)-4-oxo - 1,8 - naphthyridine - 3 - carboxylic acid, M.P. 199.6–200.0° C. (corr.).

378. 1-ethyl-1,4-dihydro-7-(2-methoxyphenoxy)-4-oxo-1,8-naphthyridine-3-carboxylic acid, M.P. 168.9–171.0° C. (corr.).

379. 1-ethyl-1,4-dihydro-7-(4-dimethylaminophenoxy)-4 - oxo - 1,8 - naphthyridine-3-carboxylic acid, M.P. 231.6–233.6° C. (corr.).

380. 7 - (3 - aminophenoxy)-1-ethyl-1,4-dihydro-4-oxo-1,8-naphthyridine-3-carboxylic acid, M.P. 256.0–260.0° C. (corr.).

381. 7 - (3 - acetamidophenoxy)-1-ethyl-1,4-dihydro-4-oxo - 1,8 - naphthyridine - 3 - carboxylic acid, M.P. 223.0–225.8° C. (corr.).

382. 1 - ethyl - 1,4-dihydro-4-oxo-7-phenylsulfonyl-1,8-naphthyridine - 3 - carboxylic acid, M.P. 226.0–227.0° C. (corr.).

283. 1 - ethyl-1,4-dihydro-4-oxo-7-(2-thienyl)-1,8-naphthyridine-3-carboxylic acid, M.P. 160.0–163.0° C. (corr.).

384. 1 - ethyl - 1,4-dihydro-7-(4-hydroxyphenoxy)-1,8-naphthyridine - 3 - carboxylic acid, M.P. 267.8–269.8° C. (corr.).

385. 6 - bromo - 7-chloro-1-ethyl-1,4-dihydro-4-oxo-1,8-naphthyridine - 3 - carboxylic acid, M.P. 277.0–279.0° C. (corr.) with decomposition.

386. 7-(2-carboxy-α-cyanobenzyl)-1-ethyl-1,4-dihydro-4-oxo-1,8-naphthyridine-3-carboxylic acid, M.P.>300° C.

387. 6-bromo-1-ethyl-1,4-dihydro-7-hydroxy-4-oxo-1,8-naphthyridine-3-carboxylic acid, M.P.>300° C.

388. 7-(4-chloro-α-cyanobenzyl)-1-ethyl-1,4-dihydro-4-oxo - 1,8 - naphthyridine - 3 - carboxylic acid, M.P. 200.6–201.0° C. (corr.).

389. 7 - [α - cyano-α-(ethoxycarbonyl)methyl]-1-ethyl-1,4 - dihydro - 4 - oxo-1,8-naphthyridine-3-carboxylic acid, M.P. 237.0–238.0° C. (corr.) with decomposition.

390. 7 - (2 - carboxybenzyl)-1-ethyl-1,4-dihydro-4-oxo-1,8-naphthyridine-3-carboxylic acid, M.P. 218.0–219.4° C. (corr.).

391. 7 - (dicyanomethyl)-1-ethyl-1,4-dihydro-4-oxo-1,8-naphthyridine-3-carboxylic acid dimethyl formamide, M.P. 253.0–255.0° C. (corr.) with decomposition.

392. 6-bromo-7-(α-cyanobenzyl)-1-ethyl-1,4-dihydro-4-oxo - 1,8 - naphthyridine - 3 - carboxylic acid, M.P. 235.0–237.0° C. (corr.).

393. 1-ethyl-7-formyl-1,4-dihydro-4-oxo-1,8-naphthyridine-3-carboxylic acid, M.P. 259.4–261.4° C. (corr.).

394. 1,7-dibenzyl-1,4-dihydro-4-oxo-1,8-naphthyridine-3-carboxylic acid, M.P. 198.0–200.2° C. (corr.).

395. 1 - allyl-7-benzyl-1,4-dihydro-4-oxo-1,8-naphthyridine-3-carboxylic acid, M.P. 133.0–143.0° C. (corr.).

396. 1-methoxymethyl-1,4-dihydro-7-methyl-4-oxo-1,8-naphthyridine - 3 - carboxylic acid, M.P. 198.0–201.0° C. (corr.).

397. 7-benzyl-1-n-butyl-1,4-dihydro-4-oxo-1,8-naphthyridine-3-carboxylic acid, M.P. 155.8–158.0° C. (corr.).

398. 7 - benzyl - 1,4-dihydro-1-(1-methylheptyl)-4-oxo-1,8-naphthyridine-3-carboxylic acid, M.P. 141.0–143.0° C. (corr.).

399. 7-(diphenylmethyl)-1-ethyl-1,4-dihydro-4-oxo-1,8-naphthyridine - 3 - carboxylic acid, M.P. 129.6–131.0° C. (corr.).

400. 7 - benzyl-1-n-dodecyl-1,4-dihydro-4-oxo-1,8-naphthyridine-3-carboxylic acid, M.P. 114.0–115.6° C. (corr.).

401. 7 - benzyl - 6-bromo-1-ethyl-1,4-dihydro-4-oxo-1,8-naphthyridine - 3 - carboxylic acid, M.P. 229.8–232.6° C. (corr.).

402. 7 - benzyl - 1,4-dihydro-4-oxo-1-n-pentyl-1,8-naphthyridine-3-carboxylic acid, M.P. 134.0–136.6° C. (corr.).

403. 7 - benzyl-1-carboxymethyl-1,4-dihydro-4-oxo-1,8-naphthyridine-3-carboxylic acid, M.P. 125–126° C.

404. 7 - [1-cyano-2-(5-nitro-2-furyl)vinyl]-1-ethyl-1,4-dihydro - 4-oxo-1,8-naphthyridine-3-carboxylic acid, M.P. 340–344° C. with decomposition.

405. 7 - (1 - cyano - 2-furylvinyl)-1-ethyl-1,4-dihydro-4-oxo-1,8-naphthyridine-3-carboxylic acid, M.P. 281–283° C.

406. 1-methyl - 1,4-dihydro-7[2-(5-nitro-2-furyl)-1-phenylvinyl]-4-oxo-1,8-naphthyridine-3-carboxylic acid, M.P. 287–288° C. with decomposition, from ethyl 4-hydroxy-7-[2 - (5-nitro-2-furyl)-1-phenylvinyl]-1,8-naphthyridine-3-carboxylate, M.P. 275–276° C. with decomposition.

407. 1-methyl-1,4-dihydro-5,7-bis[2-(5-nitro-2-furyl)vinyl]-4-oxo-1,8-naphthyridine-3-carboxylic acid, M.P. 335° C. with decomposition.

408. Ethyl 1,4-dihydro-1-methyl-7-[4-(5-nitro-2-furyl)-1,3 - butadienyl] - 4 - oxo - 1,8-naphthyridine-3-carboxylate, M.P. 250–251° C., with decomposition, from ethyl 4 - hydroxy - 7 - [2-(5-nitro-2-furyl)-1,3-butadienyl]-1,8-naphthyridine-3-carboxylate, M.P.>300° C.

409. 1,4 - dihydro - 1-methyl - 7-[4-(5-nitro-2-furyl)-1,3-butadienyl] - 4 - oxo-1,8-naphthyridine-3-carboxylic acid, M.P.>300° C.

Other compounds encompassed by our invention and prepared by the procedures described hereinabove are the following:

410. 7 - n - butylaminomethoxy-1-ethyl-1,4-dihydro-4-oxo-1,8-naphthyridine-3-carboxylic acid.

411. 1 - ethyl - 1,4 - dihydro - 4-oxo-7-(piperidinomethoxy)-1,8-naphthyridine-3-carboxylic acid.

412. 1 - ethyl - 1,4 - dihydro - 7-[2-(5-nitro-2-pyridyl)vinyl]-4-oxo-1,8-naphthyridine-3-carboxylic acid.

413. 7 - [2 - (5 - chloro-2-pyridyl)vinyl]-1-ethyl-1,4-dihydro-4-oxo-1,8-naphthyridine-3-carboxylic acid.

414. 1 - ethyl - 1,4 - dihydro-7-[2-(5-methoxy-2-pyridyl)vinyl]-4-oxo-1,8naphthyridine-3-carboxylic acid.

415. 7 - [2 - (5 - acetamido-2-pyridyl)vinyl]-1-ethyl-1,4-dihydro-4-oxo-1,8-naphthyridine-3-carboxylic acid.

416. 1 - ethyl - 1,4 - dihydro-4-oxo-7-phenyl-1,8-naphthyridine-3-carboxylic acid.

417. 1 - ethyl - 1,4 - dihydro-4-oxo-7-(4-pyridyl)-1,8-naphthyridine-3-carboxylic acid.

418. Ethyl 7-[2 - chloro - 2-(2-pyridyl)vinyl-1,4-dihydro-4-oxo-1,8-naphthyridine-3-carboxylate.

419. Ethyl 1 ethyl - 1,4 - dihydro-4-oxo-7-[2-(2-pyridyl)vinyl]-1,8-naphthyridine-3-carboxylate.

420. 1 - ethyl - 1,4 - dihydro-7-[2-(5-methyl-2-thienyl)vinyl]-4-oxo-1,8-naphthyridine-3-carboxylic acid.

421. 1 - ethyl - 1,4 - dihydro-7-[2-(6-nitro-4-quinolyl)vinyl]-4-oxo-1,8-naphthyridine-3-carboxylic acid.

422. 1 - ethyl - 1,4 - dihydro-7-[2-(6-methoxy-2-quinolyl)vinyl]-4-oxo-1,8-naphthyridine-3-carboxylic acid.

423. 1 - ethyl - 1,4 - dihydro - 7 - nicotinyl-4-oxo-1,8-naphthyridine-3-carboxylic acid.

424. Ethyl 1 -ethyl - 1,4 - dihydro - 4-oxo-7-(phenoxymethyl)-1,8-naphthyridine-3-carboxylate.

425. Ethyl 1 - ethyl - 1,4 - dihydro-4-oxo-7-(2-pyridyloxymethyl)-1,8-naphthyridine-3-carboxylate.

426. 7 - (α - cyano - 2-pyridylmethyl)-1-ethyl-1,4-dihydro-4-oxo-1,8-naphthyridine-3-carboxylic acid.

427. 1 - ethyl - 1,4 - dihydro - 7-(α-hydroxy-2-pyridylmethyl)-4-oxo-1,8-naphthyridine-3-carboxylic acid.

428. 1 - ethyl - 1,4 - dihydro - 7-[2-(5-nitro-2-furyl)ethoxy]-4-oxo-1,8-naphthyridine-3-carboxylic acid.

429. 1 - ethyl - 1,4-dihydro-4-oxo-7-[2-(4-pyridyl)ethoxy]-1,8-naphthyridine-3-carboxylic acid.

430. 7 - [1 - cyano-2-(5-nitro-2-pyridyl)vinyl]-1-ethyl-1,4-dihydro-4-oxo-1,8-naphthyridine-3-carboxylic acid.

431. 1 - ethyl - 1,4-dihydro-7-(5-nitro-2-furylsulfonyl)-4-oxo-1,8-naphthyridine-3-carboxylic acid.

432. 1 - ethyl - 1,4 - dihydro-4-oxo-7-(3-pyridylsulfonyl)-1,8-naphthyridine-3-carboxylic acid.

433. 1 - ethyl - 1,4 - dihydro - 7 - [α,α-bis(5-methyl-2-furyl)methyl]-4-oxo-1,8-naphthyridine-3-carboxylic acid.

434. 1 - ethyl - 1,4-dihydro-4-oxo-7-[α,α-bis(2-pyridyl)-methyl]-1,8-naphthyridine-3-carboxylic acid.

435. 7 - [α - cyano-α,α-bis(5-methyl-2-furyl)methyl]-1-ethyl - 1,4 - dihydro-4-oxo-1,8-naphthyridine-3-carboxylic acid.

436. 1 - ethyl - 1,4 - dihydro-4-oxo-7-trifluoromethyl-1,8-naphthyridine-3-carboxylic acid.

437. Ethyl 1 - (2,2,2 - trichloroethyl) - 1,4 - dihydro-7-methyl-4-oxo-1,8-naphthyridine-3-carboxylate.

438. 1 - (2,2,2 - trichloroethyl)-1,4-dihydro-7-methyl-4-oxo-1,8-naphthyridine-3-carboxylic acid.

439. 1 - ethyl - 1,4 - dihydro-7-[2-(4-methyl-1-naphthyl)vinyl-4-oxo-1,8-naphthyridine-3-carboxylic acid.

440. 7 - [2 - (4-biphenylyl)vinyl]-1-ethyl-1,4-dihydro-4-oxo-1,8-naphthyridine-3-carboxylic acid.

441. 7 - [2 - (4-ethoxy-2-pyrimidyl)vinyl]-1-ethyl-1,4-dihydro-4-oxo-1,8-naphthyridine-3-carboxylic acid.

442. 1 - ethyl - 1,4 - dihydro-7-[2-(4-methyl-2-thiazolyl)-vinyl]-4-oxo-1,8-naphthyridine-3-carboxylic acid.

443. 1 - ethyl - 7 - [2-(4-ethylamino-2-triazinyl)vinyl]-1,4-dihydro-4-oxo-1,8-naphthyridine-3-carboxylic acid.

444. 7 - [2 - (5 - carbethoxy-2-thienyl)vinyl]-1-ethyl-1,4-dihydro-4-oxo-1,8-naphthyridine-3-carboxylic acid.

445. 1 - ethyl - 1,4 - dihydro-7-[2-(5-nitro-2-oxazolyl)vinyl]-4-oxo-1,8-naphthyridine-3-carboxylic acid.

446. 1 - ethyl - 1,4 - dihydro-7-[2-(4,6-dimethyl-2-pyridyl)vinyl]-4-oxo-1,8-naphthyridine-3-carboxylic acid.

447. 7 - [2 - (5 - n - butylmercapto-2-pyridyl)vinyl]-1-ethyl - 1,4 - dihydro-4-oxo-1,8-naphthyridine-3-carboxylic acid.

448. 1 - ethyl - 7 - [2-(5-ethylsulfinyl-2-pyridyl)vinyl]-1,4-dihydro-4-oxo-1,8-naphthyridine-3-carboxylic acid.

449. 1 - ethyl - 7 - [2-(5-ethylsulfonyl-2-pyridyl)vinyl]-1,4-dihydro-4-oxo-1,8-naphthyridine-3-carboxylic acid.

450. 7 - [2 - (3,5-dibromo-2-pyridyl)vinyl]-1-ethyl-1,4-dihydro-4-oxo-1,8-naphthyridine-3-carboxylic acid.

451. 7 - [2 - (5-n-butylamino-2-pyridyl)vinyl]-1-ethyl-1,4-dihydro-4-oxo-1,8-naphthyridine-3-carboxylic acid.

452. 1 - ethyl - 1,4-dihydro-7-[2-(6-dimethylamino-2-pyridyl)vinyl]-4-oxo-1,8-naphthyridine-3-carboxylic acid.

453. 1 - ethyl - 1,4-dihydro-7-[2-(2-methyl-3-pyridyl)-vinyl]-4-oxo-1,8-naphthyridine-3-carboxylic acid.

454. 7 - [2 - (5-amino-2-pyridyl)vinyl]-1-ethyl-1,4-dihydro-4-oxo-1,8-naphthyridine-3-carboxylic acid.

455. 7 - [2-(5-trichloromethyl-2-pyridyl)vinyl]-1-ethyl-1,4-dihydro-4-oxo-1,8-naphthyridine-3-carboxylic acid.

456. 1 - ethyl - 1,4-dihydro-4-oxo-7-[2-(5-phenoxy-2-pyridyl)vinyl]-1,8-naphthyridine-3-carboxylic acid.

457. 7 - [2 - (5-benzyloxy-2-pyridyl)vinyl]-1-ethyl-1,4-dihydro-4-oxo-1,8-naphthyridine-3-carboxylic acid.

458. 7 - [2-(6-benzoyl-2-pyridyl)vinyl]-1-ethyl-1,4-dihydro-4-oxo-1,8-naphthyridine-3-carboxylic acid.

459. 7 - [2 - (5-acetyl-2-pyridyl)vinyl]-1-ethyl-1,4-dihydro-4-oxo-1,8-naphthyridine-3-carboxylic acid.

460. 1-ethyl 7-{2-[5-(2-diethylaminoethyl)-2-pyridyl]-vinyl} - 1,4-dihydro-4-oxo-1,8-naphthyridine-3-carboxylic acid.

461. 1 - ethyl - 1,4-dihydro-4-oxo-7-{2-[5-(2-n-propylaminoethyl) - 2 - pyridyl]vinyl}-1,2-naphthyridine-3-carboxylic acid.

462. 1 - ethyl - 1,4-dihydro-4-oxo-7-{2-[5-(3-piperidinopropylamino) - 2 - pyridyl]vinyl)-1,8-naphthyridine-3-carboxylic acid.

463. 1 - ethyl - 7 - {2-[5-(4-ethylaminobutylamino)-2-pyridyl]vinyl} - 1,4 - dihydro-4-oxo-1,8-naphthyridine-3-carboxylic acid.

464. 1 - ethyl - 1,4-dihydro-7-[[2-{5-[2-(2,5-dimethylpyrrolidino)ethoxy] - 2 - pyridyl}vinyl]]-4-oxo-1,8-naphthyridine-3-carboxylic acid.

465. 7 - {2 - [5-(3-n-butylaminopropoxy)-2-pyridyl]-vinyl} - 1 - ethyl - 1,4-dihydro-4-oxo-1,8-naphthyridine-3-carboxylic acid.

466. 1 - ethyl-1,4-dihydro-7-[2-(5-hydroxy-3-pyridyl)-vinyl]-4-oxo-1,8-naphthyridine-3-carboxylic acid.

467. 7 - [2-(4-cyano-2-pyridyl)vinyl]-1-ethyl-1,4-dihydro-4-oxo-1,8-naphthyridine-3-carboxylic acid.

468. 7 - [2 - (5-aminomethyl-2-pyridyl)vinyl]-1-ethyl-1,4-dihydro-4-oxo-1,8-naphthyridine-3-carboxylic acid.

469. 7 - [2 - (4-carbamyl-2-pyridyl)vinyl]-1-ethyl-1,4-dihydro-4-oxo-1,8-naphthyridine-3-carboxylic acid.

470. 7 - [2-(4-carboxy-2-pyridyl)vinyl]-1-ethyl-1,4-dihydro-4-oxo-1,8-naphthyridine-3-carboxylic acid.

471. 7 - [2-(4-carbethoxy-2-pyridyl)vinyl]-1-ethyl-1,4-dihydro-4-oxo-1,8-naphthyridine-3-carboxylic acid.

472. 1 - ethyl - 1,4-dihydro-4-oxo-7-[2-(5-phenylmercapto - 2 - pyridyl)vinyl]-1,8-naphthyridine-3-carboxylic acid.

473. 7 - [2 - (6-benzyl-2-pyridyl)vinyl]-1-ethyl-1,4-dihydro-4-oxo-1,8-naphthyridine-3-carboxylic acid.

474. 1 - ethyl - 1,4 - dihydro-7-{2-[5-(4-methoxyphenoxy) - 2 - pyridyl]vinyl}-4-oxo-1,8-naphthyridine-3-carboxylic acid.

475. 1,4 - dihydro - 7 - methyl-4-oxo-1-(2-pyrimidylmethyl)-1,8-naphthyridine-3-carboxylic acid.

476. 1,4 - dihydro - 7 - methyl-1-(2-oxazolylmethyl)-4-oxo-1,8-naphthyridine-3-carboxylic acid.

477. 7 - [2-(4,5-dichloro-2-pyrrolyl)vinyl]-1-ethyl-1,4-dihydro-4-oxo-1,8-naphthyridine-3-carboxylic acid.

478. 7 - [2-(4,5-dichloro-1-methyl-2-pyrrolyl)vinyl]-1-ethyl - 1,4 - dihydro-4-oxo-1,8-naphthyridine-3-carboxylic acid.

479. 7 - [2-(4,5-dibromo-2-pyrrolyl)vinyl]-1-ethyl-1,4-dihydro-4-oxo-1,8-naphthyridine-3-carboxylic acid.

480 7 - [2 - (4,5 - dibromo-1-ethyl-2-pyrrolyl)vinyl]-1-ethyl - 1,4 - dihydro-4-oxo-1,8-naphthyridine-3-carboxylic acid.

481. 1 - ethyl-1,4-dihydro-7-[2-(4,5-diiodo-2-pyrrolyl)-vinyl]-4-oxo-1,8-naphthyridine-3-carboxylic acid.

482. 1 - ethyl-1,4-dihydro-7-[2-(4,5-diiodo-1-methyl-2-pyrrolyl)vinyl] - 4 - oxo - 1,8-naphthyridine-3-carboxylic acid.

483. 1 - ethyl - 1,4 - dihydro-7-[2-(5-nitro-2-thiazolyl)-vinyl]-4-oxo-1,8-naphthyridine-3-carboxylic acid.

484. 1 - ethyl-1,4-dihydro-7-[2-(5-nitro-1-methyl-2-pyrrolyl)vinyl]-4-oxo-1,8-naphthyridine-3-carboxylic acid.

485. 1 - ethyl - 1,4 - dihydro-7-[2-(5-nitro-2-pyrrolyl)-vinyl]-4-oxo-1,8-naphthyridine-3-carboxylic acid.

486. 1 - (2,2,3,3,3 - pentafluoropropyl) - 1,4-dihydro-7-methyl-4-oxo-1,8-naphthyridine-3-carboxylic acid.

487. 1 - ethyl - 1,4-dihydro-4-oxo-7-[2-(2-pyrimidyl)-vinyl]-1,8-naphthyridine-3-carboxylic acid.

488. 1 - ethyl - 1,4 - dihydro-4-oxo-7-[2-(2-thiazolyl)-vinyl]-1,8-naphthyridine-3-carboxylic acid.

489. 1 - ethyl - 1,4-dihydro-7-[2-(2-oxazolyl)vinyl]-4-oxo-1,8-naphthyridine-3-carboxylic acid.

490. 1 - ethyl - 1,4 - dihydro-4-oxo-7-[2-(2-triazinyl)-vinyl]-1,8-naphthyridine-3-carboxylic acid.

491. 1 ethyl - 1,4 - dihydro-4-oxo-7-[2-(4-quinolyl)-vinyl]-1,8-naphthyridine-3-carboxylic acid.

492. 1 - ethyl - 1,4 - dihydro-4-oxo-7-[2-(3-thienyl)-vinyl]-1,8-naphthyridine-3-carboxylic acid.

493. 1 - ethyl-1,4-dihydro-7-[2-(5-hydroxy-2-pyridyl)-vinyl]-4-oxo-1,8-naphthyridine-3-carboxylic acid.

494. 1 - ethyl - 1,4-dihydro-4-oxo-7-(2-pyrimidylmethyl)-1,8-naphthyridine-3-carboxylic acid.

495. 7 - (4 - biphenylyloxy)-1-ethyl-1,4-dihydro-4-oxo-1,8-naphthyridine-3-carboxylic acid.

496. 1 - ethyl-1,4-dihydro-7-(2,6-dimethyl-4-biphenylylmethyl)-4-oxo-1,8-naphthyridine-3-carboxylic acid.

497. 1 - ethyl-1,4-dihydro-4-oxo-7-(2-pyrrolylmethyl)-1,8-naphthyridine-3-carboxylic acid.

498. 1 - ethyl - 1,4-dihydro-7-(1,5-dimethyl-2-pyrrolyloxy)-4-oxo-1,8-naphthyridine-3-carboxylic acid.

499. 1 - ethyl-1,4-dihydro-7-(1-methyl-5-nitro-2-pyrrolylmethyl)-4-oxo-1,8-naphthyridine-3-carboxylic acid.

500. 7 - (4,5 - dibromo-1-methyl-2-pyrrolylamino)-1-ethyl - 1,4 - dihydro-4-oxo-1,8-naphthyridine-3-carboxylic acid.

501. 1 - ethyl-1,4-dihydro-7-(α-hydroxy-2-pyridyl-methyl)-4-oxo-1,8-naphthyridine-3-carboxylic acid.

502. 7 - (α-cyano-2-pyridylmethyl)-1-ethyl-1,4-dihydro-4-oxo-1,8-naphthyridine-3-carboxylic acid.

503. Ethyl 1 - ethyl-1,4-dihydro-7-(4,6-dimethyl-2-pyridyloxy)-4-oxo-1,8-naphthyridine-3-carboxylate.

504. 7 - (5 - ethoxy-2-pyridylmethyl)-1-ethyl-1,4-dihydro-4-oxo-1,8-naphthyridine-3-carboxylic acid.

505. 1 - ethyl-1,4-dihydro-7-(5-methylmercapto-2-pyridylmehtyl)-4-oxo-1,8-naphthyridine-3-carboxylic acid.

506. 1 - ethyl-7-(5-ethylsulfonyl-2-pyridylmethyl)-1,4-dihydro-4-oxo-1,8-naphthyridine-3-carboxylic acid.

507. Ethyl 7-(5-chloro-2-pyridylamino)-1-ethyl-1,4-dihydro-4-oxo-1,8-naphthyridine-3-carboxylate.

508. 1 - ethyl-7-(4-ethylamino-2-triazinylmethyl)-1,4-dihydro-4-oxo-1,8-naphthyridine-3-carboxylic acid.

509. 1 - ethyl-1,4-dihydro-7-(5-nitro-2-oxazolylmethyl)-4-oxo-1,8-naphthyridine-3-carboxylic acid.

510. 1 - ethyl-1,4-dihydro-7-(4-methyl-2-thiazolylmethyl)-4-oxo-1,8-naphthyridine-3-carboxylic acid.

511. 1 - ethyl - 1,4-dihydro-7-(5-nitro-2-furyloxy)-4-oxo-1,8-naphthyridine-3-carboxylic acid.

512. Ethyl 1 - ethyl-1,4-dihydro-7-(5-nitro-2-furylmethyl)-4-oxo-1,8-naphthyridine-3-carboxylate.

513. 1 - ethyl-1,4-dihydro-7-(5-nitro-2-furylamino)-4-oxo-1,8-naphthyridine-3-carboxylic acid.

514. 1 - ethyl-1,4-dihydro-7-(5-nitro-2-furylmercapto)-4-oxo-1,8-naphthyridine-3-carboxylic acid.

515. 1 - ethyl-1,4-dihydro-7-(α-hydroxy-5-nitro-2-furylmethyl)-4-oxo-1,8-naphthyridine-3-carboxylic acid.

516. 7 - (5-acetylamino-2-pyridylmethyl)-1-ethyl-1,4-dihydro-4-oxo-1,8-naphthyridine-3-carboxylic acid.

517. Ethyl 1 - ethyl - 1,4-dihydro-4-oxo-7-(5-trichloromethyl-2-pyridylmethyl)-1,8-naphthyridine-3-carboxylate.

518. 7 - (5-amino-2-pyridylmethyl)-1-ethyl-1,4-dihydro-4-oxo-1,8-naphthyridine-3-carboxylic acid.

519. 1 - ethyl-1,4-dihydro-7-(5-hydroxy-2-pyridylmethyl)-4-oxo-1,8-naphthyridine-3-carboxylic acid.

The actual determination of the numerical anti-bacterial, sedative or stimulatory data definitive for a particular compound is readily obtained by standard test procedures, referred to above, by technicians versed in antibacterial or pharmacological test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

We claim:

1. A compound having the formula

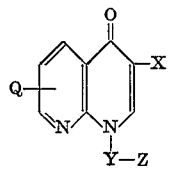

where X is carboxy or salts thereof, carbalkoxy having from two to nineteen carbon a atoms inclusive, carbo-[(lower - tertiary-amino) - (polycarbon-lower-alkoxy)], cyano, carbamyl or aminocarbamyl, Y is alkylene, alkenylene or alkynylene attached to the ring-nitrogen atom through a saturated carbon atom and having up to ten carbon atoms inclusive, Z is hydrogen, hydroxy, halo, trihalomethyl, carboxy, lower-carbalkoxy, cyano, carbamyl, lower - hydrocarbonoxy, lower-secondary-amino, lower-tertiary-amino, lower-cycloalkyl or AR, and Q is hydrogen or from one to four substituents at position 2, 5, 6, and 7 of the naphthyridine nucleus selected from the group consisting of lower-alkyl, lower-alkoxy, lower-alkylmercapto, lower-alkylsulfinyl, lower-alkylsulfonyl, halo, hydroxy, hydroxy-(lower-alkyl), lower-alkoxy-(lower-alkyl), lower-alkylamino, di-(lower-alkyl)-amino, nitro, amino, hydrazino, lower-carboxylic-acylamino, trihalomethyl, lower-alkanoyl, lower - alkanoyloxy, (lower-tertiary-amino)-(polycarbon - lower-alkyl), (lower-secondary-amino)-(polycarbon - lower-alkyl), (lower-tertiary-amino)-(polycarbon-lower-alkylamino), (lower - secondary - amino)-(polycarbon - lower-alkylamino), (lower-tertiary-amino)-(lower - alkyloxy), lower-secondary-amino)-(lower-alkyloxy), AR, AR—O, AR—S, AR—S(O)₂, AR—NH, AR-(lower-alkyl), (AR)₂CH, (AR)₂C(CN), lower-cycloalkyl, lower - cycloalkyloxy, lower-cycloalkylmercapto, lower - cycloalkylamino, lower-cycloalkyl-(lower-alkyl), AR - (lower - alkenyl), AR - (halo-lower-alkenyl), AR-(cyano - lower - alkenyl), 2-AR-1-phenylvinyl, 4-AR-1,3-butadienyl, AR-(lower-alknyl), AR—C(=O),

AR—CH(CN), AR—CH(OH), AR—O—CH₂

AR-(lower-alkoxy), cyano, cyano-(lower-alkyl), (lower-carbalkoxy)-cyano-(lower-alkyl), dicyanomethyl, triazo, amino-(lower - alkyl), (lower - carboxylicacylamino)-(lower-alkyl), carbamyl, carboxy, carboxy-(lower-alkyl) and lower-carbalkoxy, where AR is phenyl, naphthyl, biphenylyl, pyridyl, 2-pyrimidyl, 2-furyl, 2-thiazolyl, quinolyl, 2-oxazolyl, 2-s-triazinyl, thienyl, 2-pyrrolyl, and said groups having from one to three substituents selected from lower-alkyl, lower-alkoxy, lower-alkylmercapto, lower-alkylsulfinyl, lower-alkylsulfonyl, halo, lower-alkylamino, di-(lower-alkyl)-amino, nitro, amino, lower-carboxylic-acylamino, trihalomethyl, phenoxy, benzyloxy, benzoyl, lower-alkanoyl, (lower-tertiary-amino)-(polycarbon-lower-alkyl), (lower-secondary-amino)-(polycarbon-lower-alkyl), (lower-tertiary - amino)-(polycarbon-lower-alkylamino), (lower-secondary - amino)-(polycarbon-lower-alkylamino), (lower-tertiary - amino)-(polycarbon-lower-alkyloxy), (lower-secondary-amino)-(polycarbon-lower-alkyloxy), hydroxy, cyano, aminomethyl, carbamyl, carboxy, lower-carbalkoxy, phenylmercapto, benzyl or 4-methoxyphenoxy; polycarbon-lower-alkyl in each instance is lower-alkylene having from two to six carbon atoms and having its connecting linkages on different carbon atoms; lower-carboxylic-acyl in each instance is lower-alkanoyl, lower-haloalkanoyl, lower-carboxyalkanoyl, (lower-tertiary-amino)-(lower-alkanoyl) or monocarbocyclic-aroyl; lower-tertiary-amino in each instance is di-(lower-alkyl)amino or saturated N-heteromonocyclic radicals having five to six ring atoms selected from 1-piperidyl, 1-pyrrolidyl, 4-morpholinyl, 1-piperazyl or lower-alkylated derivatives thereof; lower-secondary-amino in each instance is mono-(lower-alkyl)amino, benzylamino or benzylamino substituted in the benzene ring by halo, nitro, lower-alkoxy or lower-alkyl; lower-cycloalkyl in each instance is cycloalkyl having from three to eight ring-carbon atoms; lower-carbalkoxy in each instance is carbalkoxy where the alkoxy portion has from one to six carbon atoms; lower-alkyl in each instance has from one to six carbon atoms; and 5,6,7,8-tetrahydro derivatives thereof.

2. A compound of the formula

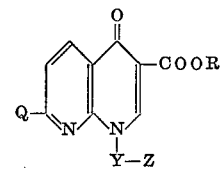

where R is hydrogen or lower-alkyl, Q and Y–Z are each lower-alkyl.

3. A compound of the formula

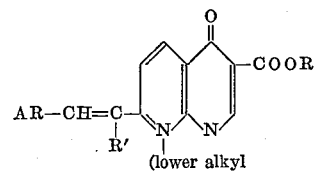

where R is hydrogen or lower-alkyl, R' is hydrogen or alkyl having from one to four carbon atom inclusive, and AR is phenyl, naphthyl, biphenylyl, pyridyl, 2-pyrimidyl, 2-furyl, 2-thiazolyl, quinolyl, 2-oxazolyl, 2-s-triazinyl, thienyl, 2-pyrrolyl, and said groups having from one to three substituents selected from lower-alkyl, lower-alkoxy, lower-alkylmercapto, lower-alkylsulfonyl, halo, lower-alkylamino, di-(lower-alkyl)-amino, nitro, amino, lower-carboxylic-acylamino, trihalomethyl or hydroxy where lower-alkyl in each instance has from one to six carbon atoms and lower-carboxylic-acyl is lower-alkanoyl, lower-haloalkanoyl, lower - carboxyalkanoyl, (lower-tertiary-amino)-(lower-alkanoyl) or monocarbocyclic-aroyl where lower-tertiary-amino in each instance is di-(lower-alkyl)amino or saturated N-heteromonocyclic radicals having five to six ring atoms selected from

79

1-piperidyl, 1-pyrrolidyl, 4-morpholinyl, 1-piperazyl or lower-alkylated derivatives thereof.

4. A compound of the formula

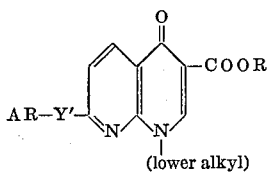

where R is hydrogen or lower-alkyl, Y' is a member selected from $CH_2$, CH(OH), CH(CN), O, S or NH, and AR is phenyl, naphthyl, biphenylyl, pyridyl, 2-pyrimidyl, 2-furyl, 2-thiazolyl, quinolyl, 2-oxazolyl, 2-s-triazinyl, thienyl, 2-pyrrolyl and said groups having from one to three substituents selected from lower-alkyl, lower-alkoxy, lower-alkylmercapto, lower-alkylsulfonyl, halo, lower-alkylamino, di-(lower-alkyl)amino, nitro, amino, lower-carboxylic-acylamino, trihalomethyl or hydroxy, where lower-carboxylic-acyl is lower-alkanoyl, lower-haloalkanoyl, lower - carboxyalkanoyl, (lower-tertiary-amino)-(lower-alkanoyl) or monocarboxylic aroyl where lower-tertiary-amino in each instance is di-(lower-alkyl)-amino or saturated N-heteromonocyclic radicals having five to six ring atoms selected from 1-piperidyl, 1-pyrrolidyl, 4-morpholinyl, 1-piperazyl or lower-alkylated derivatives thereof; or corresponding 5,6,7,8-tetrahydro derivatives thereof or the corresponding compounds where AR—Y' is cyclohexyloxy.

5. A compound of the formula

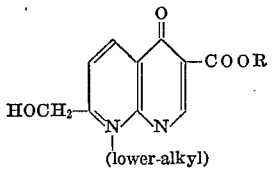

where R is hydrogen or lower alkyl.

6. A compound of the formula

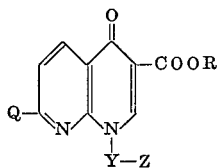

where Q is halo, hydroxy, amino, lower-alkanoylamino or cyano, R is hydrogen or lower-alkyl, and Y—Z is lower-alkyl or lower-alkenyl.

7. A compound according to claim 2 where Q is methyl.

8. A compound according to claim 3 where AR is phenyl and R' is hydrogen.

9. A compound according to claim 4 where AR is phenyl.

10. A compound according to claim 5 where R is hydrogen.

11. A compound according to claim 2 selected from ethyl 1-ethyl-1,4-dihydro-7 - methyl-4-oxo-1,8-naphthyridine-3-carboxylate, 1,4-dihydro-7-methyl-1-n-propyl-4-oxo-1,8-naphthyridine-3-carboxylic acid and 1,7-diethyl-1,4-dihydro-4-oxo-1,8-naphthyridine-3-carboxylic acid.

12. 1-ethyl-1,4-dihydro - 7 - methyl-4-oxo-1,8-naphthyridine-3-carboxylic acid according to claim 2.

80

13. 1,4-dihydro-7-hydroxymethyl - 4 - oxo-1-n-propyl-1,8-naphthyridine-3-carboxylic acid according to claim 5.

14. 1-ethyl - 1,4 - dihydro-7-hydroxymethyl - 4 - oxo-1,8-naphthyridine-3-carboxylic acid according to claim 5.

15. A compound according to claim 7 selected from
1-allyl-1,4-dihydro-7-methyl-4-oxo-1,8-naphthyridine-3-carboxylic acid,
1-ethyl-1,4-dihydro-7-hydroxy-4-oxo-1,8-naphthyridine-3-carboxylic acid,
7-chloro-1-ethyl-1,4-dihydro-4-oxo-1,8-naphthyridine-3-carboxylic acid,
7-amino-1-ethyl-1,4-dihydro-4-oxo-1,8-naphthyridine-3-carboxylic acid,
7-acetylamino-1-ethyl-1,4-dihydro-4-oxo-1,8-naphthyridine-3-carboxylic acid, and
ethyl 7-cyano-1-ethyl-1,4-dihydro-4-oxo-1,8-naphthyridine-3-carboxylate.

16. Ethyl 1-ethyl-1,4-dihydro-4-oxo-7-styryl-1,8-naphthyridine-3-carboxylate according to claim 8.

17. A compound according to claim 4 selected from
ethyl 7-benzyl-1-ethyl-1,4-dihydro-4-oxo-1,8-naphthyridine-3-carboxylate,
7-benzyl-1,4-dihydro-1-methyl-4-oxo-1,8-naphthyridine-3-carboxylic acid,
7-benzyl-1,4-dihydro-4-oxo-1-n-propyl-1,8-naphthyridine-3-carboxylic acid,
7-benzyl-1-ethyl-1,4,5,6,7,8-hexahydro-4-oxo-1,8-naphthyridine-3-carboxylic acid,
1-ethyl-1,4-dihydro-7-(α-hydroxybenzyl)-4-oxo-1,8-naphthyridine-3-carboxylic acid, and
1-(α-cyanobenzyl)-1-ethyl-1,4-dihydro-4-oxo-1,8-naphthyridine-3-carboxylic acid.

18. 7 - benzyl - 1 - ethyl - 1,4 - dihydro - 4 - oxo-1,8-naphthyridine-3-carboxylic acid according to claim 4.

19. A compound according to claim 4 selected from
1-ethyl-1,4-dihydro-4-oxo-7-phenoxy-1,8-naphthyridine-3-carboxylic acid,
1-ethyl-1,4-dihydro-7-(4-methoxyphenoxy)-4-oxo-1,8-naphthyridine-3-carboxylic acid,
1-ethyl-1,4-dihydro-4-oxo-7-phenylmercapto-1,8-naphthyridine-3-carboxylic acid,
7-anilino-1-ethyl-1,4-dihydro-4-oxo-1,8-naphthyridine-3-carboxylic acid and 7-cyclohexyloxy-1-ethyl-1,4-dihydro-4-oxo-1,8-naphthyridine-3-carboxylic acid.

20. The process of preparing a compound according to claim 5 where Y' is CH(CN) and R is hydrogen, which comprises reacting the corresponding 7-halo-1,4-dihydro-1-(lower-alkyl) - 4 - oxo - 1,8 - naphthyridine-3-carboxylic acid with a compound of the formula

AR—$CH_2CN$ in the presence of an acid-acceptor.

21. The process of preparing a compound according to claim 5 where Y' is $CH_2$ and R is hydrogen, which comprises reacting the corresponding 7-[AR—CH(CN)]-1,4-dihydro-1-(lower-alkyl) - 4 - oxo - 1,8 - naphthyridine-3-carboxylic acid prepared according to claim 20 with a strong acid and water.

22. The process according to claim 20 for preparing 7-(α-cyanobenzyl)-1,4-dihydro - 1 - (lower-alkyl)-4-oxo-1,8-naphthyridine-3-carboxylic acid which comprises reacting a 7-chloro-1,4-dihydro-1-(lower-alkyl)-4-oxo-1,8-naphthyridine-3-carboxylic acid with benzyl cyanide in the presence of an acid-acceptor.

23. The process according to claim 21 for preparing 7-benzyl - 1,4 - dihydro - 1 - (lower-alkyl)-4-oxo-1,8-naphthyridine-3-carboxylic acid which comprises reacting a 7-(α-cyanobenzyl)-1,4-dihydro-1-(lower-alkyl)-4-oxo-1,8-naphthyridine-3-carboxylic acid with a strong acid and water.

24. 1 - ethyl - 1,4 - dihydro - 4 - oxo - 7 - phenyl-1,8-naphthyridine-3-carboxylic acid.

25. 1 - ethyl - 1,4 - dihydro - 4 - oxo - 7 - (4 - pyridyl)-1,8-naphthyridine-3-carboxylic acid.

26. A compound of the formula

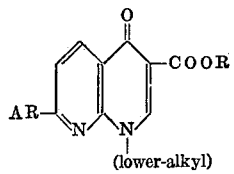

where R is hydrogen or lower-alkyl and AR is phenyl, pyridyl and said groups having from one to three substituents selected from lower-alkyl, lower-alkoxy, lower-alkylmercapto, lower-alkylsulfonyl, halo, lower-alkylamino, di-(lower-alkyl)amino, nitro, amino, trihalomethyl or hydroxy.

References Cited

UNITED STATES PATENTS 3,149,104  9/1964  Lesher et al. _____ 260—240
3,404,153  10/1968  Lesher _____ 260—295.5

OTHER REFERENCES

Buchbinder et al., Antimicrobial Agents and Chemotherapy, pp. 308–317 (1962).

Karrer, Organic Chemistry, 4th English edition, p. 928, Elsevier Pub. Co. (New York), 1950.

JOHN D. RANDOLPH, Primary Examiner

U.S. Cl. X.R.

260—247.1, 247.2, 248, 256.4, 256.5, 268, 287, 294.9, 295.5, 296; 424—248, 250, 251, 258, 266

25. 1 - ethyl - 1,4 - dihydro - 4 - oxo - 7 - (4 - pyridyl)-1,8-naphthyridine-3-carboxylic acid.

26. A compound of the formula

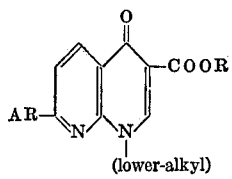

where R is hydrogen or lower-alkyl and AR is phenyl, pyridyl and said groups having from one to three substituents selected from lower-alkyl, lower-alkoxy, lower-alkylmercapto, lower-alkylsulfonyl, halo, lower-alkylamino, di-(lower-alkyl)amino, nitro, amino, trihalomethyl or hydroxy.

References Cited

UNITED STATES PATENTS

| | | | |
|---|---|---|---|
| 3,149,104 | 9/1964 | Lesher et al. | 260—240 |
| 3,404,153 | 10/1968 | Lesher | 260—295.5 |

OTHER REFERENCES

Buchbinder et al., Antimicrobial Agents and Chemotherapy, pp. 308–317 (1962).

Karrer, Organic Chemistry, 4th English edition, p. 928, Elsevier Pub. Co. (New York), 1950.

JOHN D. RANDOLPH, Primary Examiner

U.S. Cl. X.R.

260—247.1, 247.2, 248, 256.4, 256.5, 268, 287, 294.9, 295.5, 296; 424—248, 250, 251, 258, 266

PO-1050
(5/69)

UNITED STATES PATENT OFFICE
CERTIFICATE OF CORRECTION

Patent No. 3,590,036    Dated  June 29, 1971

Inventor(s)    Lesher and Gruett

It is certified that error appears in the above-identified patent and that said Letters Patent are hereby corrected as shown below:

The title should read --1,4-DIHYDRO-4-OXO-1,8-NAPHTHYRIDINE-3-CARBOXYLIC ACIDS, THEIR DERIVATIVES AND PREPARATION THEREOF--. Column 1, line 6, after "12061" insert --, assignors to Sterling Drug Inc., New York, N.Y. --, Assignment recorded USPO Nov. 18, 1968, Reel 2432, frames 359-361; lines 28-29, "Ser. No. 399,333, and now abandoned, filed Sept. 25, 1964," should read --Ser. No. 399,333, filed Sept. 25, 1964 and now abandoned, --. Column 2, bonds left out of Formula I:

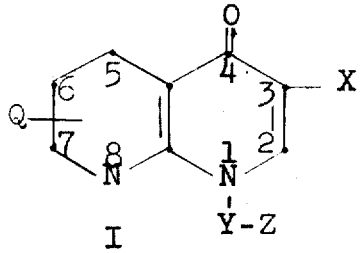    should read    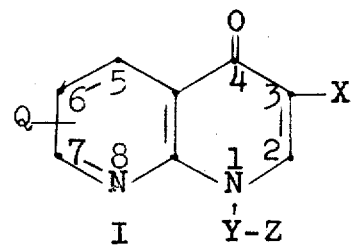

Column 2, line 43, "-cycloalky-" should read -- -cycloalkyl- --; line 46, "-alkynyl" should read -- -alkynyl) --; line 49, "triazo-" should read -- triazo, --. Column 3, line 5, "2-btuyl" should read -- 2-butyl --; line 19, "lower-carbaloxy" should read -- lower-carbalkoxy --; line 25, "-arbalkoxy" should read -- -carbalkoxy --; line 32, "pheny" should read -- phenyl --; line 35, "vinyl," should read -- vinyl), --; line 53, "argyl" should read -- aryl --; line 65-66, "foregoing, lower-alkylmercapto," should read -- foregoing, lower-alkyl, lower-alkoxy, lower-alkylmercapto, --; line 73, "tetiary" should read -- tertiary --. Column 4, line 2, "lower-" should read -- (lower- --. Column 5, line 6, ")CH$_3$)" should read -- (CH$_3$) --; line 42, "amnio" should read --amino--. Column 6, line 4, "becausee" should read -- because --. Column 7, line 18, "potassiom" should read --potassium--. Column 9, line 67, "free form" should read -- free base form --. Column 10, line 11, "-enesufonate" should read -- -enesulfonate --; line 34,

UNITED STATES PATENT OFFICE
CERTIFICATE OF CORRECTION page 2

Patent No. 3,590,036           Dated June 29, 1971

Inventor(s) Lesher and Gruett

It is certified that error appears in the above-identified patent and that said Letters Patent are hereby corrected as shown below:

"Colstridium" should read -- Clostridium --. Column 12, line 30, "values given" should read -- values (given --. Column 14, line 61, "4-6" should read -- 4,6 --. Column 17, line 63, "n-Butyl" should read -- Ethyl --. Column 18, line 28, "cycloehxane" should read -- cyclohexane --. Column 19, line 67, "1,4,-" should read -- 1,4- --. Column 20, line 7, "1-2-" should read -- 1-(2- --. Column 22, line 53, "1 (2-" should read -- 1-(2- --; line 60, "1,2-butenyl)" should read -- 1-(2-butenyl) --. Column 23, line 72, "dihydri" should read -- dihydro --. Column 24, line 36, "1--ethyl" should read -- 1-ethyl --; line 53, "N_4" should read -- N_2 --; line 57, "dihydro-n-propyl" should read -- dihydro-1-n-propyl --; line 74, "4-oxo-n-propyl" should read -- 4-oxo-1-n-propyl --. Column 26, line 18, "thep roduct" should read -- the product --. Column 33, line 22, "N, 5.79" should read -- H, 5.79 --; line 26, "pentaylamino" should read -- pentylamino --; line 75, "1968" should read -- 19.68, and "1967" should read -- 19.67 --. Column 34, line 62, "1(3" should read -- 1-(3 --. Column 35, line 40, "4-biphenylmethyl" should read -- 4-biphenylylmethyl --; line 63, "1(2-" should read -- 1-(2- --. Column 36, line 21, "acetic and" should read -- acetic acid and --. Column 37, line 18, "dimethylaminobutyl" should read -- diethylaminobutyl --. Column 40, line 43, "61,63" should read -- 61.63 --. Column 41, line 48, "397.6" should read -- 297.6 --. Column 42, line 8, "18" should read -- 1,8 --; line 57, "Anaysis." should read -- Analysis. --. Column 43, line 49, "or" should read -- of --. Column 46, lines 20, 31, 35, "dihydro-hydroxymethyl" should read -- dihydro-7-hydroxymethyl --. Column 47, lines 48-49, "naphthyridine-(" should read -- naphthyridine-3-( --. Column 48, line 29, "liqud" should read -- liquid --; line 44, "wth" should read -- with --; line 52, "triromomethyl" should read -- tribromomethyl --. Column 49, line 54, "carboxyilc" should read -- carboxylic --. Column 50, line 35, "S" should read -- C --; line 69, "ethly" should read -- ethyl --. Column 51, line 16, "270.2 C." should read -- 270.2°C. --; line 32, "65 C." should read -- 65°C. --. Column 53, lines 6 and 22,

UNITED STATES PATENT OFFICE
CERTIFICATE OF CORRECTION page 3

Patent No. 3,590,036          Dated June 29, 1971

Inventor(s) Lesher and Gruett

It is certified that error appears in the above-identified patent and that said Letters Patent are hereby corrected as shown below:

"naphthydridine" should read -- naphthyridine --; line 23, "10" should read -- 100 --; line 71, "-2-" should read -- -3- --. Column 54, line 59, "34.9" should read -- 34.8 --. Column 56, line 51, "ethyl-1,4" should read -- ethyl 1,4 --. Column 59, line 37, "dihydro-oxo" should read -- dihydro-4-oxo --. Column 60, line 58, "ethoxyl-1" should read -- ethoxy]-1 --. Column 62, line 57, "ethylenemalonate" should read -- methylenemalonate --. Column 63, line 11, "nitrophenoxy-4" should read -- nitrophenoxy)-4 --; line 67, "7benzyl" should read -- 7-benzyl --. Column 64, line 8, "inylmethyl-1,8" should read -- inylmethyl)-1,8- --; line 16, "naphthyridrine" should read -- naphthyridine --. Column 65, line 30, "4-5" should read -- 4,5 --. Column 69, line 2, "1.5" should read -- 1,5 --. Column 70, line 47, "beath" should read -- bath --. Column 71, line 42, "carboxylci" should read -- carboxylic --; line 64, "oxo" should read -- oxo- --; line 75 - Column 72, line 1, "1,8-1,8-naphthyridine" should read -- 1,8-naphthyridine --. Column 72, line 1, "180.-182.0°C." should read -- 224.0-226.2°C. --; line 44, "dimethyloxybenzyl" should read -- dimethoxybenzyl --; line 60, "168.9" should read -- 168.0 --. Column 74, line 12, "1,8naphthyridine" should read -- 1,8-naphthyridine --. Column 75, line 34, "1,2" should read -- 1,8 --; line 37, "vinyl)" should read -- vinyl} --; line 48, "3-pyridyl" should read -- 2-pyridyl --. Column 76, line 59, "dylmehtyl" should read -- dylmethyl --. Column 77, line 41, "carbon a atoms" should read -- carbon atoms --; line 62, "), lower" should read -- ), (lower --. Column 79, formula after line 35 (Claim 5),

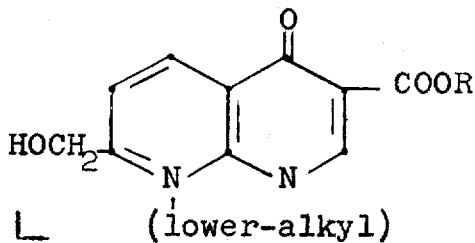   should read   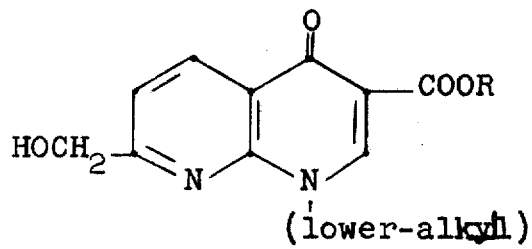

UNITED STATES PATENT OFFICE
CERTIFICATE OF CORRECTION

Patent No. 3,590,036      Dated June 29, 1971

Inventor(s) Lesher and Gruett

It is certified that error appears in the above-identified patent and that said Letters Patent are hereby corrected as shown below:

Column 80, line 5 (Claim 15), "7" should read -- 6 --; line 31 (Claim 17), "1-($\alpha$" should read -- 7-($\alpha$ --; line 46 (Claim 20), "claim 5" should read -- claim 4 --; line 56 (Claim 21), "claim 5" should read -- claim 4 --.

Signed and sealed this 7th day of March 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,590,036   Dated June 29, 1971

Inventor(s) George Y. Lesher & Monte D. Gruett

It is certified that error appears in the above-identified patent and that said Letters Patent are hereby corrected as shown below:

Column 6, lines 30-35, Formula II,

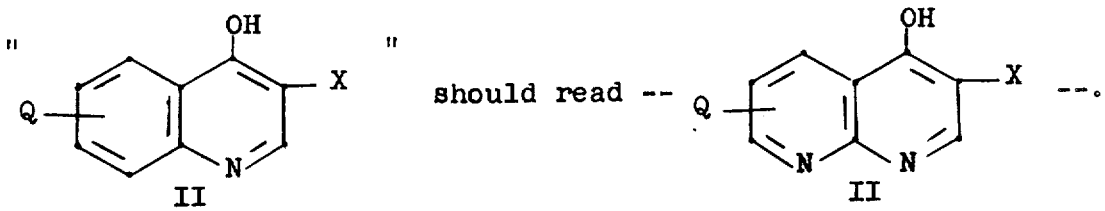

Column 65, lines 60-66, Formula IV; column 66, lines 3-9, Formula V,

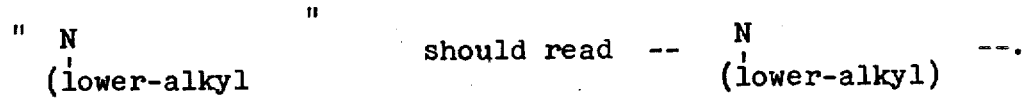

Column 78, Claim 3, in the Formula,

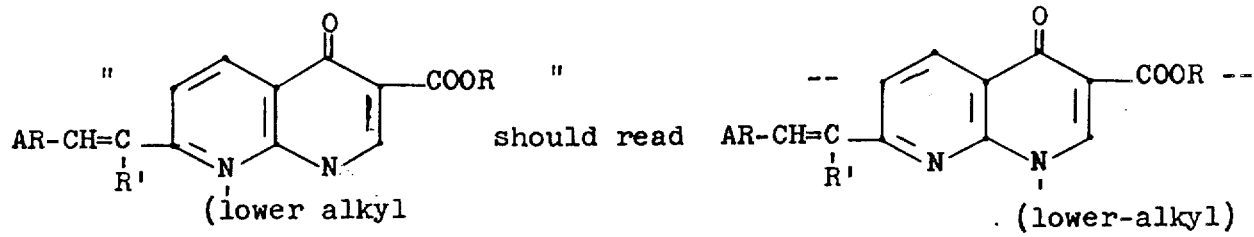

Column 79, line 26, Claim 4; "monocarboxylic" should read -- monocarbocyclic --.

Signed and sealed this 18th day of July 1972.

(SEAL)
Attest:

EDWARD M. FLETCHER, JR.
Attesting Officer

ROBERT GOTTSCHALK
Commissioner of Patents